United States Patent
Perl et al.

(10) Patent No.: US 11,216,888 B2
(45) Date of Patent: Jan. 4, 2022

(54) ELECTRONIC SYSTEM FOR DYNAMIC, QUASI-REALTIME MEASURING AND IDENTIFYING DRIVER MANEUVERS SOLELY BASED ON MOBILE PHONE TELEMETRY, AND A CORRESPONDING METHOD THEREOF

(71) Applicant: Swiss Reinsurance Company Ltd., Zurich (CH)

(72) Inventors: Andri Perl, Oberhasli (CH); Sebastiaan Bongers, Au (CH); Simone Bassis, Bergamo (IT); Bruno Apolloni, Cernusco sul Naviglio (IT)

(73) Assignee: Swiss Reinsurance Company Ltd., Zurich (CH)

( * ) Notice: Subject to any disclaimer, the term of this patent is extended or adjusted under 35 U.S.C. 154(b) by 210 days.

(21) Appl. No.: 15/944,525

(22) Filed: Apr. 3, 2018

(65) Prior Publication Data

US 2019/0102840 A1    Apr. 4, 2019

Related U.S. Application Data

(63) Continuation of application No. PCT/EP2017/075058, filed on Oct. 3, 2017.

(51) Int. Cl.
*G06Q 40/08* (2012.01)
*G01C 21/12* (2006.01)
(Continued)

(52) U.S. Cl.
CPC ............ *G06Q 40/08* (2013.01); *B60W 40/09* (2013.01); *G01C 21/12* (2013.01); *G01S 19/52* (2013.01);
(Continued)

(58) Field of Classification Search
CPC .... G06Q 40/08; G06Q 40/00; G06Q 10/0635; G06Q 20/08; B60W 40/09; B60W 40/02;
(Continued)

(56) References Cited

U.S. PATENT DOCUMENTS

| 2008/0086240 A1* | 4/2008 | Breed | G07C 5/008 |
| | | | 701/1 |
| 2014/0257870 A1* | 9/2014 | Cielocha | B60C 1/00 |
| | | | 705/4 |

(Continued)

OTHER PUBLICATIONS

Walcott-Bryant et al., Harsh Brakes at Potholes in Nairobi: Context-Based Driver Behavior in Developing Cities, Nov. 1-4, 2016, 2016 IEEE 19th International Conference on Intelligent Transportation Systems (ITSC), Rio de Janeiro, Brazil, pp. 675-681 (Year: 2016).*

(Continued)

*Primary Examiner* — Toan M Le
(74) *Attorney, Agent, or Firm* — Oblon, McClelland, Maier & Neustadt, L.L.P.

(57) ABSTRACT

An electronic, real-time system performs maneuver recognition of vehicles based on dynamically measured telematics data, particularly the sensory data of smartphone sensors, and more particularly data from the accelerometer sensor and the global positioning system (GPS) sensor and/or the gyroscope sensor of a smartphone. The axes of the smartphone may be moving independently relative to the axes of the vehicle and thus do not need to be aligned with the axes of the vehicle. Driver behaviors and operational parameters are automatically measured and discriminated, based on automatically individuated and measured driver maneuvers within various measured vehicle trajectories, and an output signal is generated based upon derived risk measure parameters and/or crash attitude measure parameters. The system can use score-driven, especially risk-score driven, operations associated with motor vehicles or transportation modes (Continued)

for passengers or goods, and reliant on a dynamic, telematics-based data aggregation and dynamically measured driving maneuvers, respectively.

49 Claims, 38 Drawing Sheets

(51) Int. Cl.
| | |
|---|---|
| *B60W 40/09* | (2012.01) |
| *G07C 5/00* | (2006.01) |
| *G06Q 10/06* | (2012.01) |
| *G07C 5/08* | (2006.01) |
| *G01S 19/52* | (2010.01) |
| *G06N 3/08* | (2006.01) |
| *G06Q 20/08* | (2012.01) |
| *G07C 5/02* | (2006.01) |
| *G08G 1/01* | (2006.01) |
| *B60W 40/02* | (2006.01) |
| *B60W 40/10* | (2012.01) |
| *H04W 4/40* | (2018.01) |

(52) U.S. Cl.
CPC ........... *G06N 3/08* (2013.01); *G06Q 10/0635* (2013.01); *G06Q 20/08* (2013.01); *G07C 5/008* (2013.01); *G07C 5/02* (2013.01); *G07C 5/08* (2013.01); *G07C 5/085* (2013.01); *G08G 1/0112* (2013.01); *B60W 40/02* (2013.01); *B60W 40/10* (2013.01); *B60W 2540/30* (2013.01); *G07C 5/0825* (2013.01); *G07C 5/0858* (2013.01); *H04W 4/40* (2018.02)

(58) Field of Classification Search
CPC ... B60W 40/10; B60W 2540/30; G01C 21/12; G01S 19/52; G06N 3/08; G07C 5/008; G07C 5/0858; G07C 5/085; G07C 5/02; G07C 5/08; G07C 5/0855; G07C 5/0825; G08G 1/0112; H04W 4/40
USPC ........................................................ 705/3, 35
See application file for complete search history.

(56) References Cited

U.S. PATENT DOCUMENTS

| | | | | |
|---|---|---|---|---|
| 2016/0001781 | A1* | 1/2016 | Fung | G16H 50/20 |
| | | | | 701/36 |
| 2016/0163133 | A1* | 6/2016 | Ricci | G06K 9/00268 |
| | | | | 701/33.4 |
| 2017/0140645 | A1* | 5/2017 | Balid | H04W 4/40 |
| 2018/0060970 | A1* | 3/2018 | Oduor | B60W 50/14 |
| 2018/0211181 | A1* | 7/2018 | Lei | G06N 20/00 |
| 2019/0286153 | A1* | 9/2019 | Rankawat | G06T 7/11 |
| 2019/0302761 | A1* | 10/2019 | Huang | G05D 1/0016 |
| 2019/0303759 | A1* | 10/2019 | Farabet | G06K 9/00791 |

OTHER PUBLICATIONS

IEEE Xplore Search Results, Mar. 31, 2021, 1 pp. (Year: 2021).*

* cited by examiner

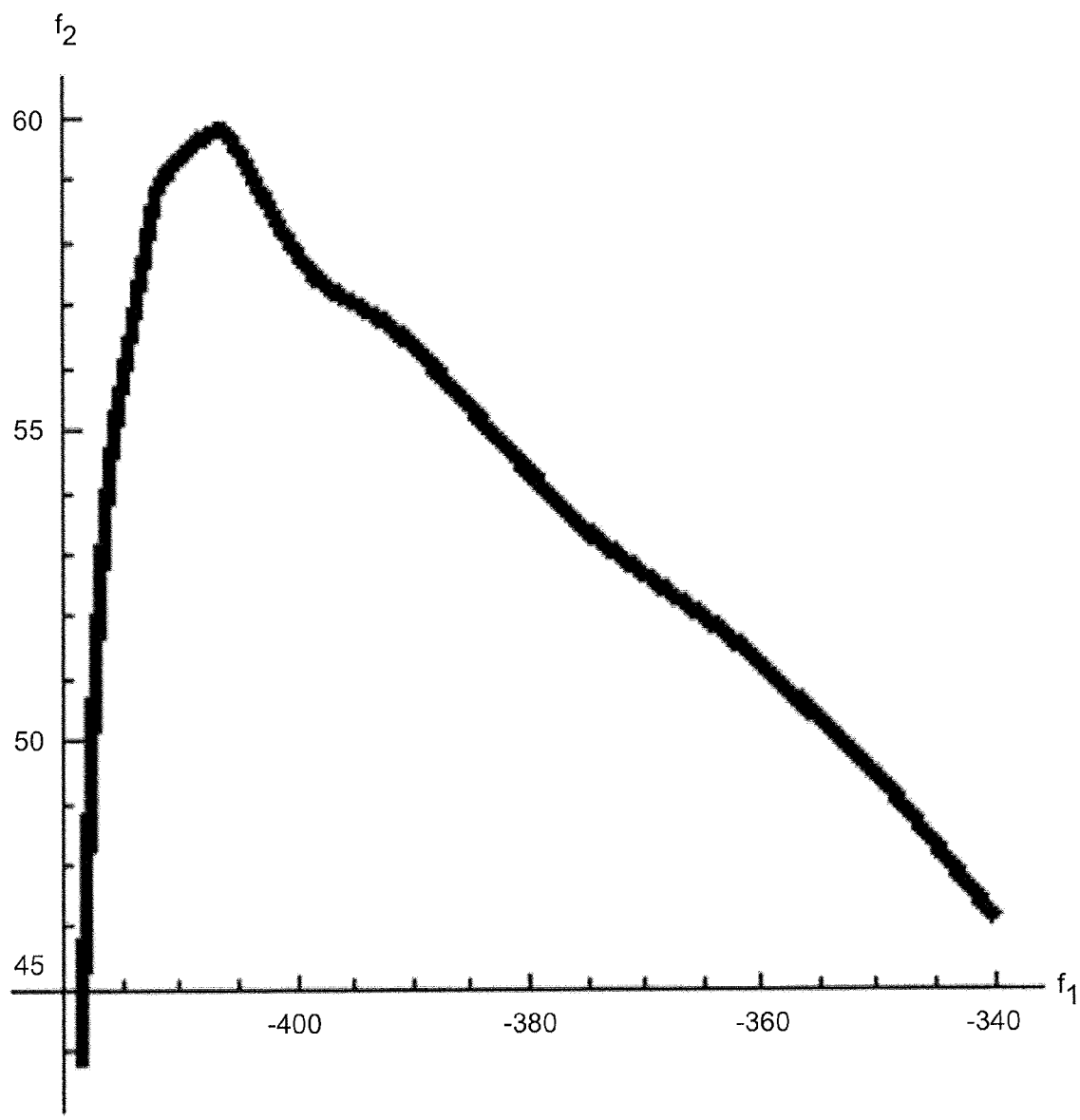
Fig. 9a1

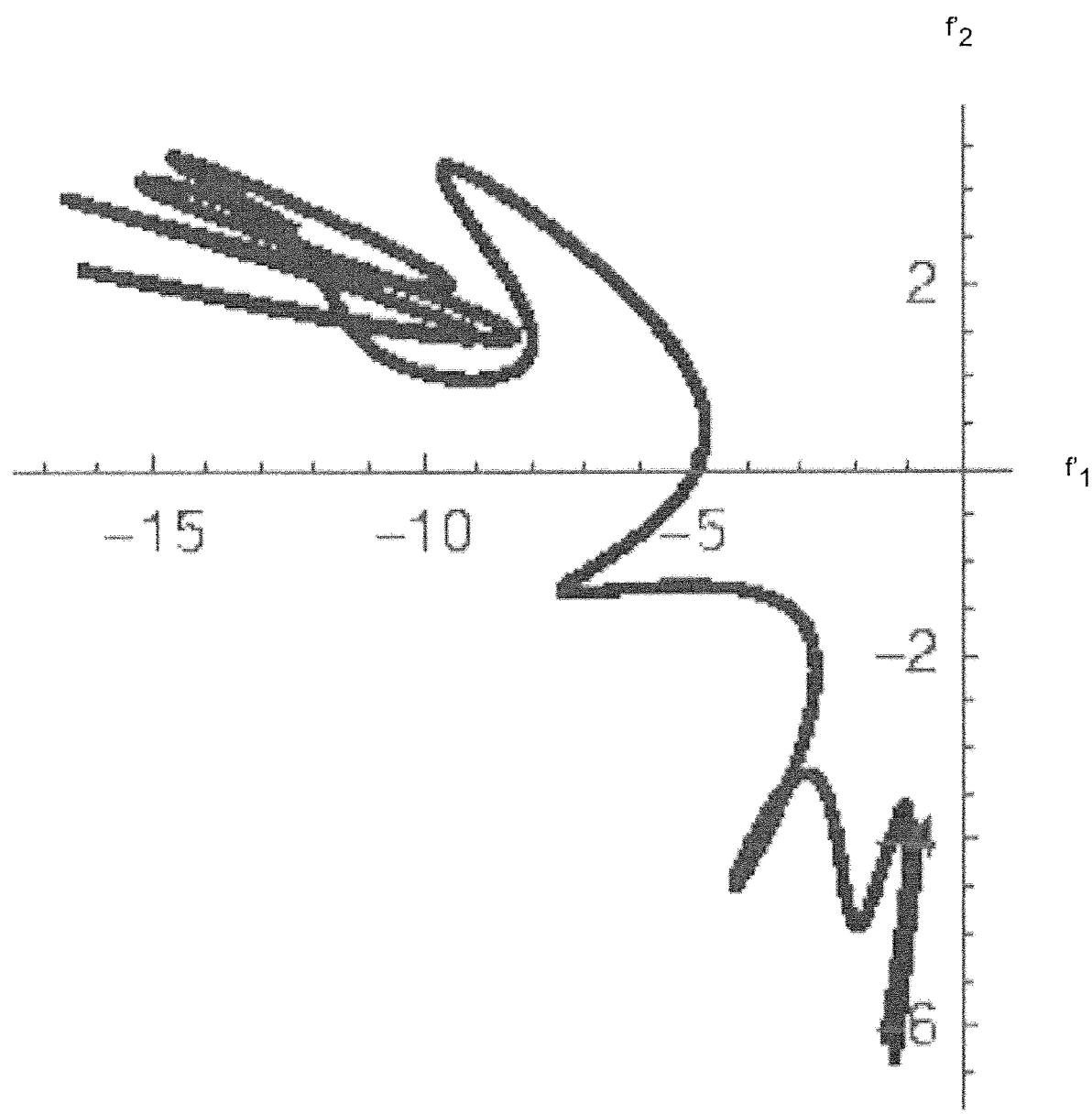
Fig. 9a2

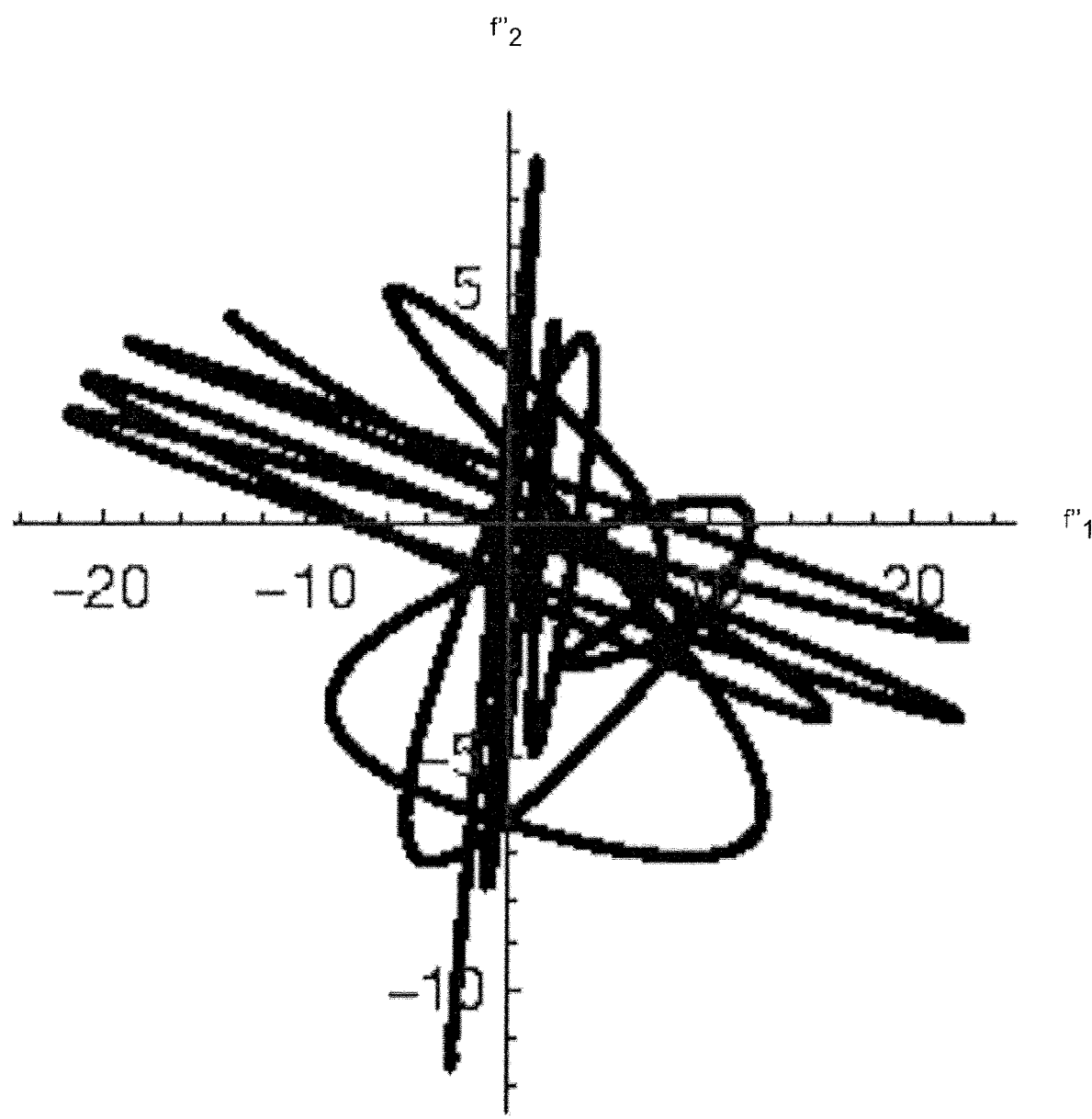
Fig. 9a3

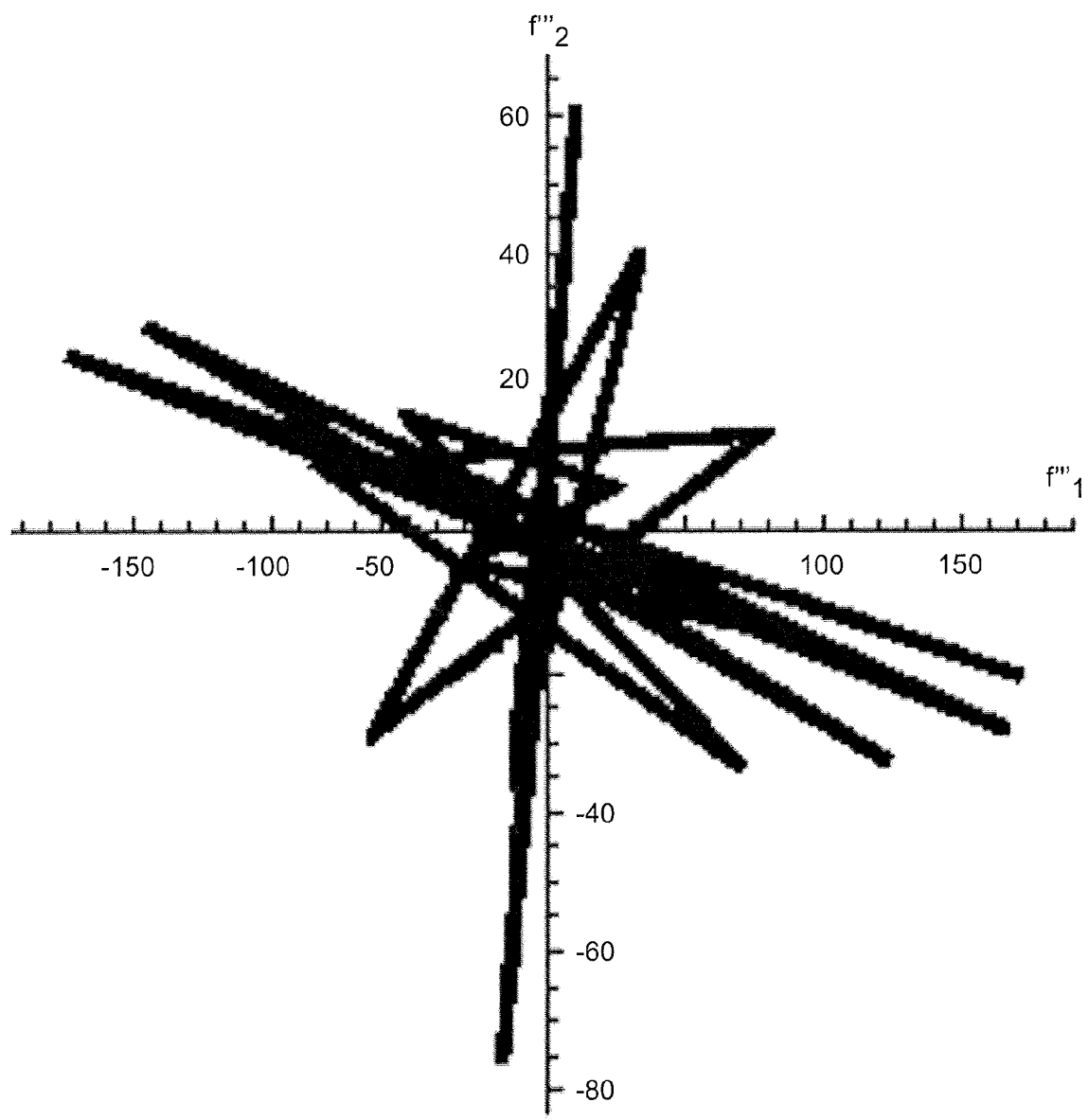
Fig. 9a4

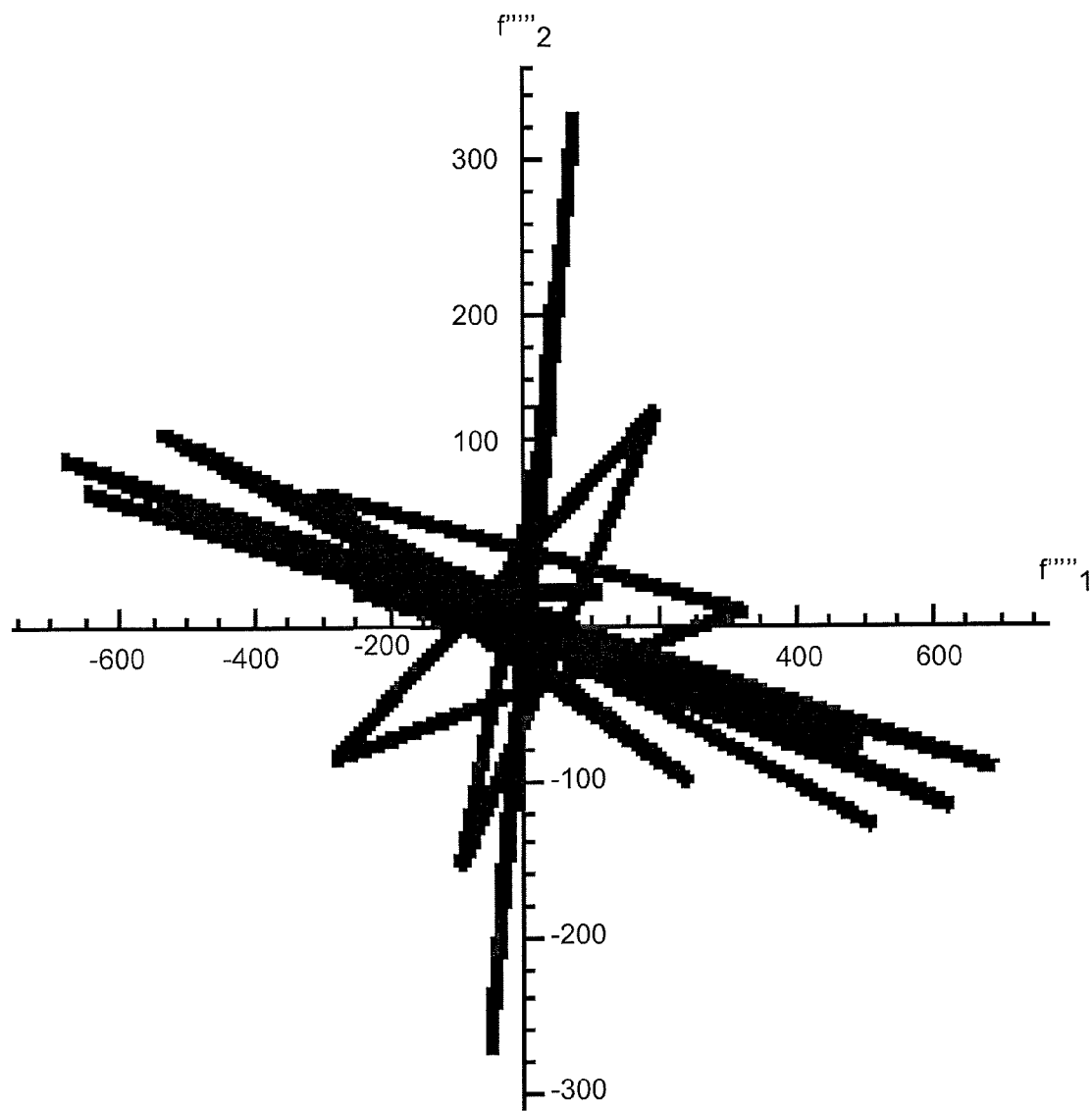
Fig. 9a5

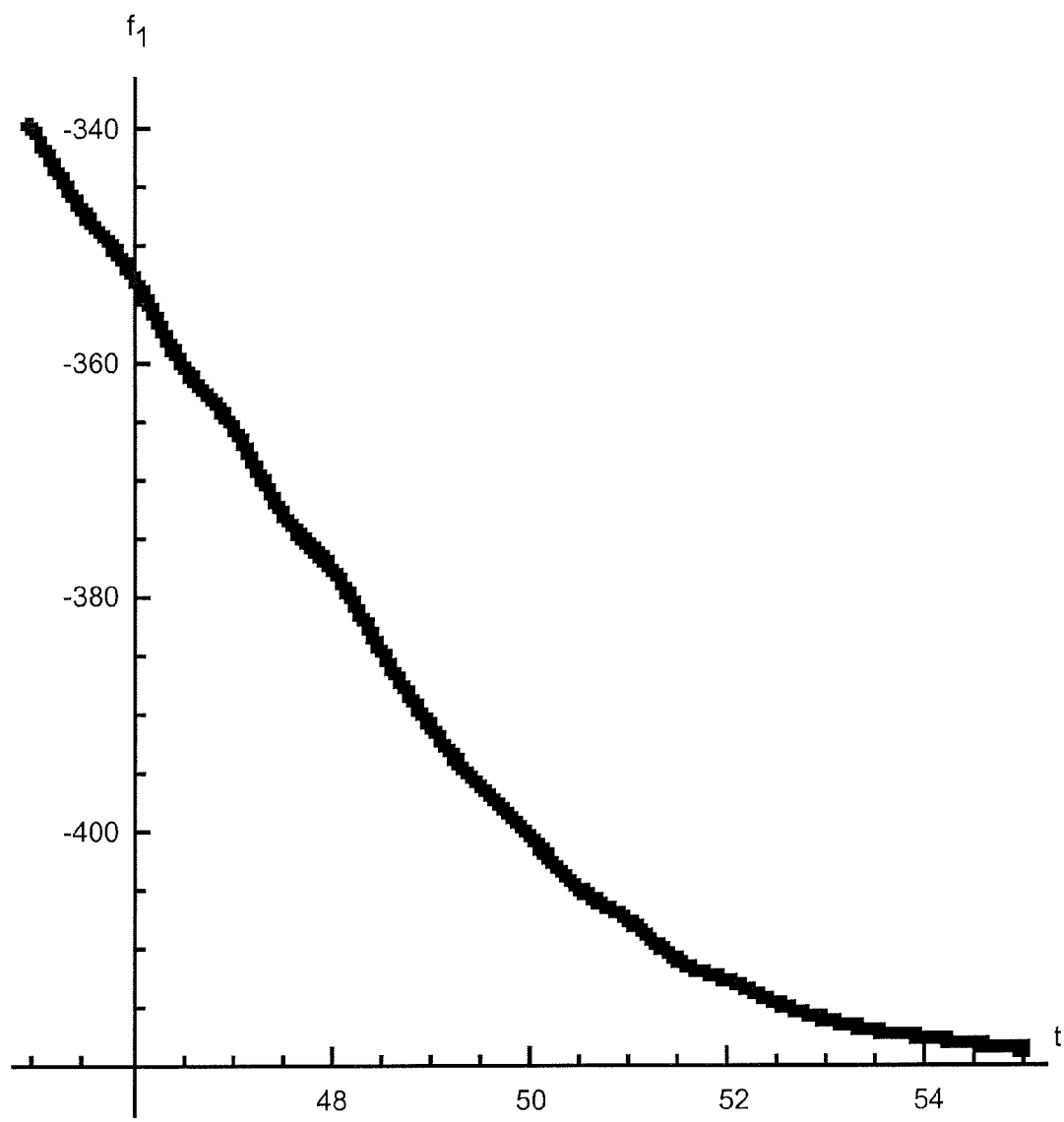
Fig. 9b1

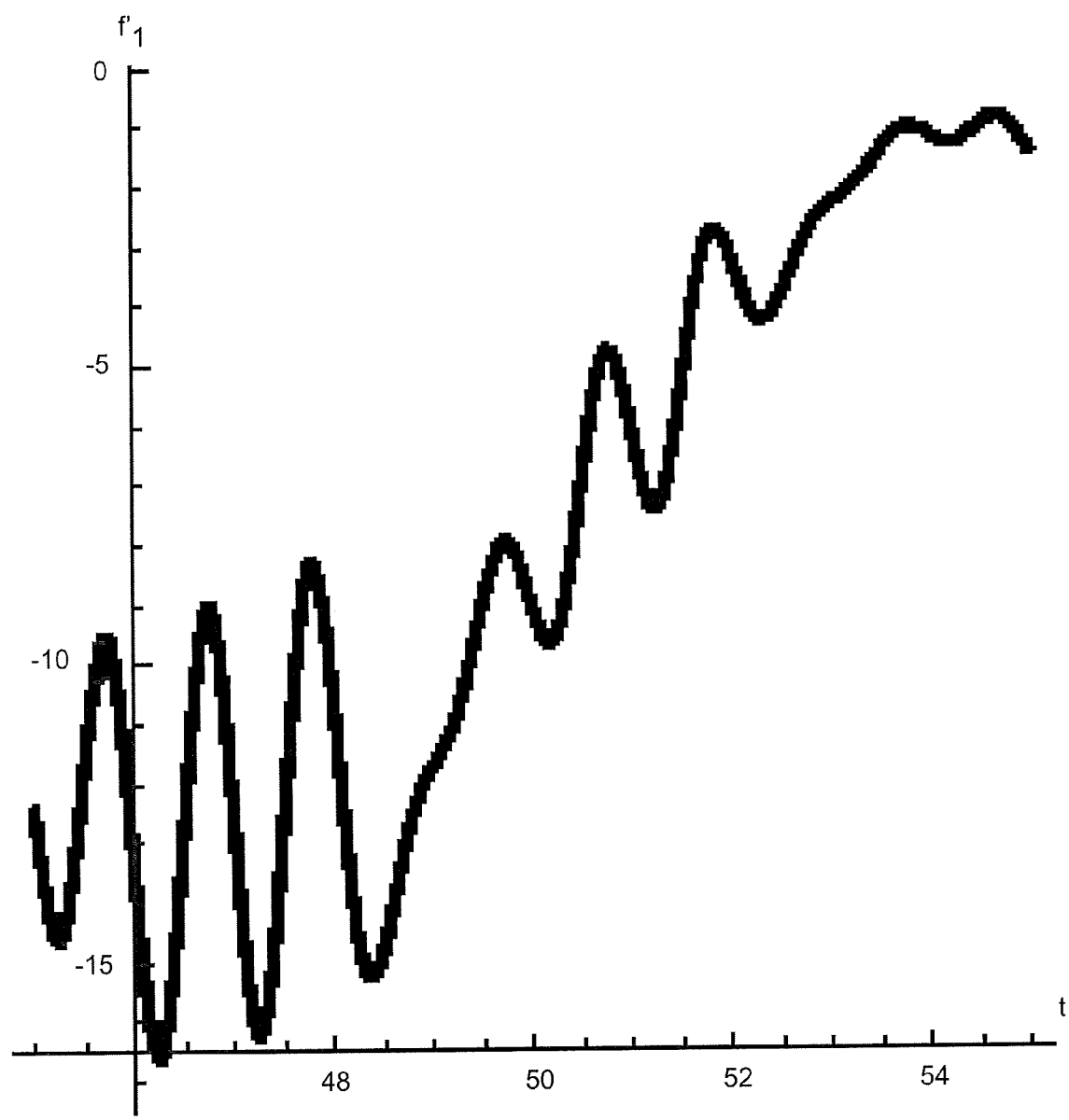
Fig. 9b2

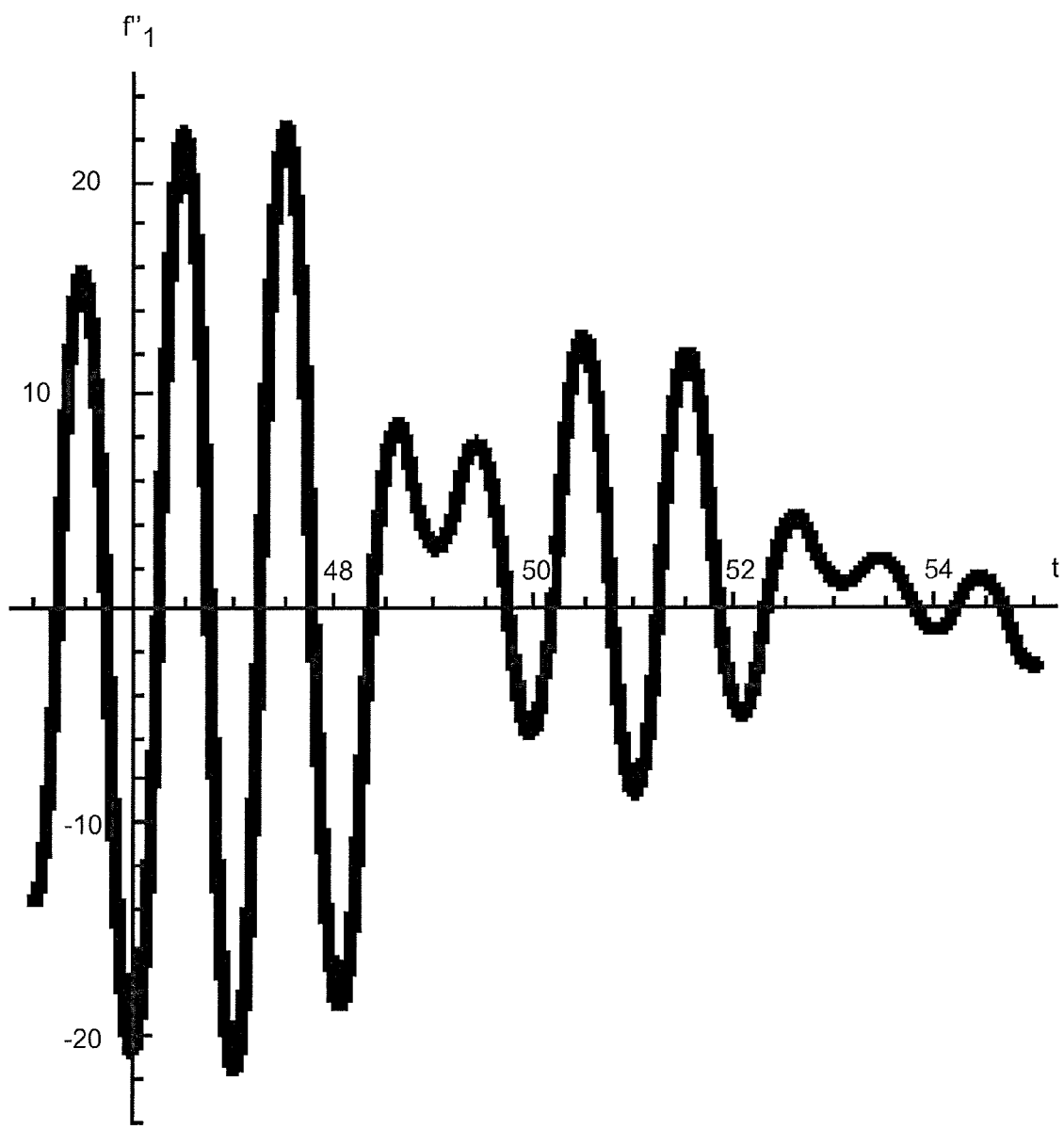
Fig. 9b3

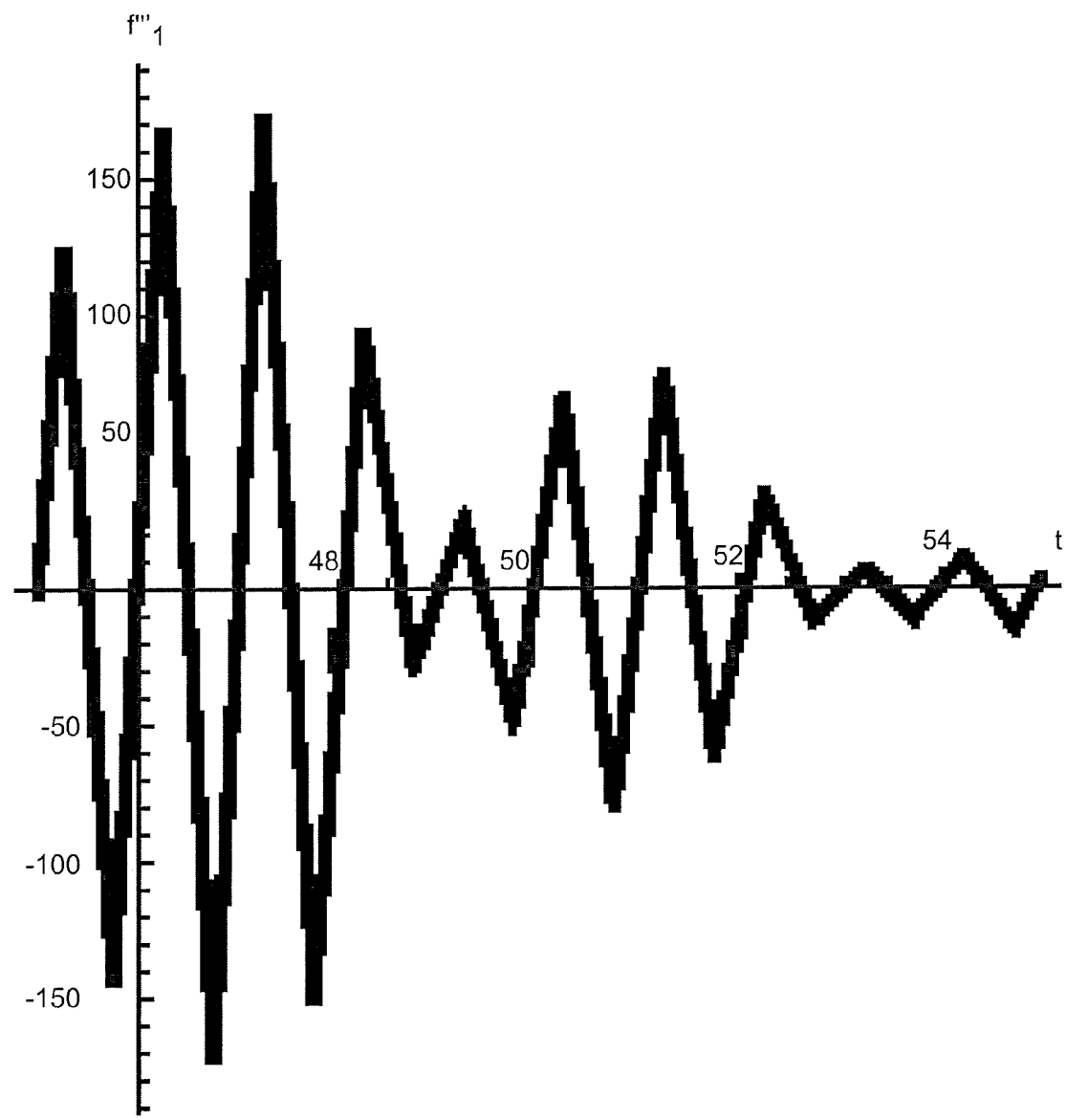
Fig. 9b4

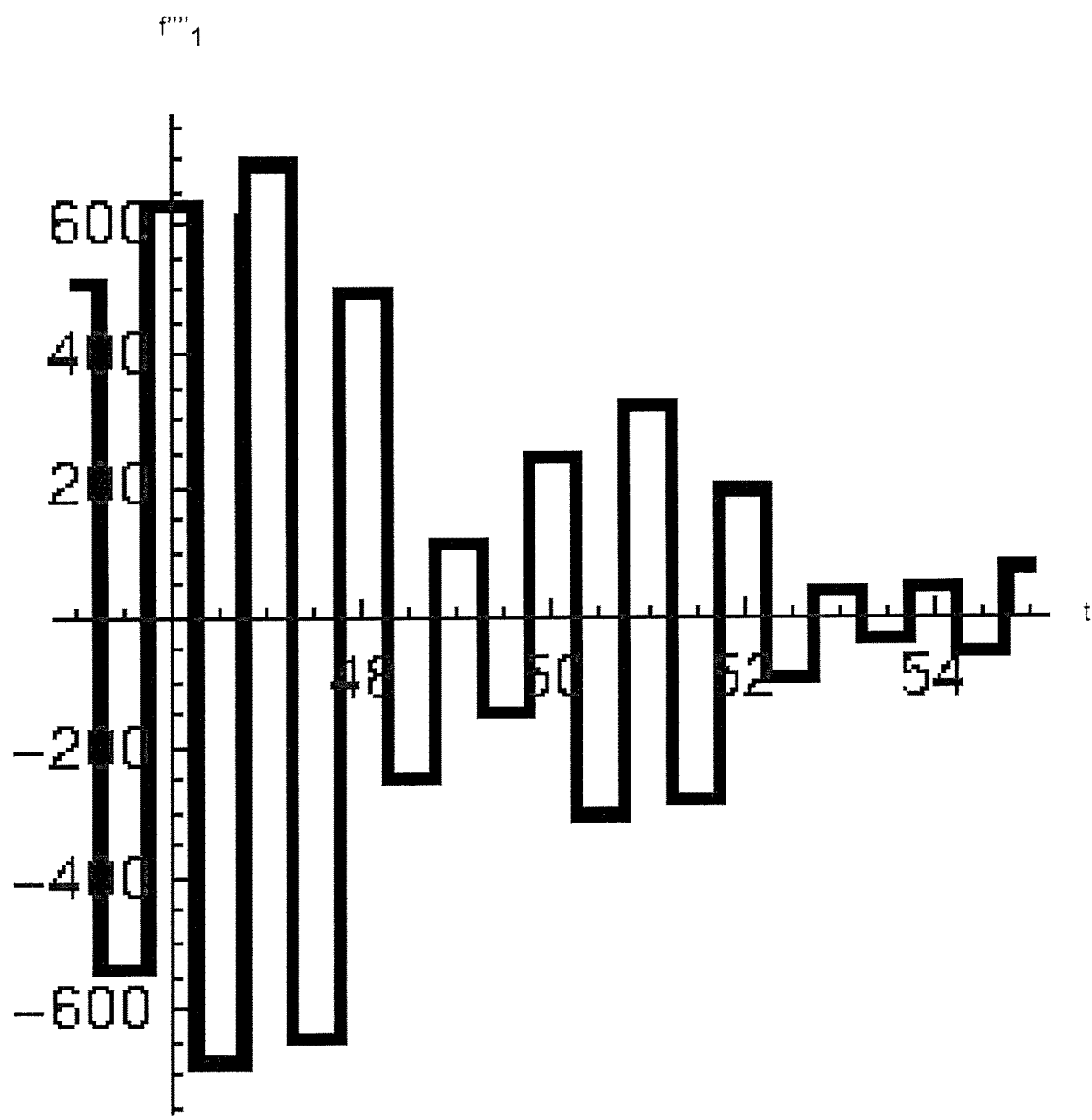
Fig. 9b5

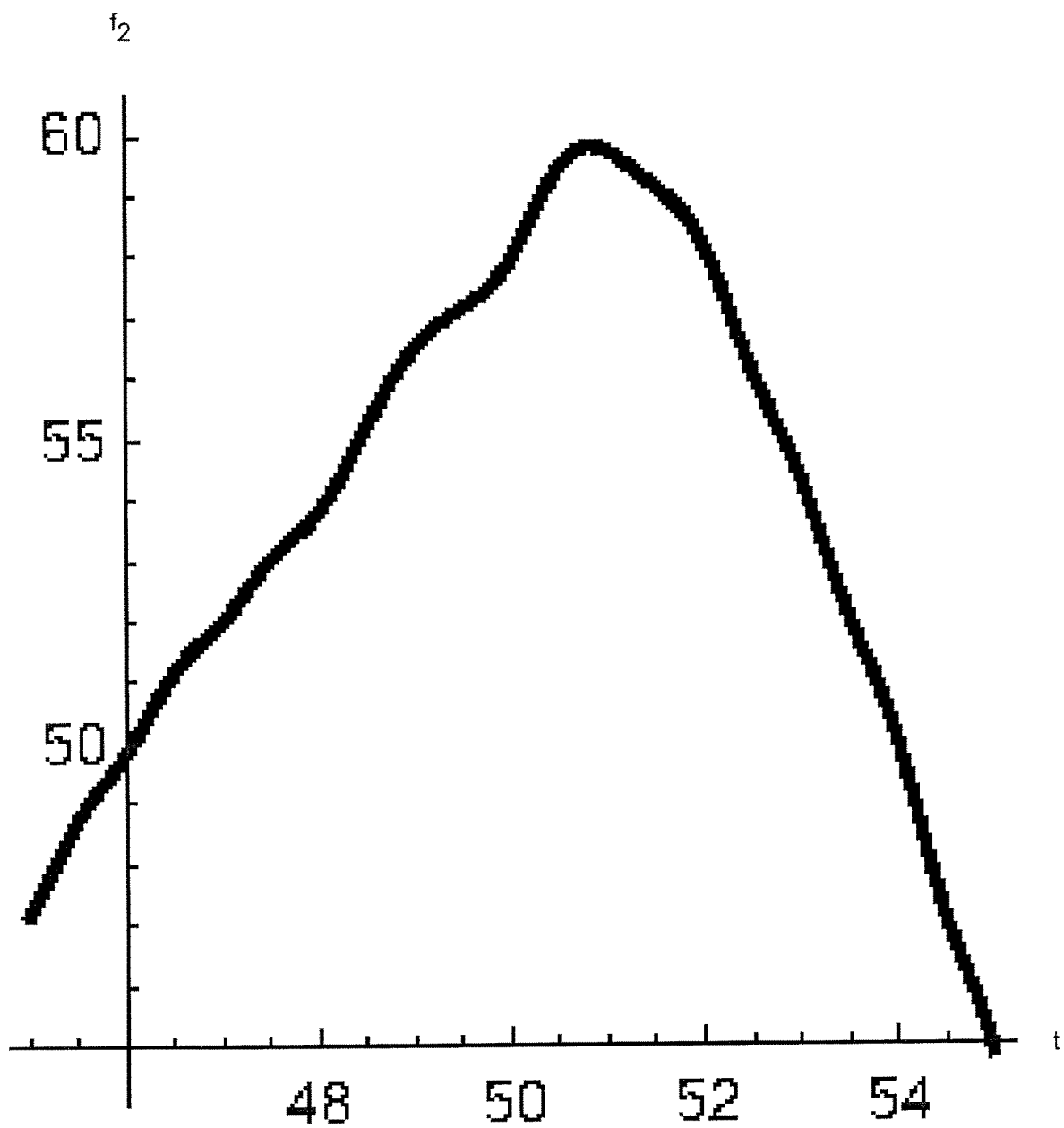
Fig. 9c1

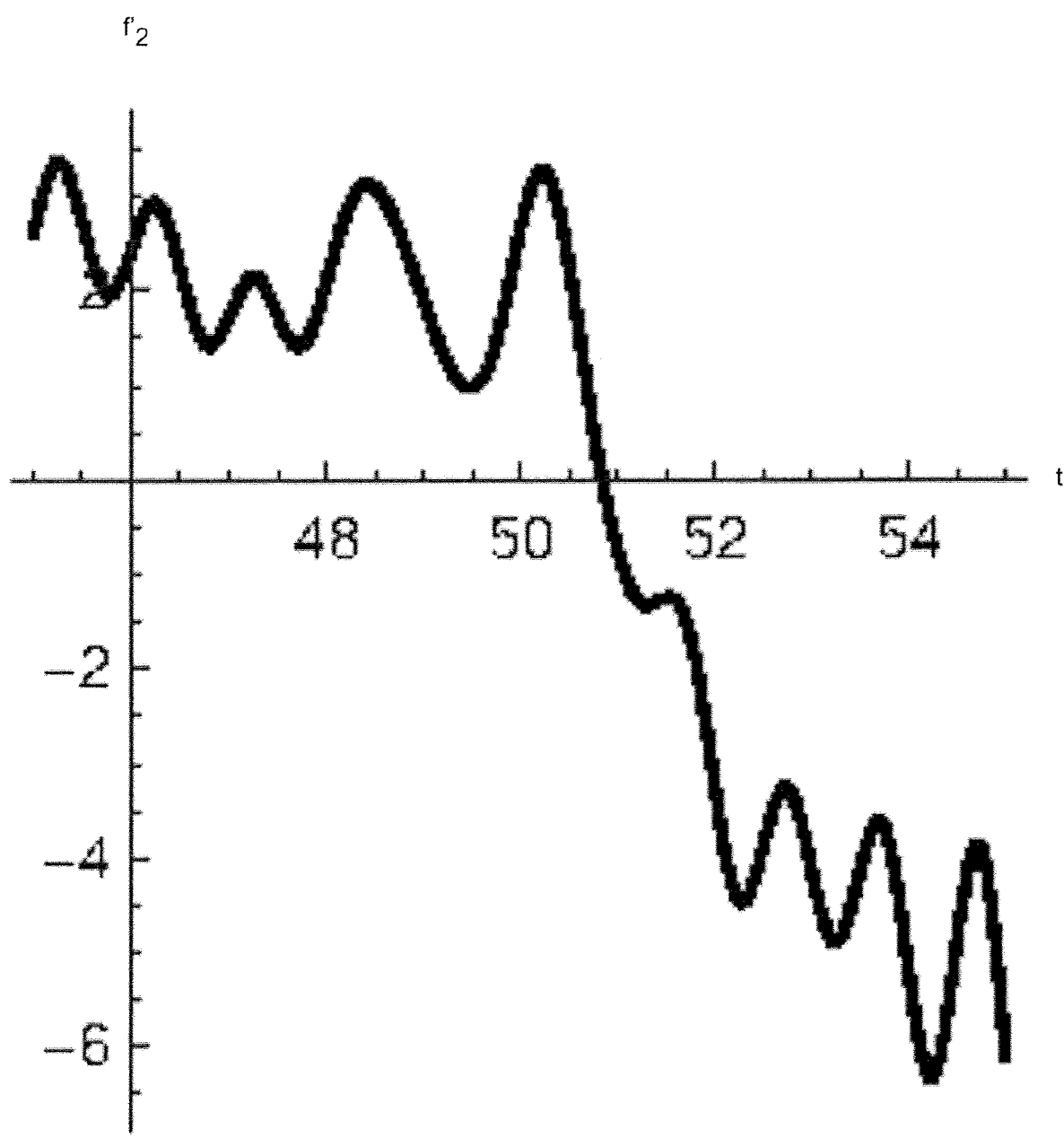
Fig. 9c2

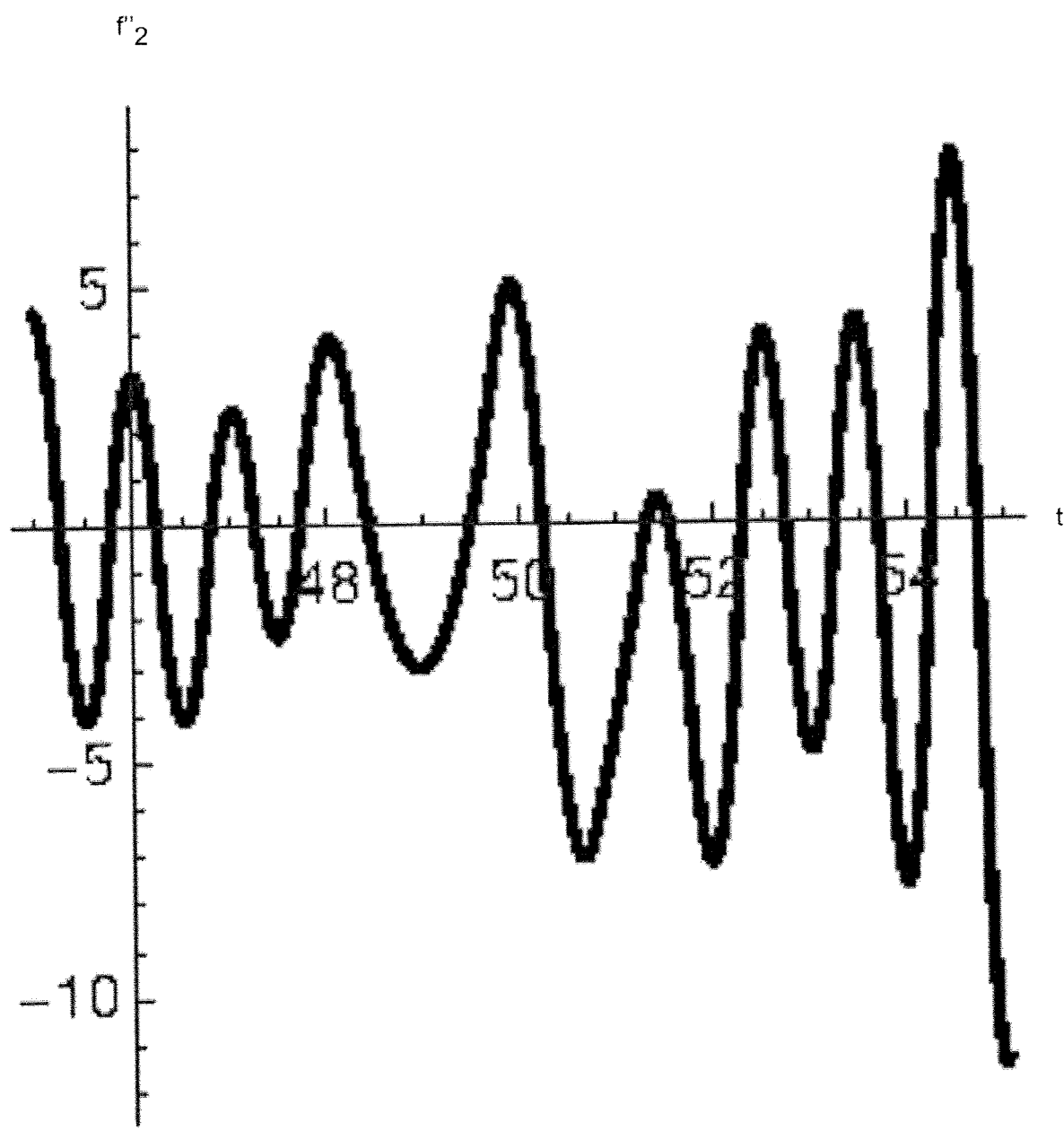
Fig. 9c3

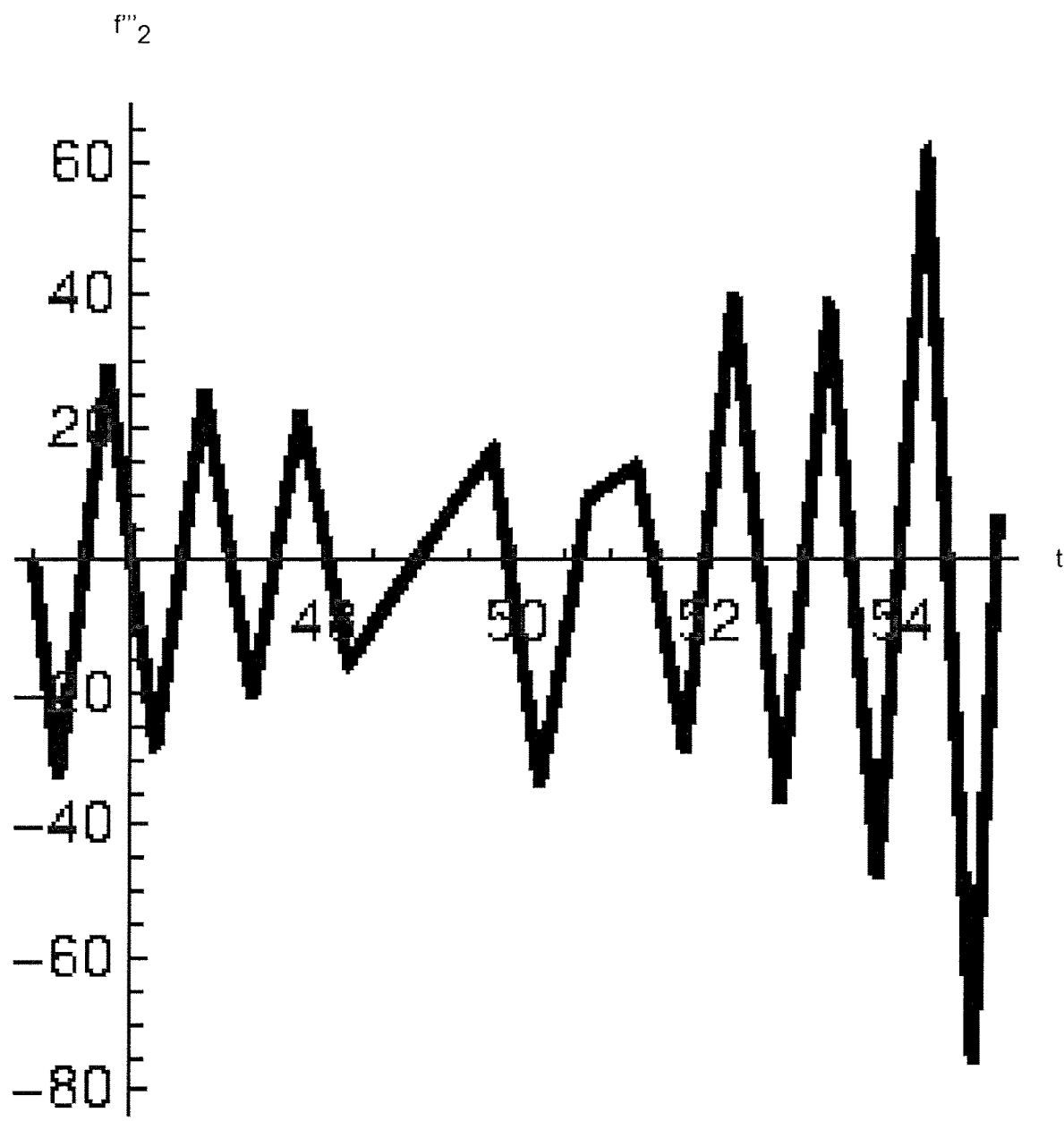
Fig. 9c4

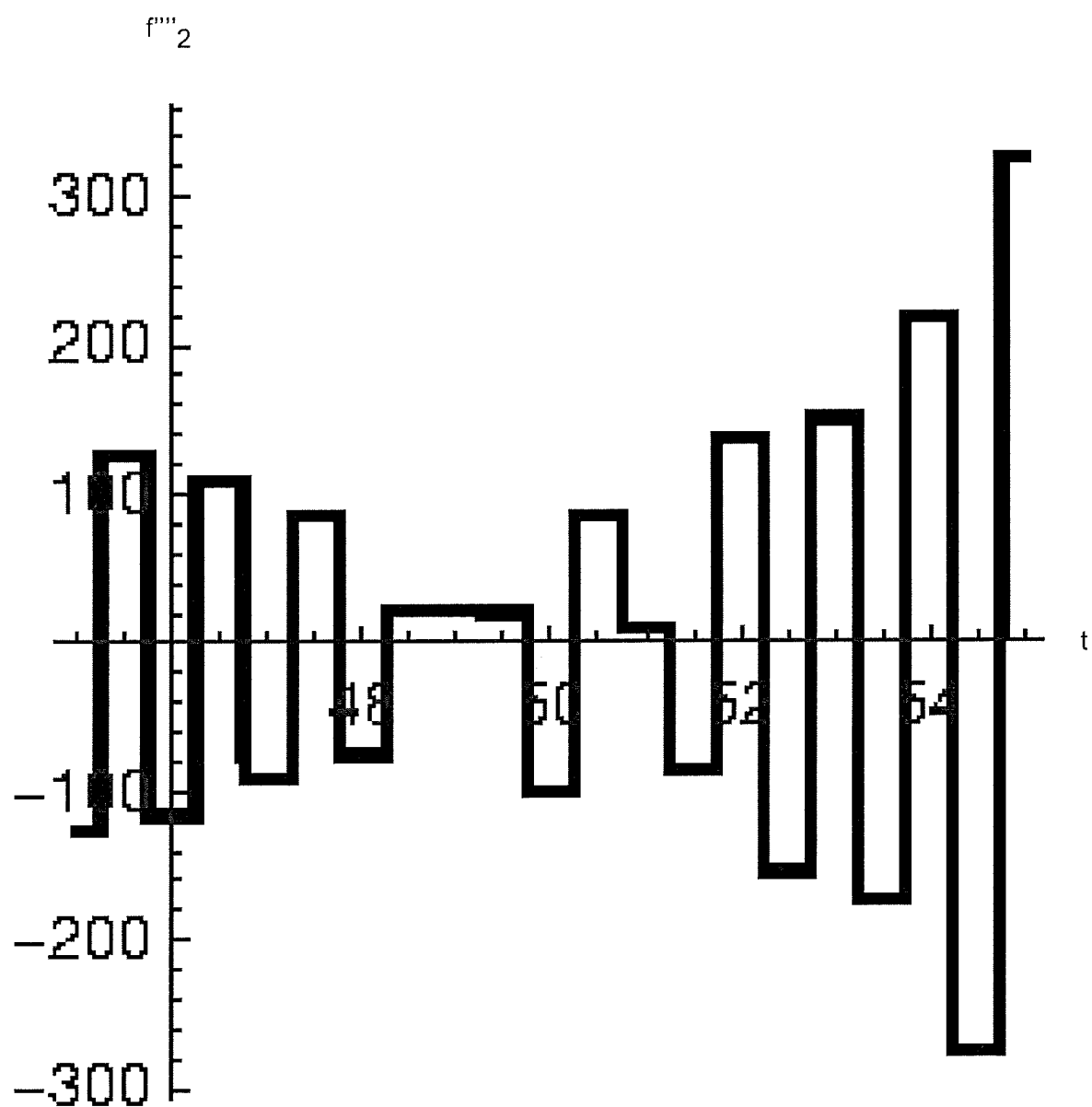
Fig. 9c5

ELECTRONIC SYSTEM FOR DYNAMIC, QUASI-REALTIME MEASURING AND IDENTIFYING DRIVER MANEUVERS SOLELY BASED ON MOBILE PHONE TELEMETRY, AND A CORRESPONDING METHOD THEREOF

REFERENCE TO RELATED APPLICATION

The present application is a continuation of PCT International Patent Application No. PCT/EP2017/075058, filed Oct. 3, 2017, whose disclosure is hereby incorporated by reference in its entirety into the present disclosure.

FIELD OF THE INVENTION

The present invention relates to mobile real-time systems responding dynamically to captured environmental or operational parameters, in particular to telematics systems' monitoring, capturing and responding to automotive parameters of motor vehicles during operation, thereby dynamically measuring and identifying any performed driving maneuvers of the motor vehicle solely based on sensory parameters measured and captured by smartphone sensors and telemetry data. The present invention encompasses the fields of telecommunications technologies, vehicular technologies, road transportation technologies, road safety technologies, electrical engineering (sensors, instrumentation, wireless communications, etc.), and fast, quasi-real-time computing technologies. The present invention further relates to telematics (remote control of associated electronic systems) and on telemetry (remotely measuring) based automated risk-transfer, alert and real-time notification systems for motor vehicles and wireless technology used in the context of telematics. Finally, the invention also relates to telematics-based real-time expert systems. The term telematics, in particular traffic telematics, refers to systems that are used for communications, instrumentation and control, and information technology in the field of transportation. Thus, the present invention relates to the use of telematics together with real-time risk-monitoring, automated risk-transfer and insurance systems based on captured and measured usage-based and/or user-based telematics data.

BACKGROUND OF THE INVENTION

Typically, every driver is considered a risk taker for having accepted a measurable driving risk. Thus, driving a vehicle, generally worldwide, means that the driver somehow must or wants to transfer this risk, for example by transferring or ceding the risk by means of appropriate risk transfer systems or by automobile insurance coverage. The rate for the risk transfer is typically assigned by a human expert, e.g., an automobile insurance agent, who decides on whether a specific driver is a high or low risk driver. In the prior art, the assigned human expert's rating considerations rely only on a few different factors. In the following, the most common prior art risk factors will be discussed: (i) Age is one of the most important personal factors that is used to calculate a driver's risk. Drivers between the ages of 25 and 55 are assigned to the prime age bracket and considered a lower risk. (ii) Gender is another factor. Female drivers are usually considered a lower risk in general; however, this has been slowly changing because more and more registered drivers are women. (iii) Single parents are also considered a lesser risk. Risk transfer systems or insurance coverages take into consideration that a single parent exhibits already a higher level of responsibility by parenting a child alone, so they are more likely to be financially responsible as well. (iv) In a similar vein, married drivers are normally rated higher for their car risk transfer or insurance policy behaviors than single drivers. They are thought to exhibit more stable behavior than single drivers, due the fact that they often have more social responsibilities. Single drivers of the same age and with the same driving record as married persons will be assessed as a higher risk simply because of their marital status. (v) The driving history also plays a central role in the rating system. If a driver has any type of driving violation attached to his or her driving record, he or she will be assigned a higher risk transfer rate than someone whose driving record is without infractions. Any prior accidents that a driver has been involved in will be reflected in the driving record, which increases the risk rating. In some risk-transfer systems, even a severe penalty is put on such a driving record for up to five years, after the accident has occurred. Any type of speeding ticket is normally also part of the driving record and raises a driver's risk factor. Speeding reflects carelessness, disregard for the traffic laws and official risk limits set by the government. Normally, risk-transfer systems will consider any type of speeding ticket a bad reflection on the driver. This is calculated as a component of the risk rating and will ultimately increase the rating or risk-transfer premium. Driving under the influence of alcohol or drugs, as reflected in the driving record, will not only cause a ticket for a moving violation, but it can also trigger the suspension of a driver's license or, in the worst case scenario, a revocation of driving privileges. The bottom line is that, in prior art systems, the better the driving record or a driving history that is free of accidents, tickets, moving violations, etc., the lower the risk rating, which will result in lower insurance rates. (vi) Another factor is the location where the driver resides, which typically plays a major role in how a car risk-transfer is rated. Drivers who, for example, report a residence in a larger metropolitan area run a higher risk of being involved in an accident as well as being the victim of vandalism or theft. Cities are much more congested with traffic than rural areas. The logical considerations of prior art risk-transfer assumes that the more cars are used in a given area, the more likely they are to hit or be hit by another car. Drivers who live in a geographical area with less traffic will be considered less of a risk, which helps lower their risk-transfer ratings or premiums. Specific areas may further be specifically rated as high crime areas. If a driver lives in such an area, the considered risk-transfer rating will be at a higher rate, because the vehicle will be more likely to be the subject of a theft. The less of a target a vehicle is, the lower the risk rating. One way to help counteract said risk is to install an anti-theft mechanism in a vehicle, such as an alarm system, power locks and door locks that require a code to be unlocked, or some other device that will help deter thieves from targeting a given car. Dependent on the risk-transfer system, such measures may help decrease a certain risk rating. Any type of anti-theft protection that is installed in a vehicle will usually also be rewarded by a decrease in the car's risk rating. (vii) New vehicles require more insurance coverage than second-hand vehicles. Sports cars are expensive to manufacture, which is why they are expensive to repair in case of an accident. In summary, vehicles of a lesser value will cost less in terms of their risk transfers. (viii) The factor as to whether a vehicle is used for personal use or strictly for business affects, in many prior art systems, the risk rating. In addition, the distance a driver travels to and from work every day is another factor which, in the prior art, may be considered for assessing the risk rating. The fewer miles a driver accrues per year, the less is the risk exposure. If a driver only drives a few miles a day to reach his job site, the risk of having an accident is comparatively lower, which is why his or her rating will be more favorable. (ix) Teenage drivers are considered an extremely high risk when it comes to driving. Various prior art risk rating statistics acknowledge that teenage drivers have an extremely high crash rate due to their inexperience and lack of maturity. Vehicle accidents are often listed as a leading cause of death in teenagers. This is another factor that is used to rate a risk that is to be transferred, i.e. an insurance risk. (x) As seen in teenagers' specific rating in some risk-transfer systems due to their inexperience, the number of years a driver has been driving also matters. This is tied into the age factor of drivers; yet, people do not always start driving as soon as they reach the legal driving age. A driver who has been driving for the last 10 years will be rated significantly lower than a person of the same age who has been driving a fewer number of years, because such drivers are typically considered to be less of a risk. (xi) Finally, many risk-transfer systems also use a driver's credit history. Clearly, one of the main technical objects of risk-transfer systems consists in balancing the pooling of resources (e.g., premiums). This is typically done in advance based on predicted occurrences of risk events and actually occurring risk events linked to actual losses to be covered. Therefore, unforeseen premium reductions will trigger an unexpected imbalance of the pooled resources relative to actual losses, which may severely impact the operational functionality of the risk-transfer system. However, the main reason cited by prior art systems for using credit history data is to obtain information that will aid in evaluating "unobservable factors," such as caution while driving (cf. e.g., Monaghan, J. E., 2000, The Impact of Personal Credit History on Loss Performance in Personal Lines, Casualty Actuarial Society Forum, pp. 79-105; or Wu, C.-S. P. and Guszcza, J. C., 2003, Does Credit Score Really Explain Insurance Losses? Multivariate Analysis from a Data Mining Point of View, Proceedings of the Casualty Actuarial Society, pp. 113-138). To assess risks by using credit histories, prior art risk-transfer systems assess, either via a human expert or via appropriate data processing and filtering means, so-called "insurance scores" for each potentially insured by weighting certain characteristics from the driver's credit history, for example, delinquent loan payments and any number, if any, of collection actions against a given person (see above Monaghan, 2000, pp. 82-86). The underlying credit record is obtained from large national credit information providers. The risk-transfer systems or the insurers use the score thus derived in combination with other factors to evaluate the driver's automobile risk-transfer rate.

Starting from the above traditional risk assessment as practiced by the prior art systems using mainly statistically based structures via appropriate class factors, such as, e.g., age, gender, marital status, number of driving years, etc., necessarily lead to preferred class ratings associated with the corresponding deficiencies in providing correct risk assessments for any given specific driver. Statistically based structures are always linked to mean values and means assumptions. However, not all teen drivers engage in high-risk behaviors and are therefore not a higher risk factor, as, for example, drivers at the age of thirty who engage in high-risk behaviors. A very skilled driver may have a lower risk at a speed of 50 km/h, as another driver by 30 km/h on the same roadway. The deficiencies of prior art assumptions are based on the fact that they contract all drivers of a certain class to the means assumption of that class, while, in fact, these assumptions are only absolutely true for a minor portion of a certain class. On the other hand, the predominant number of members of a given class is typically distributed by way of a Poisson distribution around the means value, i.e. for this predominant remaining portion, the assumption is more or less wrong leading to a probably unfair risk rating for the given driver. It can be argued that, using the driving history data, the prior art systems allow for a certain individualization resulting, therefore, in a correction of the deficiencies of their statistically based class structure. However, the data of a driving record are always historical data that are interpolated to future driver behavior presuming that drivers will always behave in the same way and that environmental conditions will always stay the same. In reality, this is not true. Drivers age, drivers may learn from previous driving situations, drivers may change their behavior, e.g., change the place of work or stop drinking alcohol, etc. The same applies, for example, to speeding tickets. The legal speed limits are typically at a level that is assumed a safe speed for all drivers (old/young, skilled/unskilled etc.). From the standpoint of the actual measurable risk associated with a given driver, a very skilled driver who has speeding tickets in his driving record may have a lower driving risk than another driver with a flawless driving record. For example, a maneuver to overtake another car which is performed at an elevated speed, probably triggering a speeding ticket, may be associated with a much lower risk than when the same maneuver is performed at a lower speed. Finally, classification filters that group drivers by their credit history are completely unrelated to the actual measurable driving risk. In summary, the prior art systems risk predictions and ratings are afflicted with major deficiencies in relation to the actual occurring driving risk.

Furthermore, a proper assessment of the size of a risk-transfer system's risk and a good prediction of future expected claims is of vital importance to the operation of the system for several reasons. First, correct predictions of future expected claim sizes are very important in setting appropriate premiums, thus affecting the steered balancing of the pooled resources (premiums) to the actual occurring losses to be covered. Second, by setting risk-adequate premiums, the risk-transfer system can avoid adverse selection, i.e. the loss of good (low claim potential) insurance customers, i.e. pooled risk exposed units, because their premiums are set too high (cf. e.g., Growitsch, C., Schade, K.-D., Schwarze, R., Schwintowski, H.-P., and Wein, T., 2006, Risikoorientierte Pramiendifferenzierung in der Kfz-Haftpflichtversicherung—Mehr Pramiengerechtigkeit and weniger Verkehrsunfalle, Zeitschrift fin die gesamte Versicherungswissenschaft, 95(2), pp. 225-249). Good risk assessments even allow for undercutting the premium level in certain fields, leading to a gain in more risk-exposed units in those segments. Third, transparent, proper risk assessment is gaining in importance for third-party ratings of the system as to rating agencies (see, e.g., S&P, 2005, Insurance Criteria: Evaluating the Enterprise Risk Management Practices of Insurance Companies, www.standardandpoors.com). Good, reliable and transparent ratings are essential to lower refinancing costs of the risk-transfer system and may also signal the company's reliability, which may enhance user loyalty. Finally, the ability to select certain risks based on advanced risk assessments can be helpful in lowering the overall portfolio risk (lower volatility, reduced tail risk), and thus reducing equity resources, i.e. capital costs of the system due to decreased regulatory capital demand. These required resources are, e.g., necessary under new supervisory regimes such as Solvency II.

Thus, there exists a high demand for reliable, automated risk-assessment and risk-transfer systems in the automobile risk-transfer industry, considering both liability and comprehensive risk-transfer. The field of automobile risk-transfer is characterized by high competitive pressure as well as high combined ratios and, hence, by low profitability (cf. e.g., GDV, 2006, Jahrbuch 2006—Die deutsche Versicherungswirtschaft, Gesamtverband der Deutschen Versicherungswirtschaft e.V., Berlin). Thus, there is a high demand for automatable systems; this is true even in the complex segment of physically measuring typically not measurable risks and system-based, automated risk-transfer.

Further, automobile risk-transfer technologies' risk measurements are traditionally classified on the basis of a great variety of risk factors (see above), such as, for example, occupation, type of car and region. Additionally, there are different bonus-malus classes, depending on the previous claim history. Thus, the risks are assigned to several thousand different rate classes (see, e.g., Mack, T., 2002, Schadenversicherungsmathematik, ed. 2, Verlag Versicherungswirtschaft, Karlsruhe, p. 161). The problem with this traditional technical approach is that it leads to heavy data fragmentation with many classes containing only few risks yet often showing no or only limited claim experience, thereby making it technically difficult to generate risk-adequate prices based on claim history for these tariff classes. To date, several prior art systems are used to overcome this problem. For example, cluster analysis attempts to identify tariff classes with similar claim expectations so as to achieve a better basis for generating premiums (see, e.g., Yeo, A. I., Smith, K. A., Willis, R. J., and Brooks, M., 2001, Clustering Technique for Risk Classification and Prediction of Claim Costs in the Automobile Insurance Industry, International Journal of Intelligent Systems in Accounting, Finance, and Management, 10(1), pp. 39-50). Other systems try to use interpolation techniques (Dugas, C., Bengio, Y., Chapados, N., Vincent, P., Denoncourt, G., and Fournier, C., 2003, Statistical Learning Algorithms Applied to Automobile Insurance Ratemaking, in Shapiro, A. and Jain, L. C. (eds.): Intelligent and Other Computational Techniques in Insurance: Theory and Applications, World Scientific Publishing Company, Singapore, pp. 137-199) or extended, large databases (see, e.g., Mayer, U., 2002, Third Party Motor Insurance in Europe, University of Bamberg, Bamberg, p. 59). Thus, there exists a further need for alternative, automated-operatable risk assessment systems and risk-transfer systems for the automobile risk-transfer technology and industry, e.g., based on individual risk scoring. As already discussed, in the prior art, some systems use an individualized technical approach called "risk-transfer scoring" (see, e.g., Hartwig, R. P. and Wilkinson, C., 2003, The Use of Credit Information in Personal Lines Insurance Underwriting, Insurance Issues Series, 1(2), Insurance Information Institute, New York). Risk-transfer systems derive or generate a "risk-transfer score" for each potential risk-exposed unit that is to be captured by the system through weighting certain characteristics from the unit's credit history, for example, delinquent loan payments and the number, if any, of collection actions against a driver (see Monaghan, 2000, pp. 82-86). Typically, the underlying credit record is obtained by these systems from large national credit information providers. The risk-transfer systems use the score thus derived in combination with other factors, as the previously discussed traditional factors, to assess or evaluate the applicant's automobile-related driving risk. However, the main reason for using credit history data is to obtain information that will aid in evaluating unobservable factors, such as caution while driving (see above Monaghan, 2000; Wu/Guszcza, 2003). Thus, there is an actual need for alternative, automated-operatable risk measuring and assessment systems and automatable risk-transfer systems for the automobile risk-transfer technology and industry, e.g., based on individual measurements of risks, in particular, which do not lead to an unintended fragmentation of the measurements of individual risk-exposures while allowing for a dynamic, automated technical approach in the implementation of such systems.

Modern automotive engineered cars (including completely manually controlled cars, partially autonomous cars, driverless cars, self-driving cars, robotic cars) are associated with vehicles that are capable of sensing their surrounding environment and operational status or use. Such modern automotive engineered vehicles are capable of detecting a great variety of operational and surrounding parameters using, e.g., radar, LIDAR (instrument that measures distances by means of laser light), GPS (global positioning system), odometer (instrument that measures changes in position over time by means of motion sensor data) and computer vision. In modern cars, advanced control systems often interpret sensory information to identify appropriate navigation paths, as well as obstacles and relevant signage. The sensors may comprise active and passive sensing devices, wherein sensors are physical converter devices measuring a physical quantity and converting the measured physical quantity into a signal which can be read by an observer or by another instrument, circuit or system. Commonly used sensors in motor vehicles or mobile cell phones are, e.g., infrared sensors containing an infrared emitter and an infrared detector that are used, for example, in touchless switches; passive infrared (PIR) sensors that are reactive and detect only an ambient IR, such as, for example, motion sensors; speed detectors, such as, e.g., radar guns, such as microwave radar devices that use the Doppler effect (i.e. the return echo from a moving object will frequency shift); or IR/laser radar that sends pulses of light for determining the difference in reflection time between consecutive pulses to determine speed; ultrasonic sensors that emit a sound and sense the echo to determine range; accelerometers that measure the rate of change of the capacitance translating it into an acceleration by means of a proof mass; gyroscopes that measure a mass oscillating back and forth along the first axis and plates on either side of the mass in the third direction where the capacitance changes when a rotation is detected around the second direction; IMU-sensors (inertial measurement unit) that provide a full 6-degrees of freedom sensor by using a combination of an accelerometer and gyroscope; force sensing resistors, e.g., for contact sensing; touchscreens based on resistive, capacitive or surface acoustic wave sensing; location sensors, such as GPS (global positioning system), triangulation or cell identification systems; visual sensors, such as cameras and computer visions; SIM-based or RFID-based (radio frequency identification) sensors; or environmental sensors, such as moisture sensors, humidity sensors, temperature sensors, etc. Said vehicles' capabilities for sensing their environment and operational status or use is, e.g., used in the above-mentioned advanced driver assistance systems (ADAS), which denotes systems developed to automate/adapt/enhance vehicle systems for safety and better driving. Safety features are designed to avoid collisions and accidents by offering technologies that alert drivers to potential problems, or to avoid collisions by implementing safeguards, and taking over control over the vehicle. Adaptive features may automate lighting, provide adaptive cruise control, automate braking, incorporate GPS/traffic warnings, connect to smartphones, alert drivers to other cars or dangers, keep drivers in the correct lane, or alert drivers to their blind spot.

The above-outlined developments in device and user monitoring, typically referred to as telematics, strongly influenced and are still influencing electronics, telecommunications-related value-added services and risk-transfer (insurance) industries by developing similar or consistent technical strategies to improve the effectiveness of interactions and the immediacy (real-time) of interactions with customers. Today, the needed components are increasingly purely technological components. Social networking, telematics, service-oriented architectures (SOA) and usage-based services (UBS) are overall interactive and promoting this development. Social media platforms, such as, e.g., Facebook, Twitter and YouTube, offer the capability of improving customer interactions and better communicating product information. However, the field of telematics is larger still, as it introduces entirely new possibilities that align the technical input requirements and problem specifications of dynamic risk-transfer, technology and mobility. SOA and telematics are becoming a key factor in managing the complexity of integrating known technologies with new applications. Technically, telematics, being a composite of telecommunications and information technology, is an interdisciplinary technical term encompassing telecommunications, vehicular technologies, road transportation, road safety, electrical engineering (sensors, instrumentation, wireless communications, etc.), and information technology (multimedia, internet, etc.). Thus, the technical field of mobile parameter sensing, data aggregation or telematics is influenced by a wide array of technologies: as the technology of sending, receiving and storing information via telecommunications devices in conjunction with affecting control over remote objects; the integrated use of telecommunications and informatics for applications in vehicles and, e.g., with controlling vehicles while driving; GNSS (Global Navigation Satellite System) technology integrated with computers and mobile communications technology in automotive navigation systems. The use of such technologies in road vehicles is also called vehicle telematics. In particular, telematics trigger the integration of mobile communications, vehicle monitoring systems and location technology by allowing a new way of capturing and monitoring real-time data. Usage-based risk-transfer systems, such as, e.g., provided by the so-called Snapshot technology by the firm Progressive, link risk-transfer compensation or premiums to monitored driving behavior and usage information gathered by an onboard "telematics" device. Over the past five years, telematics-based instrumentation have demonstrated expanded use by a factor 10 to 100 in cars. On such a broadened platform, telematics devices and systems may help increase safety and improve driving behavior.

The concept of vehicle telematics refers to installing or embedding telecommunications devices mostly in mobile units, as, e.g., in cars or other vehicles, to transmit real-time driving data, which, for example, can be used by third-party systems, such as automated risk-monitoring and risk-transfer systems, providing the needed input, e.g., to measure the quality and risks of individual drivers. Mobile (phone) telematics and telemetry refer to installing or embedding telecommunications devices mostly in mobile devices, such as, e.g., in mobile cellular phones, smartphones, and the like. Telematics instruments for such changes are available in the marketplace. For purposes of the present invention, telematics involve the technology of sending, receiving and real-time processing of sensory data via telecommunications devices in conjunction with effecting control over remote objects, such as automated electronically steered systems. Vehicle tracking and global positioning satellite system (GPS) technologies are becoming commonplace, as are the telecommunications devices that allow us to be connected from almost anywhere in the world. In particular, dynamically monitored and adaptive risk-transfer could be conceivable by interconnecting telematics with other real-time measuring systems. There are various satellite navigation systems for vehicle tracking with local or global coverage, which are termed global navigation satellite systems (GNSS). Examples are the NAV STAR global positioning system (GPS) (United States), GLONASS (Russian), the BeiDou navigation satellite system (China), Galileo (European Union) and GPS aided GEO augmented navigation (GAGAN) (India), which enhances the accuracy of NAVSTAR GPS and GLONASS positions or the Quasi-Zenith satellite system (QZSS) (Japan), which is a three-satellite regional time transfer system and GPS enhancement. Advantages provided by such systems could, e.g., comprise that, after a car accident, emergency and road services are alerted automatically, vehicle damage is assessed and the nearest repair shop contacted. In summary, the customer experience could be transformed beyond the traditional operatablility of risk-transfer systems and insurance coverage to real-time navigation and monitoring, including the automated activation of concierge services, safe driving tips, video-on-demand for the kids in the backseat, in-car or online feedback and real-time vehicle diagnostics.

In addition to real-time surveillance, real-time telemetry and quasi real-time telematics remote control and steering, it is to be mentioned that a risk-transfer unit may want to signal information to and concerning a customer associated with the risk-transfer system for a number of different reasons. However, the informational exchange between the customer and the insurer and/or the insurer and the reinsurer is, for the most part, still cumbersome and time-consuming, which is why risk-transfers provided by such structures typically remain static within a fixed time period that was agreed upon. For example, an existing or potential consumer may access an insurance agent's web page to determine a yearly or monthly cost of an insurance policy (e.g., hoping to save money or increase a level of protection by selecting a new insurance company). The consumer may provide basic information to the insurance agent (e.g., name, type of business, date of birth, occupation, etc.), and the insurance agent may use this information to request a premium quote from the insurer. In some cases, the insurer will simply respond to the insurance agent with a premium quote. In other cases, however, an underwriter associated with insurer will ask the insurance agent to provide additional information so that an appropriate premium quote can be generated. For example, an underwriter might ask the insurance agent to indicate how often, where and at what times a motor vehicle is mainly used, or other data, such as age of the motor vehicle and indented use (transportation, etc.). Only after such additional information has been provided, can an appropriate risk analysis be performed by the insurer in order to process an adapted underwriting decision and/or premium pricing.

Telematics technologies may open new technological fields, in particular in terms of monitoring and steering by means of centralized expert systems, such as, e.g., relative to the risk-transfer technology, far more accurate and profitable pricing models, which are provided by such automated expert systems. This would create a huge advantage, in particular for real-time and/or usage-based and/or dynamically operated systems. The advantages of such telematics systems are not restricted to risk transfer; rather, there are also advantages, e.g., in the management of fleets that monitor employees' driving behavior via telematics. Telematics help with improving asset utilization, reducing fuel consumption and improving safety etc., etc. Other fields may also benefit from such integrated telematics systems, as the needs of state and local governments that strive to encourage improvements to fuel consumption, emissions and highway safety demonstrate. Some states, for example, recently issued dynamic pay-as-you-drive (PAYD) regulations, which, on the other hand, allows insurers to offer drivers insurance rates based on actual versus estimated miles driven. It's a financial incentive to drive less.

Already at the current time, telematics technology provides the above-mentioned advantages, such as an accelerometer that allows for assessing drivers' driving styles and behaviors, thus expanding the risk factors that are regularly tracked from the current 40 to more than 100. As demand for accelerometers has increased, auto-makers and device manufacturers have been able to push down unit costs. The need for increased connectivity and access (driven by the "always-connected" consumer) will allow for additional device applications. It is to be pointed out that most technologies in the telematics ecosystem are not unique to vehicle insurance. Social listening, neighborhood protection portals and home monitoring have an impact on how home and property insurance risks are assessed. Further, monitoring systems are available to adjust home temperature controls or automatically dispatch service providers should there be a flood, heat or air-conditioning malfunction in the home. Also, telematics technologies are being developed for healthcare and senior living products, including location-based alerts, health-monitoring and family-tracking services that may be used in how individual risk is assessed, allowing for optimized risk transfer in the life risk-transfer field. Further examples are robotic nurse's aides designed to remind the elderly about routine activities, also guiding them through their homes and calling for help in case of an emergency. These sorts of applications will continue to evolve as the technology becomes more reliable and cost effective and as the need for such solutions increases in the elder care and home-care sectors.

Telematics technology, as used by the present invention, may also provide the basic technology for service-oriented architectures (SOAs) or usage-based and/or user-based applications. Both are considered among the most promising of today's technologies. SOAs allow companies to make their applications and computing resources (such as customer databases and supplier catalogs) available on an as-needed basis, either via an intranet or the internet. Based on a plug-and-play concept, an SOA provides reusable software components across multiple technology platforms. It offers a new approach to software deployment while also tackling serious problems, such as complexity issues and ineffective data integration. This approach provides a consistent technology making it easier to access data and integrate new and old content. Information and services are centralized and reusable, thereby shortening development times and reducing maintenance costs. When a software service is needed (such as for retrieving customer information), the user or system sends a request to a directory, which determines the proper service name, location and required format, then sending back the desired output (in this case, customer information). Users and other applications do not need to know the internal workings of data handling or processing details. Nor do organizations need to own and maintain software; they just access the appropriate service via the internet or network or another data transmission network. However, telematics technology, as used by the present invention, may also provide the basic technology for other platforms, such as, e.g., IoT-platforms (internet of things), which provide the network of physical devices, vehicles, buildings and/or other items embedded with electronics, software sensors, actuators, and network connectivity that enable these objects to collect and exchange data. In particular, IoT allows objects to be sensed and controlled remotely across the existing network infrastructure, also allowing for a more direct integration of the physical world into processor-driven systems and computer means. This integration results in improved efficiency, accuracy and economic benefits. When IoT comprises sensors and actuators, the technology becomes a more general system class of cyber-physical systems, which may encompass technologies such as smart grids, smart homes, intelligent means of transportation and smart cities. In IoT, each thing is uniquely identifiable through its embedded computer system, and is also able to interact with the existing internet infrastructure. IoT provides advanced connectivity of devices, systems and services that goes beyond machine-to-machine (M2M) communications and covers a variety of protocols, domains and applications. These are incorporated herein by reference. The interconnection of these embedded devices (including smart objects) is applicable to automation concerns in nearly all fields, while also enabling advanced applications like a smart grid and smart cities. Things in IoT refer to a wide variety of devices but in particular to automobiles with built-in sensors, analysis devices for environmental monitoring or field operation devices that can assist car drivers, e.g., with search and rescue operations. Thus, things in IoT can comprise a mixture of hardware, software, data and/or services. Such devices collect useful data with the aid of various existing technologies and then autonomously facilitate the flow of said data among other devices. Current examples include the numerous prototypes of autonomous or semi-autonomous vehicles that are currently in development, including by Mercedes-Benz, General Motors, Continental Automotive Systems, IAV, Autoliv Inc., Bosch, Nissan, Renault, Toyota, Audi, Volvo, Tesla Motors, Peugeot, AKKA Technologies, Vislab from the University of Parma, by Oxford University and Google, for example, using interconnected telematics devices with appropriate network technology for controlling, monitoring, operating and steering partially or fully automated vehicles.

SUMMARY OF THE INVENTION

Real-time or quasi real-time measurements of driving maneuvers during the operation of a vehicle are technologically difficult to gather. However, if there is only a restricted set of sensory and measuring data available, as they are, for example, provided by the integrated sensors of smart phones or modern-equipped mobile phones, maneuvering recognition becomes extremely challenging. Such sensory measuring parameters may be restricted to as less sensory data as solely measuring data from the accelerometer sensor and the Global Positioning System sensor and/or the gyroscope sensor. In addition, mobile phones are typically not arranged permanently in a fixed position in respect to the moving vehicle, as compared to vehicle-integrated systems. Mobile phones may, for example, be, additionally, moved within the car by a person holding such a phone, which is independently and additionally to the vehicle's movement. In contrast to such smart phone sensory data, the sensory data of onboard car telematics devices do not have this problem, since they typically stay in tune with the movement of the vehicle. Thus, the stream of sensory data, coming from the mobile phone is inaccurate and superimposed in respect to the movement of the vehicle and must be cleaned from the measurements of these additional movements. In combination with the mentioned circumstance, whereby, typically, only limited sensory data are available that are provided by smart phones/mobile phones, the technical challenge is immense, much more so since mobile phones normally provide only limited energy sources and data processing power. It is an object of the present invention to provide a maneuver recognition system in real-time able to cope with only limited available sensory data, limited available energy and data processing resources and with inaccurate data or sensory data that is superimposed by additional movements. Therefore, the provided solution should be capable of filtering data in real time, e.g., accelerometer and gyroscope data, and of isolating the starting points and end points of driving events, and identification of said events in real time. The solutions should be suitable for real-time applications, such as driver assistance, safety and adaptive risk-transfer systems.

It has to be noted that smartphone-based driving behavior monitoring has applications not only in the automated adaptive or monitoring risk-transfer technology, but also relative to a broad technical applicability in adaptive and/or self-optimized electronic fleet management, driver training and/or law enforcement (monitoring) systems. Thus, more generally, it is one object of the present invention to provide a mobile automotive system that is responsive in real-time and responds dynamically to the captured environmental or operational parameters of a motor vehicle during operation. In particular, it measures parameters of automotive systems, thereby allowing a user to dynamically, and in real time, adapt a vehicle's operation or driving behavior/risks, particularly by means of an automated risk transfer engine, allowing to dynamically select appropriate risk transfer profiles based on monitoring, capturing and responding to automotive parameters in motor vehicles during operation. In particular, it is an object of the invention to provide a dynamic measuring system for dynamic, quasi real-time maneuver recognition used for driver score measurements and driving risk measurements. In contrast to prior-art systems, the automotive system should be capable of providing a dynamic maneuver recognition measurement based on measured actual risk parameters, thereby linking accident causation data to relevant risk factors (e.g., overtake maneuvers, braking maneuvers with lane changes, driver behavior at intersections, etc.) based on actual driver behavior data instead of traditional risk factors, such as age, postal code, etc. Further, it is an object of the invention to provide dynamically triggered, automated, telematics-based automotive systems that are based on real-time capturing of vehicle telematics data. In particular, it is an object of the present invention to extend the existing technology to a dynamically triggered and dynamically adjustable, multi-tier risk-transfer system based on a dynamically adaptable or even floating first-tier level risk-transfer, thereby reinforcing the importance of developing automated systems and allowing for self-sufficient operational responsiveness in real time. Another object of the invention seeks to provide a method for technically capturing, handling and automating dynamically adaptable, complex and difficult-to-compare risk transfer structures, and trigger operations that are related to automate optimally shared risks and transfer operations. Another object of the invention seeks to dynamically synchronize and adjust such operations to changing environmental or operational conditions by means of telematics and the data-invasive, harmonized use of telematics between the different risk-transfer systems based on an appropriate technical trigger structure approach, thus making the different risk-transfer approaches comparable. In contrast to standard practice, the resource pooling systems of the different risk-transfer system shall create a comparable risk-transfer structure, allowing to optimize the risk-transfer operation with the desired, technically based, repetitious accuracy that relies on technical means, process flow and process control/operation. Along the automated risk-transfer telematics value chain, there are many technologies offering individual elements; however, it is an object of the present invention to provide a holistic technical solution that covers the whole range from the point of device installation and data capturing to automated and accurate risk measuring, analysis and management. Finally, it is a further object of the invention to provide a dynamic, expert scoring system based on real-time scoring and measurements, and to provide, furthermore, a technically scalable solution based on scoring algorithms and data processing that allow to adapt and compare the signaling to other fields of automated risk-transfer. In particular, the invention provides real-time scoring and measurements with feedback provided to the car/driver based on the real-time scoring, e.g., to warn or coach the driver about risky behaviors and to optimize the risk transfer.

According to the present invention, these objects are achieved, particularly, with the features of the independent claims. In addition, further advantageous embodiments can be derived from the dependent claims and the related descriptions.

According to the present invention, the above-mentioned objects concerning an electronic, real-time maneuver detection system based on dynamically measured telematics data are achieved, particularly, in that driver behaviors and operational parameters are measured and discriminated by means of the system and based on automatically individuate driver maneuvers within various measured vehicle trajectories, and wherein an output signal is generated based upon derived risk measurement parameters and/or crash attitude measurement parameters, in that mobile telematics devices are associated with a plurality of motor vehicles, the telematics devices comprising one or more wireless connections, wherein, for providing the wireless connection, the telematics devices act as a wireless node within a corresponding data transmission network by means of the antenna connections of the telematics devices, wherein the telematics devices are an integral part of a mobile phone device and connected to a monitoring cellular mobile node application of the mobile phone device, and wherein the telematics devices capture usage-based and/or user-based and/or operation-based telematics data of the motor vehicle and/or user by means of their sensors, and wherein the telematics sensors, at least, comprise an accelerometer sensor and a global positioning system (GPS) sensor and/or a gyroscope-type sensor, in that the plurality of mobile telematics devices associated with the motor vehicle are connected to a dynamic, functional aggregation-based telematics circuit, wherein a data link is provided between the dynamic, functional aggregation-based telematics circuit transmitting at least the captured usage-based and/or user-based and/or operation-based telematics data from the mobile telematics devices to the dynamic, functional aggregation-based telematics circuit, in that, for driver maneuver identification, sequential patterns of the captured usage-based and/or user-based and/or operation-based telematics data are matched with searchable predefined measuring parameter sets of driving maneuvers by means of the dynamic, functional aggregation-based telematics circuit, and wherein the dynamic, functional aggregation-based telematics circuit comprises a first data store unit with the searchable predefined driving maneuvers, wherein each driving maneuver is composed of a plurality of hierarchically structured operation-measuring parameter sets, wherein a specific operation or the driving feature of a vehicle is/are separately identifiable and triggerable based on a corresponding operational parameter set, wherein each driving maneuver is composed of sequential patterns of operations or driving features by the hierarchical structure, which each are extractable and measurable by the measuring telematics parameters seen during the lifespan of a driving maneuver, and wherein sequential patterns of the captured usage-based and/or user-based and/or operation-based telematics data are matched with the searchable predefined measuring parameter sets of driving maneuvers by means of the dynamic, functional aggregation-based telematics circuit, in that, for pattern template identification, the dynamic, functional aggregation-based telematics circuit (10) comprises a second data store unit with searchable predefined measuring parameter pattern templates containing driving maneuvers, wherein each single driving maneuver is composed of a plurality of prototypical parameter patterns, wherein an individuated time interval is measured, spanning the duration of a captured maneuver pattern, by means of the telematics circuit, wherein the measured individuated time interval is used as a time index to extract the portion of features that effectively correspond to a selected maneuver, wherein, for each captured maneuver pattern and each operation or feature, a similarity measurement of the detected operation and/or feature profile is performed, ranging over possible trajectories and used as a benchmark, and wherein highly correlated operations or features are selected, and in that captured driver maneuvers are automatically individuated within the various car trajectories that are provided by the matched searchable measuring parameter sets of driving maneuvers and the measured pattern templates of driving maneuvers, wherein, for two temporal sequences within the captured usage-based and/or user-based and/or operation-based telematics data, a temporal variation-independent measuring parameter is measured each time by the dynamic, functional aggregation-based telematics circuit, wherein the dynamic, functional aggregation-based telematics circuit provides an optimal match between the two temporal sequences by varying the temporal sequences. As a variant, the dynamic, functional aggregation-based telematics circuit can, e.g., be implemented as a dynamic, time-warping-based telematics circuit, wherein, for driver maneuver identification, the matching of the sequential patterns is implemented based on dynamic time warping using the searchable predefined measuring parameter sets of driving maneuvers, and wherein the dynamic, functional aggregation-based telematics circuit provides an optimal match between the two temporal sequences by nonlinearly warping the temporal sequences in a time dimension, and wherein one of the two temporal sequences, which comprise two time series, is locally stretched or compressed while optimizing the measured similarity between the two temporal sequences of usage-based and/or user-based and/or operation-based telematics data. In addition, the dynamic, functional aggregation-based telematics circuit can, e.g., be implemented as a dynamic, symbolic aggregate approximation based telematics circuit or as a dynamic, piecewise aggregate approximation based telematics circuit, wherein for driver maneuver identification, the matching of the sequential patterns is implemented based on dynamic, symbolic aggregate approximation or dynamic, piecewise aggregate approximation using the searchable predefined measuring parameter sets of driving maneuvers. The dynamic, functional-aggregation based telematics circuit can, e.g., alternatively or additionally, comprise a machine learning apparatus based on a neural network, wherein the machine learning apparatus includes a state observing unit and a learning unit, and wherein the state observing unit observes state variables of the sequential patterns of the captured usage-based and/or user-based and/or operation-based telematics data and the learning unit performs a learning operation by linking at least one of the observed state variables of the sequential patterns to at least one of the searchable predefined measuring parameter sets of driving maneuvers. The learning unit can, e.g., include a reward computing unit and a function updating unit, the reward computing unit generates a reward based on at least one of the temporal sequences, wherein for a temporal sequence within the captured usage-based and/or user-based and/or operation-based telematics data, as observed by the state observing unit, a temporal variation-independent reward parameter is measured each time by the dynamic, functional aggregation-based telematics circuit, and wherein the function updating unit that updates a function for deciding, from the observed state variables of the sequential patterns at present, based on the reward generated by the reward computing unit, at least one of the searchable measuring parameter sets of the driving maneuvers and the measured pattern templates of driving maneuvers providing an optimal match between the two temporal sequences. The machine learning apparatus can, for example, be based on a convolutional neural network or a recurrent neural network or a standard backpropagation neural network. The telematics devices can e.g. further comprise one or more wireless or wired connections and a plurality of interfaces for connecting with at least one of a vehicle's data transmission busses and/or a plurality of interfaces for connecting with sensors and/or measuring devices, wherein the telematics devices are connected to an onboard diagnostic system and/or an in-car interactive device and/or a monitoring cellular mobile node application. The captured usage-based and/or user-based and/or operation-based telematics data can, in particular, be based solely on measuring data from the accelerometer sensor and the global positioning system (GPS) sensor and/or the gyroscope sensor.

The before-mentioned objects can also be achieved by a dynamic accident causation and accident risk measuring system based on dynamically measured telematics data. This is achieved, particularly, in that, by means of the present invention, driver behavior and operational parameters are measured and discriminated by means of the system based on automatically individuating driver maneuvers within various measured vehicle trajectories, wherein an output signal is generated based upon derived risk measurement parameters and/or crash attitude measurement parameters, in that mobile telematics devices are associated with a plurality of motor vehicles, wherein the telematics devices comprise one or more wireless or wired connections, and a plurality of interfaces for connection with at least one of a vehicle's data transmission busses, and/or a plurality of interfaces for connection with sensors and/or measuring devices, wherein, for providing the wireless connection, the telematics device acts as a wireless node within a corresponding data transmission network by means of antenna connections of the telematics device, and wherein the telematics devices are connected to an onboard diagnostic system and/or an in-car interactive device and/or a monitoring cellular mobile node application, and wherein the telematics devices capture usage-based and/or user-based and/or operation-based telematics data of the motor vehicle and/or user, in that the plurality of mobile telematics devices associated with the motor vehicles are connected to a dynamic time warping-based telematics circuit, wherein a data link is set by means of the wireless connection between the dynamic time warping-based telematics circuit transmitting at least the captured usage-based and/or user-based and/or operation-based telematics data from the mobile telematics devices to the dynamic time warping-based telematics circuit, in that, for driver maneuver identification, sequential patterns of the captured usage-based and/or user-based and/or operation-based telematics data are matched with searchable predefined measuring parameter sets of driving maneuvers by means of the dynamic time warping-based telematics circuit, and wherein the dynamic time warping-based telematics circuit comprises a first data store unit with the searchable predefined driving maneuvers, wherein each driving maneuver is composed of a plurality of hierarchically structured operation measuring parameter sets, wherein a specific operation or driving feature of a vehicle is separately identifiable and triggerable based on a corresponding operational parameter set, wherein each driving maneuver is composed of sequential patterns of operations or driving features by the hierarchical structure, which each are extractable and measurable by the measuring telematics parameters that are exhibited during the lifespan of a driving maneuver, and wherein sequential patterns of the captured usage-based and/or user-based and/or operation-based telematics data are matched with the searchable predefined measuring parameter sets of driving maneuvers by means of the dynamic time warping-based telematics circuit, in that, for pattern template identification, the dynamic time warping-based telematics circuit comprises a second data store unit with searchable predefined measuring parameter pattern templates of driving maneuvers, wherein each single drive maneuver is composed of a plurality of prototypical parameter patterns, wherein an individuated time interval is measured that spans the duration of a captured maneuver pattern by means of the telematics circuit, wherein the measured individuated time interval is used as a time index to extract the portions of features effectively corresponding to a selected maneuver, wherein, for each captured maneuver pattern and each operation or feature, a similarity measurement of the detected operation and/or feature profiles is performed, ranging over possible trajectories and used as a benchmark, and highly correlated operations or features are selected, and in that captured driver maneuvers are automatically individuated within the various car trajectories provided by the matched searchable measuring parameter sets of driving maneuvers and the measured pattern templates of driving maneuvers, wherein, for two temporal sequences, within the captured usage-based and/or user-based and/or operation-based telematics data, a temporal variation-independent measuring parameter is measured, each time, by the dynamic time warping-based telematics circuit, wherein the dynamic time warping-based telematics circuit provides an optimal match between the two temporal sequences by nonlinearly warping the temporal sequences in the time dimension, and wherein one of the two temporal sequences, which comprise(s) two time series, is locally stretched or compressed while optimizing the measured similarity between the two temporal sequences of usage-based and/or user-based and/or operation-based telematics data. The present invention has, inter alia, the advantage that it allows for an independent maneuver recognition in real time of dynamic traffic behavior, i.e., a real-time pattern is recognized in dynamically captured maneuver-type logs. As a further advantage, the inventive system allows for providing a system for manoeueve detection-based risk scoring. Manoeuvre detection-based scoring and vehicle safety (ADAS, active and passive safety) constitute a key differentiator for developing an operatable risk-transfer structure. The current technical capability is limited to a few manoeuvres such as a) overtake, b) harsh braking, c) fast acceleration, d) lateral road entry, which, moreover, can typically not be done in real time. Further, in the prior art, mobile systems and applications that are only based on usage-based risk-transfer (User-based insurance (UBI)) cannot identify most relevant manoeuvres/or risky driving behaviours, which are feasible with the connected car. The present invention provides a new system for "advanced scoring and dynamic risk measurements" based on connected car data and manoeuvres. Finally, the scoring results or trip events can, e.g., be shown/displayed to the car driver or vehicle user and, thus, can serve as feedback/coaching for the driver (policyholder) with the aim of reducing accidents.

Traffic of roads, highways or in other car lanes, typically consisting of one or a plurality of traffic lanes, is characterized by complex traffic scenarios involving many vehicles, pedestrians, moving or stationary objects and various relevant contextual and environmental conditions. To reduce the risk of accidents, a driver must accurately interpret possible hazards involved in a situation. This includes correctly recognizing intended maneuvers of all surrounding vehicles etc. If the driver is distracted or overwhelmed during the interpretation of a traffic scene, this can lead to an accident and to congestion, causing $CO^2$ pollution of the environment, besides the macroeconomic effects (e.g., loss of manpower and productivity etc.).

Any identification and interpretation of traffic maneuvers will become key elements in modern driver assistance systems, as well as in modern risk measuring and assessment systems. Considerable effort has been put into early recognition of lane-changing maneuvers; however, a number of technical challenges have been identified preventing the implementation of appropriate systems for maneuver recognition. There are two main reasons why potentially dangerous maneuvers by neighboring vehicles represent a technical challenge in early proactive recognition: (i) Situations develop quickly over time, and an automated system will therefore require information that is captured in the order of milliseconds; (ii) situations can only be reliably recognized when considering the joint behavior of several sensor measurements simultaneously, often featuring several vehicles. In the present invention, the measured and dynamically captured data sets can include the measuring parameters for the moving states of the current and neighboring vehicles (e.g., position, speed, acceleration, orientation within the lane, trajectory), available space for a maneuver, as well as measuring parameters and appropriate information related to the environment, like lane markings and road borders. The situational features used for maneuver recognition can be, for example, structured according to three main dimensions: lateral evidence, trajectory, and occupancy schedule grid.

The measured automotive data sets that are typically used for systems, such as the present invention, can be extremely large. Consider a highway scenario involving a vehicle driving in a lane with three other vehicles driving in three different lanes in front of the considered vehicle. The information describing such a scenario typically consists of 252 observations that are acquired at a fixed sampling rate (in the order of milliseconds). In prior art systems, if a test drive lasting only one hour is to be analyzed to enable the adaptation of the model parameters, this will result in several millions of database records. For example, using today's sampling rate of 40 milliseconds, this results in 22,680,000 records. Prior art systems further need to be tested on drives of thousands of kilometers with the corresponding high number of driving hours; this renders an off-line parameter adaptation of the technical data processing scheme unfeasible due to a huge size of the database. Therefore, the present invention provides an efficient technical implementation and methods that are scalable to handle the extremely large volumes of data, contrary to systems that are available for online processing. The inventive system for maneuver recognition in traffic situations optimizes the used technical structure to match the memory requirements, inference time and computational power of data processing means of the system. This optimization meets the responsiveness requirement in a new way and ensures that the system that has been developed is able to operate even on the time scale utilized by an automotive processor. Further, the present system provides dynamic modelling, which is even able to boost early recognition of potentially dangerous maneuvers based on observed and measured data streams. The system can, for example, be additionally equipped with a suitable inference engine to accommodate real-time decision-making in uncertainty conditions, improving the real-time capability of detecting any evolving and potentially dangerous maneuvers even before their impact becomes critical. The advantage of the implemented probabilistic technical approach for the recognition of potentially dangerous maneuvers provides the capability for handling a high degree of uncertainty in the measured data. The present invention can easily be extended by a lane-related coordinate system, together with individual occupancy schedule grids for all modeled vehicles. This combination allows for an even more efficient classification of maneuvering relationships, such as, e.g., existing vehicle-lane and vehicle-vehicle relationships in traffic scenarios, thereby substantially improving the automated recognition and measuring of complex traffic situations. Probabilities and variances can be propagated systematically by the present system which results in probabilistic sets of the modeled driving maneuvers. The present invention allows for performing maneuver recognition steps in more and more complex traffic situations, including varying scenarios of conditions and with multiple traffic participants. While prior art systems respond mainly to single object information, the present inventive system is able to take different traffic participants and their relationships relative to each other into account. The system allows for accurate execution with a robust and accurate operations technical structure. The present system is capable of taking all spatial and temporal dependencies into account, including multiple, interacting traffic participants. Furthermore, the provided maneuver recognition provides robustly predicted vehicle's trajectories, for example, even during performance in real time, while driving within dynamic traffic maneuvers, which can be used not only for risk measurements and predictions but also for the implementation of advanced driver assistance systems (ADAS). The invention has the additional advantage, that a maneuver is structured and implemented broadly, as whatever driver operation has to be captured, technically having a clear and unambiguous semantic meaning. Typical maneuvers are, for example, lane change, overtaking, deceleration, etc. Based on the discussed structure, each maneuver can be hierarchically specialized by the system so as to identify specific operations. This has, e.g., the advantage that a car overtaking or cyclist can be measured making it possible to differentiate a real passing maneuver (possibly encroaching on the opposite lane) from a slightly pronounced swerve (moving away from the right edge of the lane, let's say, at most 1 meter); similarly, fast lane changes as opposed to slow lane changes, and the like. As mentioned from the technical point of view, each maneuver is hierarchically specialized so as to identify specific operations. This technical specialization is particularly important to allow for the automated identification of driver characteristics, which in turn is used by the system to illustrate by physical measurements the driver's risk potential and crash attitude. Within this application, risk is defined as a real-world, physical, i.e. instrumentally measurable, measure or quantity, which gives the reproducibly measurable actual (real-world) probability of failure. This must be differentiated from risk taking as a business method as engaged in by certain professions, which is by definition not related to any instrumental or technical measurement and which is not a reproducible physical quantity in the technical sense, or an equivalent martingale measure, i.e. risk-neutral measures. Further, the invention allows for technically differentiating and measuring maneuvers in a contextual correlation or in the context of other pattern dependencies: First of all, true maneuvers, such as, for example, the overtaking of a car, and maneuvers with analogous patterns but not the same level of risk, such as passing a cyclist, where typically the opposite lane must not be encroached upon. Secondly, contextual parameters, such as road type, where, for example, on a highway, fast overtaking will surely be completed in less time than overtaking another care on a country road. Finally, the system also allows for differentiating between caution and safety as important parameter measures. For instance, slow overtaking ruled by excessive caution or insecurity is surely much more dangerous than an excessively fast overtake maneuver, as it is likely to provoke dangers on both the lanes, and, in any case, irritating neighboring drivers. Thus, such a differentiation has a direct impact on the measured risk, and the system must be able to provide the technical means to measure this impact.

The drivers' risk potential and crash attitude can, e.g., be measured based on the automatically individuated driver maneuvers within various measured car trajectories. The risk measurements and/or crash attitude measurements can, e.g., be at least based on driver characteristics' parameters extracted from the driver maneuvers identification of the sequential patterns of the captured telematics data. Driver maneuvers identification can, e.g., be further triggered by captured contextual measuring parameters. This embodiment variant has, inter alia, the advantages as discussed above. The captured contextual measuring parameters can, e.g., at least comprise road type measuring parameters and/or weather measuring parameters and/or daytime measuring parameters. The risk measure parameters and/or crash attitude measure parameters can, e.g., comprise a contextual measuring parameter optimum point, while the captured contextual measuring parameters are varying, while increasing on both sides of the optimum point. The selected templates can, e.g., be filtered by providing template averaging by means of coupled filters that will remove artifacts and individual singularities, identifying each template as specific for the single captured maneuver. The coupled filters can, e.g., be dynamically adapted by the system to a measured generalization threshold value, at which all different phenotypical representations of the selected reference maneuver from the first and second data store are captured. The captured driver maneuvers can, e.g., be automatically individuated within the various car trajectories provided by the matched searchable measuring parameter sets of driving maneuvers and the measured pattern templates of driving maneuvers, wherein the system comprises predefined individuating recognizers, which are automatically, while discriminating between the various possible maneuvers by returning the portions of vehicle trajectories, most accurately matching them upon inputting a selected set of templates. Finally, the system can be enabled to provide measuring parameters for discriminating driver behaviors and risks by relating underlying crashes or near-crash trajectories based on the individuated car trajectories. Thus, the inventive system is capable of providing a reliable automated identification of suitable recognizers, which, by input of a measured set of templates, are capable of discriminating between various maneuvers, returning that portion of the trajectories accurately matching them. This means, the system is capable of automatically individuating, within the various car trajectories, driver maneuvers which, in a later stage of the process, will provide necessary and sufficient information for discriminating driver behaviors and risk potentials in the light of underlying crashes or near-crash measured data sets. In this context, it is worth noting that globally more than a million deaths are caused by road accidents per year. The WHO (World Health Organization) has forecast that road accidents will become the fifth leading cause of death by 2030. Research has proven that, in more than 50% of road accidents, unsafe or incorrect driving behaviors were to blame for an accident. Road accidents may be attributed to different factors, but incorrect driving behavior is one of the leading causes.

In the prior art, there are different solutions for monitoring a vehicle and the driver's behavior. However, these solutions are expensive and typically target fleet management systems. However, the increasing presence of smartphones and mobile phones with their variety of sensors allows for implementing vehicle monitoring systems on a large scale. Typically, modern smartphones and mobile phones have different, permanent monitoring sensors, such as, for example, accelerometers, gyroscopes, global positioning system (GPS), light, proximity and magnetic sensors, microphones and cameras. These sensors allow for the implementation of sensing applications. As mentioned, vehicle monitoring can be used in many important sensing applications for mobile phones, such as, for example, drivers can be monitored to make them aware of any potentially dangerous driving behavior. However, the implementation of this technology is halted by many technical obstacles, such as the afore-mentioned limited availability of sensory data for smartphones, limited energy and data processing resources offered by smartphones, and imprecise or superimposed sensory data. These technical problems are overcome by the present invention, thus allowing for automated driving maneuver recognition as well as driving behavior classifications based solely on the use of smartphones or mobile phones. The system is able to detect various maneuvers and classify the driver's behavior based on the detected driving maneuvers. These different systems demonstrate the variety of possible driving behavior classifications. Thus, a person's driving style can be classified as safe or risky, fuel-efficient or fuel-inefficient, skilled or unskilled; even recommendations can be provided accordingly to improve driving habits in the sense of emulating an expert system. The invention provides complete driver behavior monitoring systems for smartphones. The system can detect and classify a number of driving maneuvers and styles of driving, such as, e.g., aggressive and non-aggressive, if placed in a vehicle, by solely using the smartphones' internal accelerometer, gyroscope and/or magnetometer and GPS. However, the system is not only capable of identifying driving maneuvers and styles, but, above all, it is also capable of measuring levels of certain driving styles and maneuvers, such as, for example, the driver's level of aggressiveness or skill.

As an embodiment variant, said coupled filters can, at a minimum, comprise a Gaussian filter and/or moving averages and/or a median filter, wherein each template is made specifically for a single maneuver by using the coupled filters. This has, inter alia, the advantage that the templates' averaging coupled with filters, such as the Gaussian filter, moving averages, median filter, and so forth, allow for making each template specific to the single maneuver, whereby guaranteeing a level of generalization that is great enough so as to capture all different phenotypical representations of the reference maneuver.

Related to a possible scoring modality, the variable driving scoring parameter can, e.g., at a minimum, be based upon the measured and recognized driver's maneuvers, measures of the driver's behavior parameters, comprising speed and/or acceleration and/or braking and/or cornering and/or jerking, and/or a measure of distraction parameters and comprising mobile phone usage while driving and/or a measure of fatigue parameters and/or drug use parameters. The variable contextual scoring parameter can, e.g., at a minimum, be based upon measured trip score parameters reliant on road type and/or number of intersections and/or tunnels and/or elevations and/or measured time of travel parameters and/or measured weather parameters and/or measured location parameters and/or measured distance driven parameters. The variable vehicle safety scoring parameter can, e.g., at a minimum, be based upon measured ADAS feature activation parameters and/or measured vehicle crash test rating parameters and/or measured level of automation parameters of the motor vehicle and/or measured software risk scores parameters. The plurality of individualized risk transfer profiles provided by the automated risk transfer supplier systems can vary, e.g., time-dependently, based on the measured driving maneuvers and/or time-dependent use and/or style and/or environmental condition of driving by means of the triggered, captured, and monitored operating parameters or environmental parameters during the operation of the motor vehicle. The automated risk transfer supplier systems can comprise associated automated first risk transfer systems to provide a first risk transfer based on first risk transfer parameters from the motor vehicle to the respective first risk transfer system, wherein the first risk transfer system comprises a plurality of payment transfer modules configured to receive and store first payment parameters associated with the risk transfer of the risk exposures of said motor vehicle for the purposes of risk pooling. The risk-relevant parameters of the shadow request can, e.g., at a minimum, comprise parts of the generated single or compound set of variable scoring parameters and/or at least parts of the usage-based and/or user-based and/or operating telematics data captured by means of the mobile telematics device. The one or more wireless connections or wired connections of the vehicle embedded telematics devices (OEM line fitted) can, e.g., comprise Bluetooth or Bluetooth LE and/or Wi-Fi and/or WiMAX and/or a laser-based high-speed wireless connection, for example, using a light-bulb-shaped detector with orthogonal frequency-division multiplexing as a wireless connection for exchanging data using short-wavelength UHF (Ultra high frequency) radio waves in the ISM (industrial, scientific and medical) radio band from 2.4 to 2.485 GHz by building a personal area network (PAN) with the onboard Bluetooth capabilities or Bluetooth LE (Low Energy) and/or 3G or 4G and/or GPS and/or GPRS and/or BT based on Wi-Fi 802.11 standard and/or WiMAX, and/or using a contactless or contact smart card, and/or an SD card (secure digital memory card) or another interchangeable non-volatile memory card.

As a further embodiment variant, a mobile cellular phone may serve as a mobile telematics device comprising integrated or having access to the sensors and measuring devices and/or vehicle-embedded telematics devices and/or onboard diagnostic system and/or in-car interactive device, e.g., comprising proprioceptive sensors and/or measuring devices for sensing the operating parameters of the motor vehicle and/or exteroceptive sensors and/or measuring devices for sensing the environmental parameters during the operation of the motor vehicle. The onboard sensors and measuring devices can, e.g., comprise at least a GPS module (global positioning system) and/or a geological compass module based on a 3-axis teslameter and a 3-axis accelerometer and/or gyrosensor or gyrometer and/or a MEMS accelerometer sensor comprising or consisting of a cantilever beam, with the seismic mass as a proof mass measuring the proper or g-force acceleration, and/or a MEMS magnetometer or a magnetoresistive permalloy sensor or another three-axis magnetometer. The defined risk events associated with transferred risk exposure of the motor vehicle can, for example, at a minimum, comprise transferred risk exposure related to liability risk transfers for damages and/or losses and/or delay in delivery, wherein the occurred loss is automatically covered by the first risk transfer system on the basis of the first risk transfer parameters and correlated first payment transfer parameters (if a requested risk transfer is not rejected by the system at this time). The exteroceptive sensors or measuring devices can, for example, comprise at least radar devices for monitoring the surrounding area of the motor vehicle and/or LIDAR devices for monitoring the surrounding area of the motor vehicle and/or global positioning systems or vehicle tracking devices for measuring the positioning parameters of the motor vehicle and/or odometrical devices for complementing and improving the positioning parameters as measured by the global positioning system or vehicle tracking devices and/or computer vision devices or video cameras for monitoring the surrounding area of the motor vehicle and/or ultrasonic sensors for measuring the position of objects close to the motor vehicle. For providing the wireless connection, the mobile telecommunications apparatus can, e.g., act as a wireless node within a corresponding data transmission network by means of the antenna connections of the telematics devices embedded in the vehicle (OEM line fitted), in particular mobile telecommunications networks, such as, e.g., 3G, 4G, 5G LTE (long-term evolution) networks or mobile WiMAX or other GSM/EDGE- and UMTS/HSPA-based network technologies, etc. and, more particularly, with appropriate identification means as SIM (subscriber identity module) etc. The mobile telematics device can, e.g., be connected to an onboard diagnostics system and/or an in-car interactive device, wherein the mobile telematics devices capture usage-based and/or user-based and/or operational telematics data of the motor vehicle and/or user. Further, the mobile telematics devices can, e.g., be connected to an in-car interactive device and/or onboard diagnostics system, wherein the vehicle's speed and travel distances are monitored by a global positioning system (GPS) circuit, and wherein the telematics data are transmitted via the mobile telematics device or the cellular phone as mobile telematics device to the central, expert-system based circuit by means of a cellular telecommunications connection. The mobile telematics devices can, e.g., provide the one or more wireless connections by means of radio data system (RDS) modules and/or positioning systems, including a satellite receiving module and/or a mobile cellular phone module, a digital radio service module and/or a language unit in communication with the radio data system or the positioning system or the cellular telephone module. The satellite receiving module can, e.g., comprise a global positioning system (GPS) circuit, and/or the digital radio service module comprises at least a global system for a mobile communications (GSM) unit. The plurality of interfaces of the mobile telecommunications apparatus for connection with at least one of a motor vehicle's data transmission busses can, e.g., comprise at least one interface for connection with a motor vehicle's controller area network (CAN) bus, e.g., in connection with an onboard diagnostics (OBD) port or another connection, e.g., for battery-installed devices, or also OEM (Original Equipment Manufacturer) installed systems that get information access to onboard sensors or entertainment systems (such as, e.g., Apple Carplay, etc.) providing the necessary vehicle sensor information.

The dynamic time warping-based telematics circuit can further comprise an aggregation module providing the risk exposure for one or a plurality of the pooled risk-exposed motor vehicles based on the captured risk-related telematics data, wherein the first and second risk transfer parameters and the correlated first and second payment transfer parameters are dynamically generated based on the likelihood of the occurrence of the predefined risk events of the pooled motor vehicles. In addition, the occurred and triggered losses can be automatically aggregated by means of captured loss parameters of the measured occurrence of risk events over all risk-exposed motor vehicles within a predefined time period by incrementing an associated stored aggregated loss parameter and, for automatically aggregating the received and stored first payment parameters over all risk-exposed vehicles within the predefined time period, by incrementing an associated stored, aggregated payment parameter, and wherein the variable first and second risk transfer parameters and the correlated first and second payment transfer parameters are dynamically generated based upon the ratio of the aggregated loss parameter and the aggregated payment parameter. The first and second risk transfer system can, e.g., be fully automatically steered, triggered, signaled and mutually activated by means of the dynamic time warping-based telematics circuit, wherein the steering, triggering, signaling and activating is based on the dynamically adaptable first and second risk transfer parameters and the correlated first and second payment transfer parameters, providing a self-sufficient risk protection for the variable number of motor vehicles associated with the dynamic accident causation and accident risk measuring system and the platform by means of the coupled first and second risk-transfer system. In the context of the first- and second risk-transfer tier, the first risk transfer system can, e.g., comprise an automated first resource pooling system and the second risk-transfer system comprises an automated second resource pooling system, wherein the risk-exposed motor vehicles are connected to the first resource pooling system by means of a plurality of payment transfer modules that are configured to receive and store first payments from the risk-exposed motor vehicles for the pooling of said risk exposures, wherein the first risk transfer system provides automated risk protection for each of the connected risk-exposed motor vehicles based on received and stored first payment parameters, wherein the first risk transfer system is connected to the second resource pooling system by means of second payment transfer modules configured to receive and store second payment parameters from the first insurance system for accepting a portion of the risk exposure accumulated by the first risk transfer system, and wherein, in the case of the occurrence of one of defined risk events, the occurred loss is automatically covered by the expert system-based automotive car system.

The present invention is capable of providing an automated risk transfer system for all kinds of risk transfer schemes, such as, e.g., motor or product liability (re-)insurance systems and/or risk-transfer systems related to or depending on partially or fully automated vehicles. Also, the present invention provides a holistic and unified, automated technical approach for coverage of the motor vehicles in all different structures of the risk transfer, such as, e.g., product liability for car and/or technology manufacturers and driver liability coverage. Further, the present invention also provides a holistic technical solution that covers the whole range from automotive control circuits and/or telematics devices and/or app installations to automated and accurate risk measurement, analysis and management. Finally, it is capable of providing dynamic real time scoring and measurements, and, furthermore, provides a technically scalable solution based on scoring algorithms and data processing that allows for the adaptation of the signaling to other fields of automated risk transfer. The present invention, which is enhanced by contextual data, is capable of providing the best and highest optimized technical solution to the real-time adapted multi-tier risk transfer systems. It allows for capturing and controlling the driver's scored behavior and compare it behavior within the technical operation and context. It allows for automatically capturing risk scores according to location or trip, and for automatically analyzing and responding to data related to the need for value-added services, such as, e.g., accident notifications and/or warnings/coaching feedback to the driver and/or automated fleet risk reporting and/or automated and dynamically optimized underwriting etc.). In an embodied variant, the score driving module can, e.g., automatically capture score risks according to a measured maintenance status (e.g., maintenance failure by owner) and a surveillance factor extracted from the automotive data associated with the motor vehicle or the use of active safety features. The telematics-based feedback means of the system may, e.g., comprise a dynamic alert feed via a data link to the motor vehicle's automotive control circuit, wherein the central, expert system-based circuit signals device alerts to drivers immediately to a number of performance measures, including, e.g., high RPM, i.e. high revolutions per minute as a measure of the frequency of the rotation of the motor vehicle's engine, unsteady drive, unnecessary engine power, harsh acceleration, road anticipation, and/or ECO drive and/or harsh braking and/or fast lateral road entries and/or left and right overtaking and/or tailgating and/or speeding/reckless driving (e.g., overtaking ahead of curves) and/or running red lights (vehicle-to-infrastructure (V2I) technology) and/or unsafe lane changes and/or wrong-way driving and/or distraction (more accurate with connected car data) and/or driving while drowsy, etc. The dynamic accident causation and accident risk measuring system provides opportunities for risk-adaption and improvement dynamically and in real time, i.e. as and when they happen, related to the motor vehicle's risk patterns (e.g., location, speed, etc.). Providing instant feedback to drivers through heads-up training aids and information that is sent straight to the mobile telematics device, ensures a two-pronged approach to correcting risky (and often expensive) driving habits. Thus, the dynamic accident causation and accident risk measuring system not only allows for optimizing the operational parameters of the first and second risk transfer system, but also optimizes the risk and/or risk behavior on the level of the risk-exposed motor vehicles. No prior art system offers such an integral optimization in real time. As another value-added service, the automotive car system can, e.g., dynamically generate fleet risk reports of selected motor vehicles. Such fleet reports, automatically generated by the automotive car system, provide a new approach to sharing and comparing vehicles' statistics. The proposed invention with, e.g., prefunding automotive enabled risk transfer ((re)insurance) means will motivate carriers (first-tier risk transfer systems) to provide automotive data and claims' histories to the second-tier risk transfer system in order to continually improve the scoring service, which in turn benefits carriers in helping reduce costs and the combined ratio between the systems.

In one alternative embodiment, the dynamic time warping-based telematics circuit comprises a table with stored categorization trigger parameters for triggering a predefined level of scores, wherein the first and second risk transfer parameters and the correlated first and/or second payment transfer parameters are dynamically adapted and/or accumulated by means of the central, expert system-based circuit based on the triggered categorization of the driven motor vehicles during usage and based upon the usage-based and/or user-based and/or operational automotive data captured from the plurality of driven motor vehicles. This embodiment has, inter alia, the advantage that it allows for providing a new and unified approach for dealing with automated risk transfer relative to risk-associated and risk-exposed motor vehicles, by considering dynamically measured, usage-based parameters, allowing for a novel optimization on the level of the risk-exposed vehicle as well as on the level of the operational pooling of the risk exposure of the first and/or second risk transfer system(s).

In one alternative embodiment, the driving score module triggers and automatically selects score driving parameters based on defined score driving behavior patterns by comparing captured telematics data with the defined score driving behavior pattern. The score driving module can further, e.g., automatically capture score risks according to the measured location or trip of the motor vehicle based on the captured telematics data of the mobile telematics device. This alternative embodiment has, inter alia, the advantage that it allows for providing a real time-adapted multi-tier risk transfer system. Further, it allows for capturing and/or controlling the score driving behavior (also in the sense of location, time, road, etc. and of the driving behavior), and compare behaviors within the technical operation and context. It allows for automatically capturing score risks according to location or trip, and for automatically analyzing and responding to data related to the need for added services, such as, e.g., accident notifications).

In one alternative embodiment, the central, expert system-based circuit comprises additional triggers that output accident notifications and/or other added services based on the captured telematics data. This alternative embodiment has, inter alia, the advantage that the system is capable of providing extended benefits to the customer based on additionally generated signaling.

In another alternative embodiment, the switching device comprises capturing means for capturing a transfer of payment from the first risk transfer system to the second payment transfer module, wherein the second layer trigger structure of the system is activatable by triggering a payment transfer that matches a predefined activation threshold parameter. In another embodied variant, in the case of triggering a loss associated with the occurrence of the defined risk events, a predefined portion of the occurred loss is covered by the second insurance system, based on the second risk transfer parameters and correlated second payment transfer parameters. Thus, the present invention can be implemented with a proportional or a non-proportional risk-transfer as a coupling mechanism between the first and second risk transfer systems; wherein, under a proportional risk-transfer coupling, the second risk-transfer system is activated by means of the switching device via a fixed percentage share of each risk transferred to the first risk transfer system, respectively, for each loss transferred to the risk-transfer system. Accordingly, the second risk-transfer system receives this fixed payment transfer from the first risk transfer system via the second payment parameters. Under a non-proportional risk-transfer coupling, in case of the triggering of an excess of a defined activation threshold parameter associated with the occurrence of the defined risk event, the occurred loss is at least partly covered by the second insurance system, based on the second risk transfer parameters and correlated second payment transfer parameters. The activation threshold can be associated with each single loss occurred or the accumulated loss measured by means of the aggregated loss parameter. Thus, the non-proportional coupling can be implemented in an excess of loss or stop loss risk-transfer structure, wherein the excess of loss structure can, e.g., be based on a per risk XL (Working XL), per occurrence/per event XL (Catastrophe or Cat XL) or aggregate XL structure. As a more particular alternative embodiment, a periodic payment transfer from the risk exposure components to the resource pooling system via a plurality of payment receiving modules is requested by means of a monitoring module of the resource-pooling system, wherein the risk transfer or protection for the risk exposure components is interrupted by the monitoring module, when the periodic transfer is no longer detectable via the monitoring module. As an alternative, the periodic payment transfer request can be interrupted automatically or waived by the monitoring module, when the occurrence of indicators of a risk event is/are triggered in the data flow pathway of a risk exposure component. These alternative embodiments have, inter alia, the advantage that the system allows here for further automation of the monitoring operation, especially regarding the operation with regard to the pooled resources.

In another alternative embodiment, an independent verification risk event trigger of the first and/or second resource pooling system is activated in cases when the occurrence of indicators for a risk event is triggered in the data flow pathway of the mobile telematics device or the dynamic time warping-based telematics circuit by means of the risk event trigger, and wherein the independent verification risk event trigger additionally issues a trigger in the event of the occurrence of indicators regarding risk events in an alternative data flow pathway with independent measuring parameters from the primary data flow pathway, e.g., of alternative telematics devices, in order to verify the occurrence of the risk event at the risk-exposed automotive motor vehicle. In this alternative, the transfer of payments is only assigned to the corresponding risk-exposed motor vehicle if the occurrence of the risk event at the risk exposure component is verified by the independent verification risk event trigger. These alternative embodiments have, inter alia, the advantage that they help improve the operational and financial stability of the system. In addition, the system is rendered less vulnerable to fraud and counterfeit.

In another alternative embodiment, the first insurance system comprises an interface module for accessing and adapting the assigned operational parameters prior to the transfer of the payment parameters from the first resource pooling system to the second resource pooling system. This alternative embodiment has, inter alia, the advantage that the risk transfer structure can be dynamically adjusted and, moreover, selected and/or additionally optimized directly by the first insurance system or the second insurance system.

In still another alternative embodiment, the dynamic time warping-based telematics circuit comprises means for processing risk-related maneuver recognition data and driving motor vehicle data and for providing data regarding the likelihood of said risk exposure relative to one or a plurality of the pooled risk-exposed motor vehicle(s); in particular, based on the risk-related motor vehicle data, and wherein the receipt and preconditioned storage of payments from the risk exposed motor vehicles for the pooling of their risks can be dynamically determined based on the total risk and/or the likelihood of risk exposure of the pooled risk-exposed motor vehicles. This alternative embodiment has, inter alia, the advantage that the operation of the first and/or second resource pooling system can be dynamically adjusted to changing conditions in relation to the pooled risk, such as if there is a change of the environmental conditions or risk distribution, or the like, of the pooled motor vehicles. A further advantage is that the system does not require any manual adjustments, when it is operated in different environments, places or countries, because the size of the payments of the risk-exposed motor vehicles is directly related to the total pooled risk. However, it is important to note that the present invention does not necessarily have to result in adjusted pricing or premiums. For example, it could also automatically provide coupons to automated motor vehicles that are driven in low risk regions, or that nothing at all changes but that the system uses the automotive data to automatically decide if the risk transfer is continued the following year. The present invention can also be used exclusively for automatically providing and activating adapted and/or specifically selected value-added services, such as, e.g., accident notifications and/or feedback to the motor vehicle or driver and/or automated fleet risk reporting and/or automated and dynamically optimized underwriting, etc. Thus, the present invention allows an adaption of the risk of the first risk transfer tier or system as well as risk on the level of the insured motor vehicle (e.g., by risk-based driver feedback in real time) and/or the second risk transfer tier or system. There is no prior art system, allowing such an optimization and/or adaption. The feedback can, e.g., be generated by comparing the motor vehicle's profile and pattern with other motor vehicle's profiles or patterns at the same location and/or under comparable conditions.

In one alternative embodiment, the system comprises means for processing risk-related component data and for providing information regarding the likelihood of said risk exposure for one or a plurality of the pooled risk exposed motor vehicles, in particular, based on risk-related motor vehicle data, and wherein the receipt and preconditioned storage of payments from the first resource pooling system to the second resource pooling system for the transfer of risk can be dynamically determined based on the total risk and/or the likelihood of the risk exposure of the pooled risk exposure components. This alternative embodiment has, inter alia, the advantage that the operation of the first and/or second resource pooling system can be dynamically adjusted to changing conditions of the pooled risk, such as changes of the environmental conditions or the risk distribution, or the like, of the pooled risk components. A further advantage is the fact that the system does not require any manual adjustments, when it is operated in different environments, places or countries, because the size of the payments of the risk exposure components is directly related to the total pooled risk.

In one alternative embodiment, the number of pooled motor vehicles is dynamically adjusted via the first risk transfer system to a range where non-covariant, occurring risks that are covered by the risk transfer system impact only a relatively small proportion of the total pooled risk exposure components at any given time. Analogously, the second risk-transfer system can, for example, dynamically adjust the number of pooled risk shares transferred from the first risk transfer systems to a range where non-covariant, occurring risks that are covered by the second risk transfer system impact only a relatively small proportion of the total pooled risk transfers from the first risk transfer system at any given time. This variant has, inter alia, the advantage that it can improve the operational and financial stability of the system.

In one alternative embodiment, the risk event triggers are dynamically adjusted by means of an operating module based on time-correlated incidence data for one or a plurality of the predefined risk events. This alternative embodiment has, inter alia, the advantage that improvements in capturing risk events or avoiding the occurrence of such events, for example, by improved forecasting systems, etc., can be dynamically captured by the system and dynamically impact the overall operation of the system based on the total risk of the pooled risk exposure components.

In another alternative embodiment, upon each triggering of an occurrence, where parameters indicating a predefined risk event are measured by means of at least one risk event trigger, a total parametric payment is allocated with the triggering, and wherein the total allocated payment is transferrable upon a triggering of the occurrence. The predefined total payments can, for example, be leveled to any appropriately defined total sum, such as a predefined value, or any other sum related to the total transferred risk and the amount of the periodic payments of the risk-exposed motor vehicle. This alternative has, inter alia, the advantage that the parametric payments or the payments of predefined amounts can rely on fixed amounts. Further, the parametric payment may allow for an adjusted payment of the total sum that can, for example, be dependent on the stage of the occurrence of a risk event, as triggered by the system.

BRIEF DESCRIPTION OF THE DRAWINGS

The present invention will be explained in more detail by way of examples with reference to the drawings in which:

FIGS. 9, 9a1, 9a2, 9a3, 9a4, and 9a5, 9b1, 9b2, 9b3, 9b4, and 9b5, FIGS. 9c1, 9c2, 9c3, 9c4, and 9c5 shows diagrams schematically illustrating in an exemplary manner the interpolating function of degree $\delta=4$ on a portion of the trajectory, together with its first four derivatives. The first row shows the trajectories in the bi-dimensional plane, having considered as units of measure meters and seconds. The last two rows show the projection of the interpolating function, respectively, on the first and second coordinates vs. time. The track refers to the top right corner of the trajectory depicted in FIG. 8.

DETAILED DESCRIPTION OF THE PREFERRED EMBODIMENTS

Figure 1:
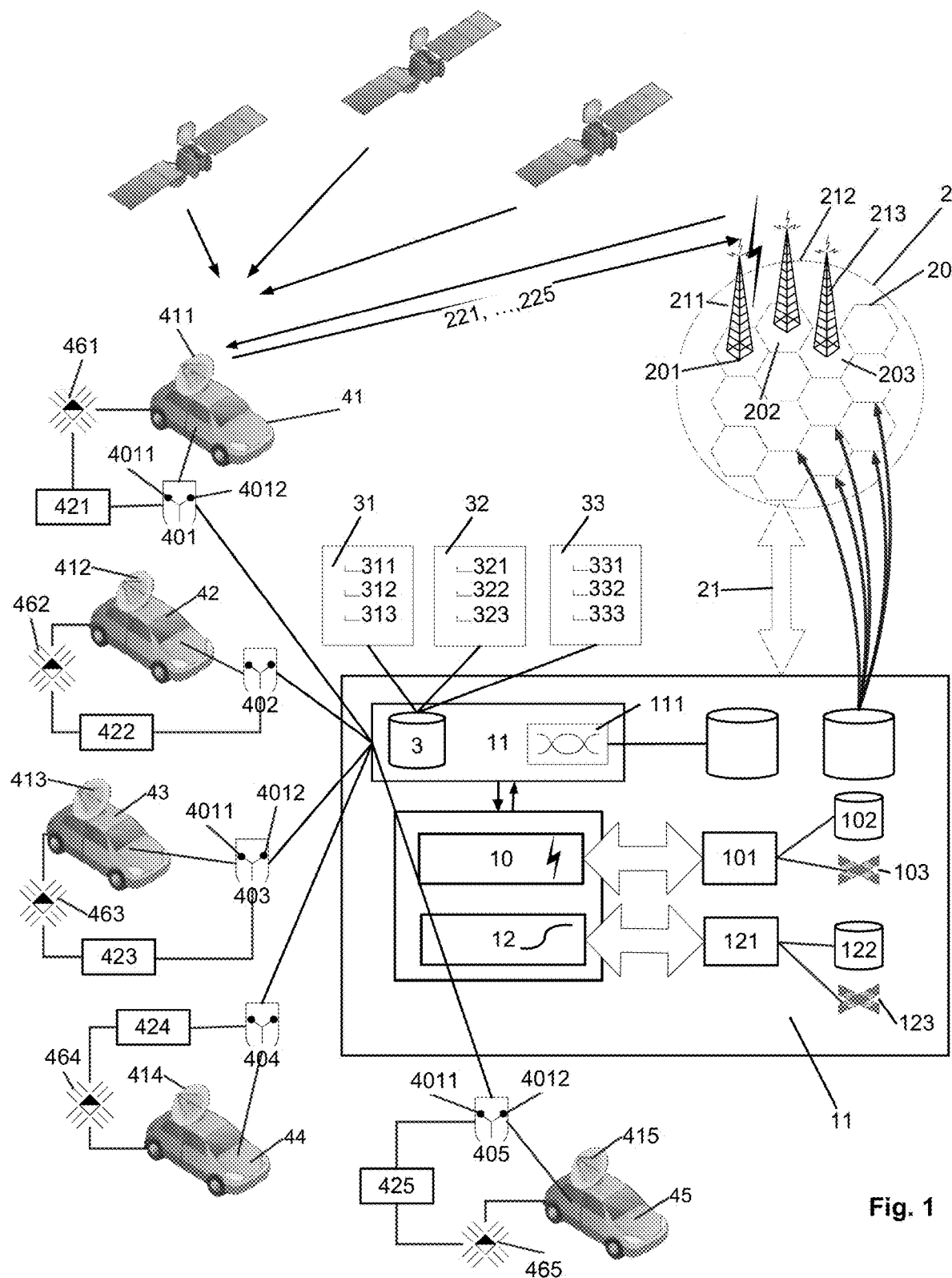
FIG. 1 shows a block diagram schematically illustrating an electronic, real-time maneuver detection system and a dynamic accident causation and accident risk measuring system, respectively, based on dynamically measured telematics data 3, wherein driver behaviors and operational parameters are measured and discriminated by means of the system based on automatically individuated and isolated driver maneuvers within various measured vehicle trajectories. An output signal is generated based upon derived risk measure parameters and/or crash attitude measure parameters. Mobile telematics devices are associated with a plurality of the motor vehicles 41, . . . ,45, the telematics devices comprising one or more wireless or wired connections 411, . . . ,415 and a plurality of interfaces 421, . . . ,425 for connection with at least one of a vehicle's data transmission bus and/or a plurality of interfaces for connection with sensors and/or measuring devices 401, . . . , 405. For providing the wireless connection 411, . . . ,415, the telematics device acts as wireless node 221, . . . , 225 within a corresponding data transmission network 2 by means of antenna connections of the telematics device. The telematics devices are connected to an onboard diagnostics system and/or an in-car interactive device and/or a monitoring cellular mobile node application. The telematics devices 401, . . . ,405 capture usage-based 31 and/or user-based 32 and/or operation-based 33 telematics data 3 of the motor vehicle 41, . . . ,45 and/or usage-based automotive data of the vehicles 311, . . . ,313, and/or user-based automotive data of the vehicles 321, 322, 323, and/or operational data of the control system 331, . . . ,333.
Figure 2:
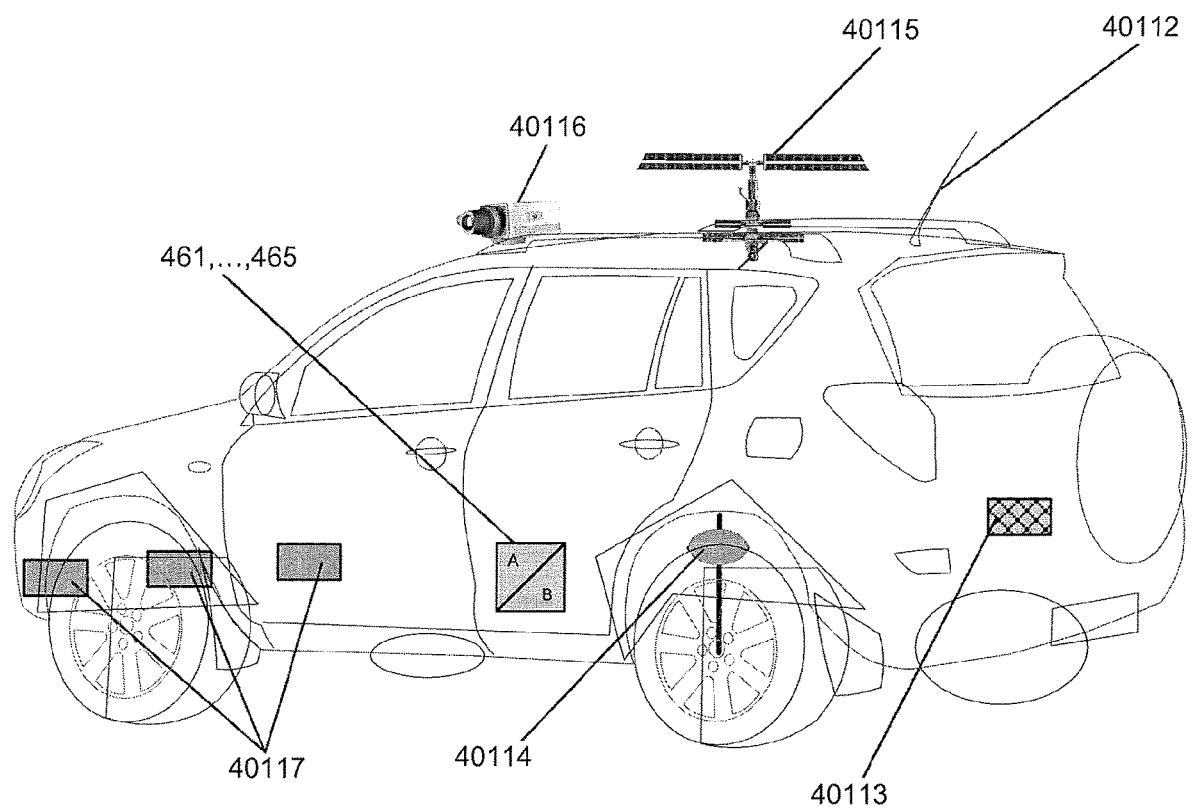
FIG. 2 shows, schematically, an exemplary autonomous driving motor vehicle 41, . . . ,45 with exemplary onboard sensors and measuring devices 401, . . . , 405, i.e. the sensory data captured by exteroceptive sensors or measuring devices 4011, the proprioceptive sensors or measuring devices 4012, and mobile telematics devices 411, . . . , 415. Related to the exteroceptive sensors or measuring devices 4011, reference number 40112 denotes a global positioning system GPS (combined with measuring data from odometers, altimeters and gyroscopes providing an accurate positioning in space), reference number 40113 denotes ultrasonic sensors (measuring the position of objects very close to the motor vehicles 41, . . . ,45), reference number 40114 denotes odometry sensors (complementing and improving GPS information), reference number 40115 a LIDAR (light detection and ranging) measuring device (monitoring the vehicle's surrounding areas, such as, e.g., roads, other vehicles, pedestrians, etc.), reference number 40116 denotes video cameras (monitoring the vehicle's surrounding areas, such as, e.g., roads, other vehicles, pedestrians, etc. and reading traffic lights) and reference number 40117 denotes radar sensors (monitoring the vehicle's surrounding areas, such as, e.g., roads, other vehicles, pedestrians, etc.).

FIG. 1 schematically illustrates an architecture for a possible implementation of an embodiment of the electronic, real-time maneuver detection system based on dynamically measured telematics data 3, particularly further providing a dynamic accident causation and accident risk measuring system that measures driver behaviors and operational parameters, and discriminating the same by means of the system based on automatically individuating driver maneuvers within various measured vehicle trajectories and generating an output signal based upon derived risk measure parameters and/or crash attitude measure parameters. The driver maneuvers can be individuated by means of system. The individuated maneuvers can, in particular, comprise risky driving maneuvers, taking into account, for example, high RPM, i.e. high revolutions per minute as a measure of the frequency of the rotation of the motor vehicle's engine and/or unsteady drive and/or unnecessary engine power and/or harsh acceleration and/or road anticipation and/or ECO drive and/or harsh braking and/or fast lateral road entries and/or left and right overtaking and/or tailgating and/or speeding/reckless driving (e.g., overtaking ahead of curves) and/or running red lights (V2I technology) and/or unsafe lane changes and/or wrong-way driving and/or distraction (this is more precise via connected car data) and/or driving while drowsy etc. The electronic, real-time maneuver detection system responds in real time, dynamically and in response to captured environmental or operational parameters 3, in particular monitored and captured telematics parameters 3 of the motor vehicles 41, . . . ,45 during operation. The present invention is further capable of providing a telematics-based automated risk measuring, risk classification, risk transfer, alarm/alert and/or real-time notification system for motor vehicles 41, . . . ,45 and the wireless technology used in the context of telematics. Finally, the present system also provides telematics-based real-time expert systems that take all the spatial-temporal dependencies into account, including multiple interacting traffic participants. Furthermore, the automated maneuver recognition provides robustly predicted vehicle trajectories, for example, even performing in real time while driving and preforming dynamic traffic maneuvers, which can be used not only for measuring risk and predictions but also for implementing advanced driver assistance systems (ADAS). Thus, the inventive system provides a structure for the use of telematics, together with maneuver recognition in real time, related risk-monitoring and automated risk transfer systems, based on captured and measured usage-based and/ or user-based and/or operational telematics data 3. It is to be noted, that the system provides electronic driving maneuver recognition as well as driving behavior classification. The system can detect various maneuvers and, furthermore, recognize them and infer complex electronic signaling and steering tasks from them. In particular, system is capable of classifying a driver's behavior based on the detection of driving maneuvers and measure the intensity or other measures associated with a certain driving maneuver. The present invention provides a new technical arrangement for the automated recognition of driver behavior improving its functionality using technical approaches, such as simple thresholding or dynamic time warping (DTW) or heuristic methods. In embodied variants, the system is also implemented using a suitable supervised machine learning classifier, such as, e.g., maximum likelihood (ML) classifier techniques, to identify and classify driving maneuvers or suitable neural network (NN) approaches, such as convolutional NN, recurrent NN or even standard back propagation NN. In further variants, the system has also successfully been implemented using other functional data processing (FDA) techniques, in particular symbolic aggregate approximation (SAX) techniques or piecewise aggregate approximation (PAA) techniques. The implementation of the different technical approaches depends, at a minimum, on the captured data. However, in connection with the present inventive data cleaning process, in identifying maneuvers and classifying the severity thereof, dynamic time warping (DTW) may be a preferred choice.

The mobile telematics device can be at least partially implemented as part of a mobile phone device/mobile smart phone devices. In particular, the mobile telematics device can, at a minimum, be based mainly on integrated mobile phone telematics and/or OEM line-fitted telematics device (TCU) of the connected car or motor vehicles 41, . . . ,45. However, the captured sensory data can be based solely on measuring data from the accelerometer sensor 4011 and the global positioning system (GPS) sensor and/or the gyroscope sensor 4012 of a smartphone or mobile phone, thus, accommodating mobile telematics device and the sensors and measuring devices 401, 405, respectively, in the mobile phone/smartphone. However, the mobile telematics device can also be implemented in a broader sense, comprising on-device sensors and measuring devices 401, . . . ,405 and/or one or more data transmission connections to the onboard sensors and measuring devices 401, . . . , 405 of the motor vehicle 41, . . . ,45 and/or an onboard diagnostics system and/or an in-car interactive device of a motor vehicle 41, . . . ,45. The sensors and measuring devices 401, . . . , 405 and/or the onboard diagnostics system and/or the in-car interactive device comprise proprioceptive sensors 4021 for sensing operating parameters of the motor vehicle 41, . . . ,45 and/or exteroceptive sensors 4011 for sensing environmental parameters during the operation of the motor vehicle 41, . . . ,45. The exteroceptive sensors or measuring devices 4011 can, for example, comprise at least radar devices 40117 for monitoring surrounding areas of the motor vehicle 41, . . . ,45 and/or LIDAR devices 40115 for monitoring surrounding areas of the motor vehicle 41, . . . ,45 and/or global positioning systems 40122 or vehicle tracking devices for measuring positioning parameters of the motor vehicle 41, . . . ,45 and/or odometrical devices 40114 for complementing and improving the positioning parameters measured by the global positioning systems 40112 or vehicle tracking devices and/or computer vision devices 40116 or video cameras for monitoring the surrounding areas of the motor vehicle 41, . . . ,45 and/or ultrasonic sensors 40113 for measuring the position of objects close to the motor vehicle 41, . . . ,45. The proprioceptive sensors or measuring devices 4012 for sensing operating parameters of the motor vehicles 41, . . . ,45 can, at a minimum, comprise motor speed and/or wheel load and/or heading and/or battery status data of the motor vehicles 41, . . . ,45. The one or more wireless connections or wired connections 4211 of the mobile telematics devices can, e.g., comprise Bluetooth (IEEE 802.15.1) or Bluetooth LE (Low Energy) 42101 as wireless connection for exchanging data using short-wavelength UHF (Ultra high frequency) radio waves in the ISM (industrial, scientific and medical) radio band from 2.4 to 2.485 GHz by building a personal area networks (PAN) with the onboard Bluetooth capabilities and/or 3G and/or 4G and/or GPS and/or Bluetooth LE (Low Energy) and/or BT based on the Wi-Fi 802.11 standard and/or a contactless or contact smart card and/or an SD card (secure digital memory card) or another interchangeable non-volatile memory card.

For providing the wireless connection, the mobile telematics devices (and the mobile phone device/mobile smart phone devices, if the mobile telematics devices are implemented solely as an integrated part of a smartphone) can, e.g., act as a wireless node within a corresponding data transmission network by means of antenna connections, in particular, as afore-mentioned, mobile telecommunications networks, such as, e.g. 3G, 4G, 5G LTE (long-term evolution) networks or mobile WiMAX or other GSM/EDGE- and UMTS/HSPA-based network technologies etc., and, more particularly, with the appropriate identification means, such as SIM (subscriber identity module), etc. The mobile telematics devices can, e.g., be connected to an onboard diagnostic system and/or an in-car interactive device, wherein the mobile telematics devices capture usage-based 31 and/or user-based 32 and/or operational telematics data 3 of the motor vehicle 41, . . . ,45 and/or user. The mobile telematics devices can, e.g., provide the one or more wireless connections by means radio data systems (RDS) modules and/or positioning systems, including a satellite receiving module and/or a mobile cellular phone module including a digital radio service module and/or a language unit in communication the radio data system or the positioning system or the cellular telephone module. The satellite receiving module can, e.g., comprise a global positioning system (GPS) circuit, and/or the digital radio service module comprises at least a global system for a mobile communications (GSM) unit. The plurality of interfaces of the mobile telecommunications apparatus for connecting with at least one of a motor vehicle's data transmission busses can, e.g., comprise at least one interface for a connection with a controller area network (CAN) bus of the motor vehicle, e.g., in connection with an onboard diagnostics (OBD) port or another connection, e.g., for battery installed devices, or also OEM (Original Equipment Manufacturer) installed systems thereby achieving informational access to the onboard sensors or entertainment systems (such as, e.g., Apple Carplay, etc.) providing the necessary vehicle sensor information. The measured operating parameters and/or environmental parameters during the operation of the motor vehicle 41, . . . ,45 can, e.g., comprise time-dependent speed measurements and data regarding hard breaking, acceleration, cornering, distance, mileage (PAYD), short journey, time of day, road and terrain type, mobile phone usage (while driving), weather/driving conditions, location, temperature, blind spot, local driving, sun angle and dazzling sun information (sun shining in drivers' face), seatbelt status, rush hour, fatigue, driver confidence, throttle position, lane changing, fuel consumption, VIN (vehicle identification number), slalom, excessive RPM (Revolutions Per Minute), off-road driving, G forces, brake pedal position, driver alertness, CAN (controller area network) bus (vehicle bus) parameters, including fuel level, distance to other vehicles, distance to obstacles, driver alertness, activated/ usage of automated features, activated/usage of advanced driver assistance systems, traction control data, usage of headlights and other lights, usage of turn signals, vehicle weight, number of passengers, traffic sign information, number of crossed intersections, changing orange and red traffic lights, alcohol level detection devices, drug detection devices, driver distraction sensors, driver's aggressiveness, driver's mental and emotional state, dazzling headlights from other vehicles, vehicle door status (open/closed), visibility through windscreen, lane position, lane choice, vehicle safety, driver's mood, and/or passengers' mood, etc. Until now, no prior art system has been capable of processing such a variety of dynamically monitored, risk-relevant data. The advantage of the generated score parameters mirrors the captured sensory data in that the data components of the score can even, e.g., comprise as follows: customer policy details, individual driving data, crash forensics data, credit scores, statistical driving data, historic claims data, market databases, driving license points, statistical claims data, context data relative to weather or road conditions or the surrounding area.

If the mobile telematics devices are implemented solely as an integrated part of a smartphone; all measuring parameters and sensory data are captured by integrated sensors of the smartphone, in particular, solely based on measuring data from the accelerometer sensor 4011 and the global positioning system (GPS) sensor and/or the gyroscope sensor 4012. However, these sensory data are typically superimposed by additional independent movements of the smartphone within the vehicle 41, . . . ,45. For example, the vehicle's axes may be denoted as $x_v$, $y_v$ and $z_v$, where $x_v$ may be the lateral direction of the vehicle 41, . . . ,45, $y_v$ the longitudinal direction (middle of the vehicle 41, . . . ,45 to the front of the vehicle 41, . . . ,45 and $z_v$ the vertical direction to the driving plane of the vehicle 41, . . . ,45. The smartphone's axes may, for example, be denoted as $x_m$ pointing towards the right and $y_m$ to the top seen from the phone's frontal plane, while $z_m$ is orthogonal relative to the phone's frontal plane. In the prior art, the systems necessarily assumed that the axes of the measuring smartphone were aligned with the axes of the vehicle 41, . . . ,45. For the present system, which does not require such an alignment, measuring data from the smartphone's accelerometer therefore also has three axes independently of the axes of the vehicle 41, . . . ,45, which may be denoted as $x_a$, $y_a$ and $z_a$. Analogously, sensory data from the gyroscope has the three independent axes $x_g$, $y_g$ and $z_g$. Accelerometer sensory data can be expressed with respect to the acceleration from gravity, g (9.8 m/s$^2$), and gyroscope sensory data with respect to a rotation rate (rad/s). In the discussed embodied variant, the gyroscope, accelerometer and GPS of a smartphone are used accordingly to establish the required sensory information. The system is, for example, able to detect lateral maneuvers or turns and classify them by a certain measured intensity or strength level, or by other measures. Using only the three inputs of the system, namely the vehicle's lateral force of acceleration, rotation rate around its vertical axis and its forward velocity v, the system is be able to detect and classify, e.g., a turn. Taking in filtered and cleaned data (meaning, sensory data filtered and cleaned as described below), an end point detection unit can generate appropriate output signal vectors for the automated classification process of the system.

The plurality of mobile telematics devices (and smartphones, respectively) associated with the motor vehicles 41, . . . ,45 are connected to a dynamic time warping-based telematics circuit 10, wherein a data link 21 is arranged by means of the wireless connection 411, . . . ,415 between the dynamic time warping-based telematics circuit 10 transmitting at least the captured usage-based 31 and/or user-based 32 and/or operation-based 33 telematics data 3 from the mobile telematics devices to the dynamic time warping-based telematics circuit 10. For feature extraction, dataset import as early preprocessing steps of the dynamic time warping-based telematics circuit 10 are performed. There can be at least two main sources generating valid datasets, i.e. compatible with the technical processing provided by the present invention: (i) Comma-separated values (CSV) files obtained by Virginia Tech Transportation Institute (VTTI), i.e. files storing tabular data (numbers and text) in plain text parameters, and (ii) CSV files directly generated by the Android GPSLogger app. As for the former, in order to extract the main features used to characterize the driver's behavior, the inventive system is focused on the subset of VTTI original variables listed in table 1, below.

TABLE 1

| VTTI variables used in the system's foreground analysis | | | |
|---|---|---|---|
| variable | name | rate | Unit |
| timestamp | vtti.timestamp | n/a | Msec |
| GPS coordinates | vtti.latitude vtti.longitude | 1 Hz | Degrees |
| GPS speed | vtti.speed | 1 Hz | km/h |
| | GPS vtti.speed network | 10 Hz | km/h |
| acceleration (accelerometer) | vtti.accel x vtti.accel y vtti.accel z | 10 Hz | G |
| orientation (gyroscope) | vtti.gyro x vtti.gyro y vtti.gyro z | 10 Hz | deg/sec |
| GPS quality | vtti.pdop vtti.nr of satellite | 1 Hz | n/a |

Of these, the inventive approach is firstly concentrated on all but the last two items, leaving therefore in background GPS quality measures which, in any case, will be entered in the foregrounded process after careful inspection of their usefulness. The same variables were considered, subject to the availability of hardware sensors, when importing data from GPSLogger app, with the only proviso that speed network values be replaced with speed GPS values, with the app not having direct accessibility to the speedometer readings.

By means of the system, all the variables are firstly cleaned up by removing missing or spurious data and then converted in a homogeneous unit system, either expressed in terms of meters and seconds, or in terms of kilometers and hours. While this is typically a fast procedure for most of variables (simply by relying on the usual conversion formulae), a different approach is provided by the system for GPS coordinates. The system computes the horizontal distance between the first coordinate and each subsequent point to the geodesic distance, in the longitudinal direction, measured in meters (resp. kilometers). Analogously, the above procedure is repeated making the vertical distance coincide with the geodesic distance, in the latitudinal direction, expressed in the new unit system. This procedure is induced by the higher observed accuracy when comparing it with analogous conversion techniques that work directly with the whole vectors and connecting either the first location with subsequent ones or pairwise adjacent locations.

Subsequently, acceleration and orientation undergo a suitable process aimed at providing: i) a rough calibration, by subtracting from their values the observed trimmed mean measured at null speed (namely, when the car is stationary); ii) cleaning and smoothing the signals using a moving average filter, obtained by replacing each data point with the average of its neighboring points; iii) an adapted rotation of the three axes to identify the correct directions whenever the smartphone's local coordinate system does not coincide with the car's coordinate system. The latter point deserves an in-depth explanation. Concerning acceleration, the system relies on the principal component analysis in order to individuate the longitudinal direction (presumably with the maximum variance) and the lateral direction (maximizing the residual variance), assigning the minimum variance component to the vertical acceleration. Preliminary investigations seem to confirm the suitability of the chosen strategy. Unfortunately, the angular velocities captured by the orientation sensor do not exhibit similar preferential directions. Therefore, the system comprises the canonical correlation analysis with the aim of associating each identified acceleration component with the angular velocity, the linear combination maximizing the correlation with the former. The three orientation sensors then appear rotated in the directions which best "matches" the corresponding acceleration axes. Note that, considering the documented unreliability of GPS-measured altitudes, it is avoided, at first, to process the z coordinate of acceleration with the system; in the meantime, investigating the role that altitude changes may have in the currently extracted features (for example, done by recording tracks through the GPSLogger app on mountain streets). Finally, in order to improve the quality of position and speed interpolation, the system relies on imputation by linear interpolation to replace missing values, grounding on their low frequency of occurrence and temporal sparsity, and consequently on the small rate of change of the queried signals.

In a second step, the cleaning of GPS coordinates is performed by the system, since several factors affect the accuracy of GPS positioning, such as, for example, the GPS receiver unit quality (antenna, number of channels, position algorithms), the position of the satellites at the recording time, the characteristics of the surrounding landscape (reflections, enclosed spaces, atmospheric effects, obstructions in the sky), some pre-processing steps aimed at cleaning up GPS coordinates from quantization and other kinds of noise being adopted. The cleaning can be subdivided into the following 5 categories: (1) Cycle removal; (2) Spurious path removal; (3) Closed-range position handling; (4) Straight road identification and projection; and (5) Curvilinear road identification and projection.

Figure 3:
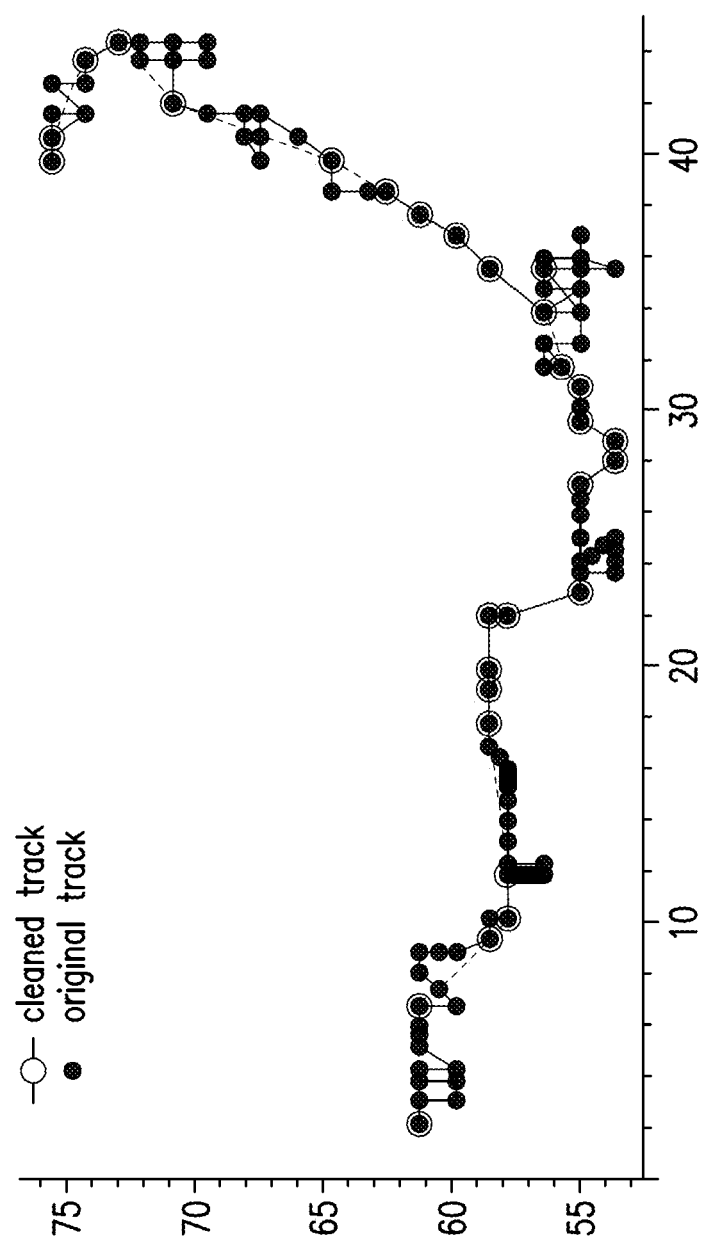
FIG. 3 shows another diagram schematically illustrating an exemplary comparison between original trajectory and the same track obtained after having removed useless cycles (see cleaning procedure 1).

For procedure 1 (the cycle removal), the technical problem arises that, while more accurate when the car is moving, GPS coordinates tend to suddenly and unpredictably change their values when the car is stationary (see dotted curve in FIG. 3). The problem is solved by the system, in that, whenever a cloud of at most k positions $(x_1, x_2, \ldots, x_k)$ is triggered, which sooner or later fall back into a neighborhood of radius $\theta$ centered in $x_1$, and whose maximum distance between each couple of positions is no greater than $\rho$, all points are removed, with the exception of $x_1$ and $x_{k'}$, where k'≤k is the length of the subvector satisfying the above constraints (see flat curve in FIG. 3). For the parameter settings: (i) k should be chosen so as to take into account the mean stop time of a car. The higher its values, the higher will be the possibility of removing some interesting driver maneuvers (such as small radius turns to promote direction changes); a too low value of k, on the other hand, would prevent the removal of spurious cyclic paths. Reasonable values of k can, e.g., range between 8-12; (ii) $\theta$ should take into account the GPS positioning accuracy; as this information is not always available for single devices, the system relies on highly-reputed general recommendations, and fixed this threshold in the range of 1-2 meters; (iii) $\rho$, different from $\theta$, should be set according to the magnitude of the artifacts introduced by GPS at fixed car position. A range of 3-5 meters seems acceptable to suitably cover the actual GPS technology.

Figure 4:
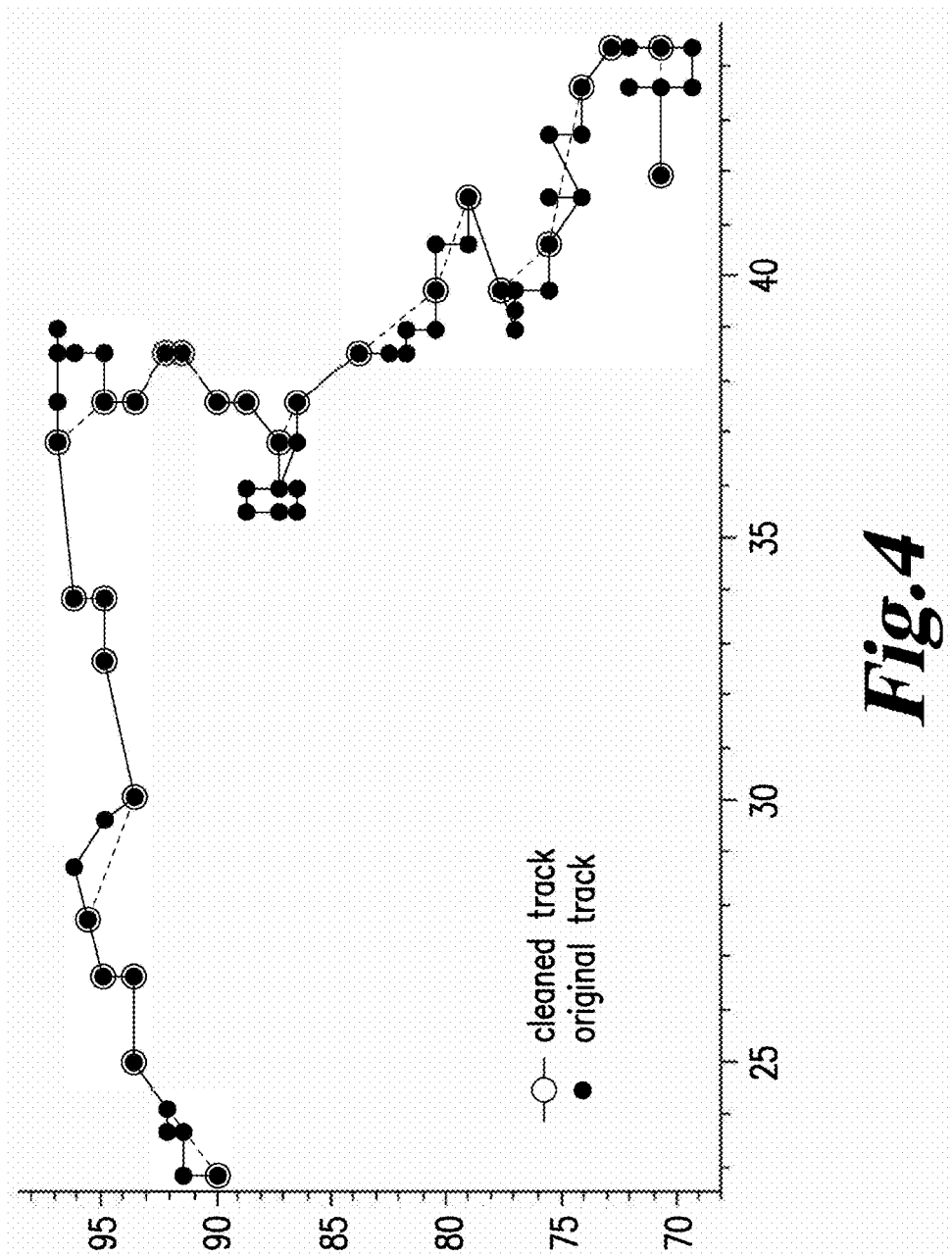
FIG. 4 shows another diagram schematically illustrating an exemplary comparison between original trajectory and the same track obtained after having removed spurious paths (see cleaning procedure 2).

For procedure 2 (the spurious paths removal), the technical problem arises that, small maneuvers, such as parking or alignment adjustments at a stop or traffic light, but also unpredictable artifacts and erroneous positions produced by GPS, risk to heavily deform the trajectory traveled by the driver (see FIG. 4). The problem is solved by the system, in that whenever a cloud of at most k positions $(x_1, x_2, \ldots, x_k)$ is observed whose maximum distance between $x_1$ and each other point $x_i$ is no greater than $\rho$, all points are removed, with the exception of x1 and the point $x_{max}$ at maximal distance, i.e. $x_{max}=\arg\max_j \{d(x_1, x_j)\}$ (see FIG. 4). The parameter settings are chosen as above. In particular, a good experimental validation has been observed when setting ~2.

Figure 5:
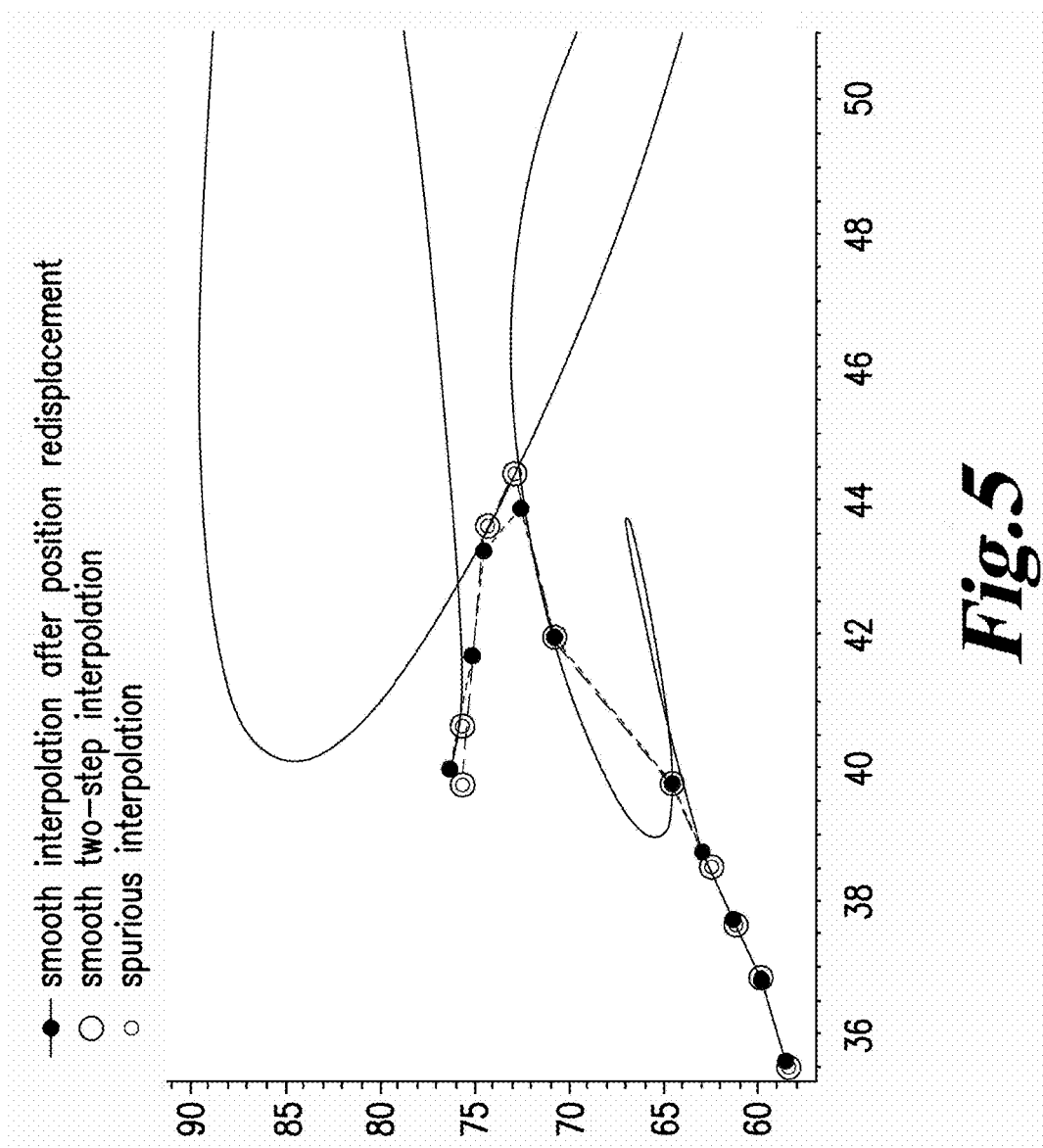
FIG. 5 shows a diagram schematically illustrating an exemplary spurious interpolation trajectory and its smooth version, obtained either by applying the closed-range position transformation or with the two-step interpolation strategy described below.

For procedure 3 (the closed-range positions handling), the technical problem arises that, in some cases, near closed consecutive positions may cause an unexpected formation of spurious cycles in the interpolating curves, independently of the interpolation degree chosen (except for linear interpolation, see FIG. 5). The problem is solved by the system, in that whenever two consecutive positions $x_i$ and $x_i+1$ are at a distance from each other of at most $\theta$, their gap is slightly increased in such a way that the former shifts toward the previous point, and the latter in the direction of the subsequent point, both with a displacement equal to (100r) % of the respective lengths, with 0≤r≤1 (i.e. $x_i=x_i+r(x_{i-1}-x_i)$ and $x_i+1=x_i+1+r(x_i+2-x_{i+1})$, see FIG. 5). For the parameter settings, referring to the first cleaning procedure, it has to be noted that: (i) $\theta$ should be assigned a value no greater than 1 meter, the minimal displacement observed in GPS positioning with the current technology. Higher values, coupled with a smooth and regular interpolation curve, risk to heavily deform the car trajectory without providing any additional benefit; (ii) the best value for r is the one guaranteeing a smooth interpolation curve, in the meanwhile avoiding excessive deformation of the track. While, in principle, it depends on the position of previous and subsequent points and on the derivatives of the interpolating curve (information not available a priori), empirical evidence calls for a parameter r∈[0.1-0.2]. Note that this procedure is only necessary, when single-step interpolation is used by the system; however, with the two-step interpolation strategy it is unnecessary.

Figure 6:
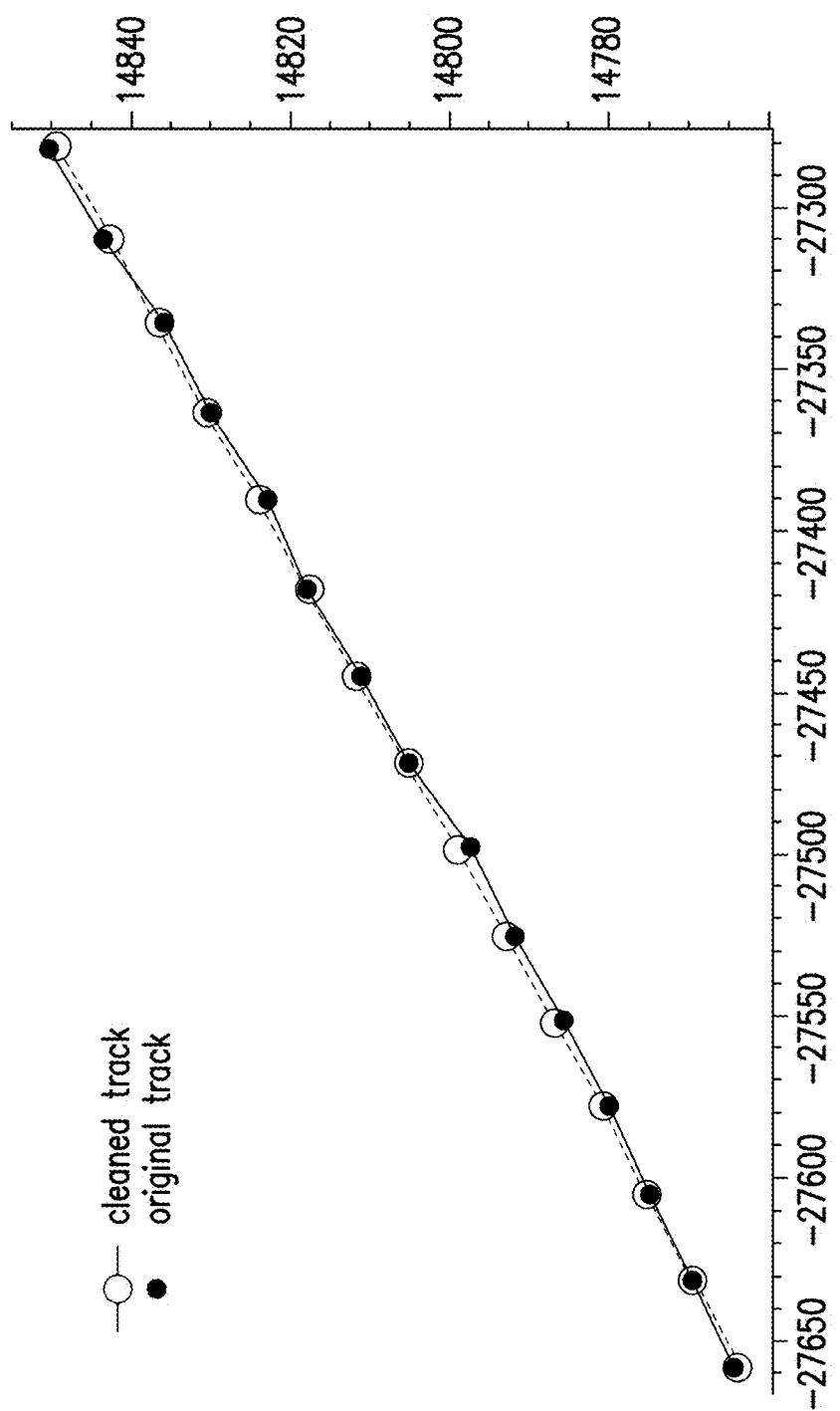
FIG. 6 shows a diagram schematically illustrating an exemplary zigzagging trait and its straightening. It is to be noted how the feeble, visually almost imperceptible, oscillating behavior makes the problem still more subtle, as its repercussions on the computed features are highly remarkable.

For procedure 4 (the straight road identification and projection), the technical problem arises that, focusing on the various GPS noises, quantization artifacts play an important and non-negligible role in the subsequent steps, mainly because their presence strongly depends on the orientation of the trajectory, being consequently not only time- and magnitude-variable but even unpredictable. So, while a straight direction parallel to meridians may exactly fit a straight line (with the exception of numeric errors and approximations, which in turn are always present), moving in "oblique" directions may result in a twisty trajectory, which proceeds jerkily (i.e. in fits and starts, by zigzagging), as shown in FIG. 6. As a consequence, both interpolation and extracted features will strongly suffer from this trend, causing, for instance, the appearance of continuous oscillations and sign changes in features, such as centripetal acceleration. The problem is solved by the system, in that positions lying on a straight line are aligned, the latter being identified by the two extremal positions. The algorithm follows a with regularity above and below the straight line; an index equal to 0 is observed when all intermediate points lie either above or below the line. Experimentally, setting α=0.6 will produce an adequate alignment. The quality of the benefit observed, when applying the proposed filter, strongly depends on which features, within the generated ones, will be chosen for further processing. Actually, the ones negatively influenced by zigzagging tracks are those related to lateral speed, curvature and centripetal acceleration. Moreover, the cleaning filters applied to the computed features in the post-processing phase (see below for more details) strongly mitigate the detrimental effects of the twisty tracks, even without explicit call for the straight-line projection filter.

Figure 7:
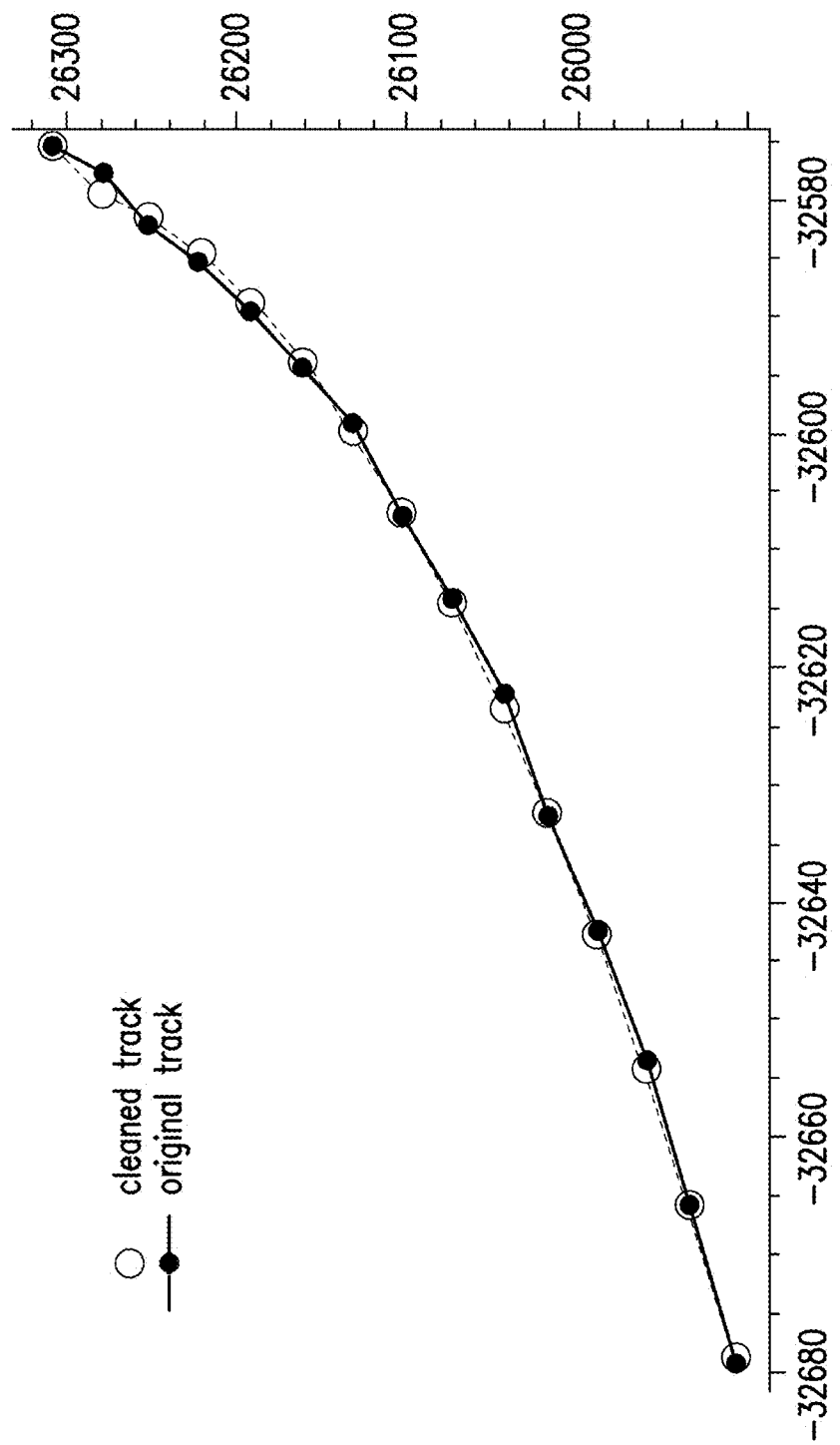
FIG. 7 shows a diagram schematically illustrating an exemplary curvilinear trajectory showing a feeble zigzagging trait and its projection onto a cubically fitting curve. See remarks regarding FIG. 6 above.

For procedure 5 (the straight road identification and projection), the technical problem arises that, strictly related to the problem stated in the previous cleaning procedure, zigzagging tracks may be observed even in correspondence of curvilinear traits (see FIG. 7). As the identification of projection on curvilinear roads is computationally heavier than the same task applied to straight streets, it may be preferable to keep the two filters well separated. The problem is solved by the system, in that positions lying on a curvilinear trait are aligned by the system. A greedy strategy is followed by the algorithmic procedure, namely, as long as positions $(x_s, x_{s+}, \ldots, x_{s+\tau})$ still lie at a distance lower than a threshold θ w.r.t. the polynomial curve of degree d best fitting the couples $((t_s, x_s), (t_{s+1}, x_{s+1}), \ldots, (t_{s+\tau}, x_{s+\tau}))$, where $t_i$ is the timestamp corresponding to position $x_i$, will be incremented by one unit. Only when the above distance will become larger than θ, all positions $(x_s, x_{s+1}, \ldots, x_{s+\tau})$ will be projected on the fitting curve. Then one starts up again from the position $x_s \leftarrow x_{s+\tau+1}$ (see FIG. 7). For the parameter settings, see previous paragraph for θ and strict_alternation. The choice of the polynomial degree d is of paramount importance: while high degrees allow for a realignment of positions on very twisty and tangled trails, the risk of inserting further artifacts becomes tangible, where the latter are caused by the huge oscillations frequently generated by high-degree polynomial curves. In view of the subsequent interpolation step, it is then recommended to use either quadratic or cubic forms. Note that the computational complexity of this procedure makes it an even less tempting option for execution.

In a third step, the system performs a longitudinal speed correction. It is a known and documented fact in the technical field, the high accuracy of GPS-based speedometers w.r.t. their vehicle counterparts, mainly due to the use of the Doppler shift in the pseudo range signals from satellites, but even thanks to the various filters employed by the algorithm. In this sense, GPS speed is even more accurate than GPS geolocalization.

Concerning the datasets being processed by the system, mainly three of the original variables reported in table 1 may generate inconsistencies, namely geolocation, speed, and timestamp. In fact, the known cinematic relation linking the three quantities (i.e. put simply, v=s/t) is found nowhere respectable when scrolling the available data. Indeed, as some extracted features strictly rely on such relations and their validity, some corrections should be introduced in order to guarantee correct computations. Now, taking for granted the timestamp precision, and favoring speed rather than position in terms of accuracy, the inventive idea seeks to remodulate the geolocations so as to satisfy the aforementioned cinematic equation. Namely, given two adjacent locations $x_\tau, x_{\tau+1}$ observed at two subsequent timestamps $t_\tau$ and $t_{\tau+1}$, being s the speed obtained by averaging $s_\tau$ and $s_{\tau+1}$, $x_{\tau+1}$ is moved in $$x'_{\tau+1} = x_\tau + \frac{\bar{s}_\tau(t_{\tau+1} - t_\tau)}{\|x_{\tau+1} - x_\tau\|}(x_{\tau+1} - x_\tau),$$

meaning that $x'_{\tau+1}$ will lie in the same direction of the vector connecting $x_\tau$ to $x_{\tau+1}$, but with a length exactly equal to the distance covered in the time interval $t-t_\tau$ at constant speed $\bar{s}_\tau$.

While this operation is recursively applied by the system at each original geolocation, there are two main strategies for its application: i) global approach, which considers the whole trajectory as observed in the dataset (see FIG. 8), and ii) windowed approach, which applies the above shifts on windows of size $w_s$, starting from the original location at the beginning of each new window (see the same picture). Clearly, while the first approach guarantees continuity, it may produce a new trajectory quite far from the original one, depending on both the geolocation noise but even on the cumulative propagation of errors. Vice versa, if windowing is a winning strategy concerning error propagation control, it leads to the insertion of discontinuity traits. As for the technical approach, it may be mainly interested in the accuracy and precision of the computed features, thus working with the first strategy, even considering the ability of returning to the original coordinate space expressed in degrees (e.g., where latitude and longitude exist), so as to be able to benefit from various on-line map tools, such as Google maps, for their proper visualization.

In a forth step, the appropriate interpolation is performed by the system. Once the original variables have been suitably filtered and cleaned as described above, the next phase concerns interpolation, whose main purposes are threefold: i) to increase the rate of some original variables, especially those having a low sampling frequency, such as GPS speed and geoposition; ii) to temporally align all the original variables given an arbitrarily chosen sampling frequency; iii) to fill-in missing data with proper values. As for the last point, while GPSLogger tracks show no missing data in their logs, the opposite is true for VTTI tracks where possible problems with sensors and devices, which are functioning 24 hours a day, 7 days per week, move to the background when compared to the data obfuscation mainly ruled by privacy issues and the presence of sensitive data.

Before investigating the various forms of interpolation being adopted on the individual original variables, the main motivation underlying the inventive choices has to be clarified. First of all, state-of-the-art systems typically promote, instead of pure interpolation, some forms of function approximation, such as Bezier curves or Gaussian filters, maybe in conjunction with Kalman filters to accomplish sensor/GPS data fusion and cleaning. However, for the present invention, it has been found that it is more beneficial to use those cleaning procedures described above, coupled with a more severe yet much more robust interpolation technique. The main difference between the technical approaches usually adopted by prior art systems and the present invention lies in the fact that Kalman filters are commonly used when a physical model subtends the dynamics under investigation. In particular, the simplest dynamics ruled by the classic cinematic formulae x=vt and v=at, either in their continuous or discrete variant, have been adopted mainly to automatically correct sensor accelerations through GPS data, i.e. letting GPS play a correcting role in terms of speed and position. However, on the one hand the excessive simplicity of the adopted model leads to a disregard for the true mechanics and dynamics of the car, which in turn proves to be too simplistic in that it ignores several major features and their related effects. On the other hand, dealing with two extremely noisy devices (GPS and sensors), in order to avoid cumulative propagation of errors, an exact knowledge of the noise parameters affecting the quality of such devices is mandatory; an information which seldom is fully available. There exist other scenarios where Kalman filters are applied, i.e. lateral acceleration reconstruction and sensor acceleration alignment when the sensor's local coordinate system differs from the car's global one, both based on a fusion of accelerometer and gyroscope data. Unfortunately, both suffer from the same aforementioned problem coupled with the well-known difficulty in correctly performing such technical tasks, showing some preliminary encouraging results only in well-controlled environments. For these reasons, the cleaning procedures described in the previous step which, despite providing a more heuristic picture, prove to be effective, proving their calibration as being robust against the few free parameter settings which, as discussed above, are easily manageable, even due to their clear and immediate meaning. Concerning the dispute between interpolation and function approximation, while the latter is capable of generating smooth artifact-free trajectories, by introducing considerable distortions in their trend, the risk of losing information meaningful for detecting driver behavior and driving style is considerably increased and in any case, absolutely non-negligible. On the other hand, interpolation suffers from the opposite technical problem: strictly passing through the observed points, it ensures all significant information to be preserved, even though at the cost of introducing spurious traits; due to the continuity and derivative constraints, such methods must satisfy. It is explained below how a joint use of cleaning procedures coupled with a two-step interpolation methodology are able to technically avoid such artifacts while preserving the main relevant driving information. For the present invention, the two main scenarios where interpolation takes place are linear interpolations for filling in missing data and two-step interpolation of GPS locations:

Concerning linear interpolation to fill in missing data, virtually all original variables, with the exception of GPS geopositions (see next paragraph), suffer from either the presence of missing data or a sampling rate so low it may cause possible information loss. These two facts, together with the opportunity to easily recall the value of such variables in timestamps possibly different from the sampled ones, suggested to us the introduction of a painless and simple fitting strategy: exactly in terms of a naïve linear interpolation. Of course, more sophisticated interpolation forms may be adopted too, yet at various costs: i) the introduction of spurious and consequently uninformative dynamics, having signals such as accelerations and orientations, but even network speed, a high oscillating trend; ii) the lack of synchronization with the more elaborate interpolation of GPS locations, causing, as a consequence, a loss of synchrony in the generated features; iii) trivial cost computational issues. In light of the above issues, linear interpolation turned out to be the most convenient choice.

Concerning the two-step interpolation of GPS locations, while GPS coordinates suffer from the same problems reported in the previous section, the aim here is to approximate the true trajectory covered by the car through an analytical continuous and variously differentiable function. In fact, a smooth trajectory is sought resembling as much as possible the true one, so as to be able to both intensify the signal (remember that GPS coordinates are usually sampled at 1 Hz) and extract features—such as jerk and curvature, to name a few—whose computation and feasibility require the knowledge of high-order trajectory derivatives and possibly their continuity. While in prior art systems, it is assumed, that the possible artifacts and spurious traits, possibly caused by the herein applied high-degree interpolation polynomials coupled with the imposed continuity and differentiable constraints, are a hindrance for such use, the inventive system shows, to the contrary, highlighting the tangible regularity of GPS tracks w.r.t., either sensor or network-based variables, but even by proposing a hierarchical two-step interpolation strategy downstream of the cleaning procedures introduced above.

The underlying technique of the present invention adopts two kinds of interpolation methods: namely, Hermite and BSpline interpolations. In the present invention, the Hermite interpolation modules are interpolating a set of n data points as a polynomial, thereby matching an unknown function both in the observed and/or measured values and in the observed and/or measured value of its first m derivatives, which means that n(m+1) values must be known. While the resulting polynomial may have degree $\delta$ at most n(m+1)−1, in general $\delta$ is chosen so as to find a suitable compromise between smoothness and continuity of the derivatives. Remember that, independently from the chosen polynomial degree, Hermite interpolation is differentiable, with the first derivative continuous but not differentiable (i.e. the second derivative usually lacks continuity). On the other side, the BSpline interpolation comprises as interpolant a special type of piecewise polynomial called a BSpline (short for Basis Spline). In the inventive system, this interpolation can be preferable to Hermite interpolation not only because the interpolation error can be made small even when using low-degree polynomials, but even more because it guarantees appreciable smoothness levels at least using high-degree polynomials. The reverse of the coin is its incapability to match an unknown function both in the observed values and in their derivatives. More in detail, a $\delta$-degree interpolation is differentiable up to its $\delta-2$ derivative, and continuous up to its $\delta-1$ derivative. In the sequel, for the sake of simplicity, it can be preferable to avoid the prefix B when referring to BSpline, whenever this does not cause ambiguity.

In the proposed technique for implementing the inventive system, the one-step strategy based on Spline interpolation of degree $\delta$ has been discarded, causing the spurious cycles already discussed in FIG. 5 even for low order degrees, unless the closed-range position cleaning procedure introduced above is correctly applied. The main reason was that, unfortunately, some spurious paths cannot be avoided due to the constraints on high-order derivatives. Thus, the inventive system can preferably be moved to the hierarchical two-step strategy, where: (1) in the first phase, constraints are explicitly imposed on the first-order derivatives of the interpolation function by forcing at location x a derivative equal to the incremental ratio $$\frac{x_{\tau+1} - x_{\tau-1}}{t_{\tau+1} - t_{\tau-1}}.$$

This operation was permitted by the choice of Hermite polynomials of degree δ instead of Spline functions as interpolation method, with the only drawback that Hermite polynomials prevent from ensuring differentiability of the interpolation function derivatives; (2) consequently, in the second phase, the just-computed Hermite function is resampled doubling its original sampling rate, and a second interpolation is performed, this time using BSplines of degree δ, ensuring in this way both continuity and differentiability, while avoiding spurious paths originated by automatically guessed first-order derivatives; (3) How to select interpolation degree δ? While high values guarantee continuity and differentiability at least up to order δ−1, they may compromise both smoothness and regularization of the trajectory. Now, most of the extracted features are mainly computed on the basis of both the trajectory and its first-order derivative, calling for a value of δ equal to 3 (cubic interpolation). In fact, that a Spline of degree δ is continuous δ−1 times, but in order to enforce continuity of the (δ−1)-th derivative, the interpolation degree of one unit must be increased (cf FIG. 7). Some others, like curvature, require the continuity of the second-order derivative so as to obtain reasonable quantities, hence δ=4. Finally, jerk, based on the third-order derivative, requires a value for δ equal to 5. Depending on which features will be selected for the subsequent recognition step, in selecting the Spline interpolation order, the aforementioned reasoning has to be taken into account. Of course, considering the insignificant computational time spent in performing such interpolations, a hierarchical approach may be introduced, where interpolations of order δ are used exclusively for those features based on derivatives of order δ−2.

Figure 8:
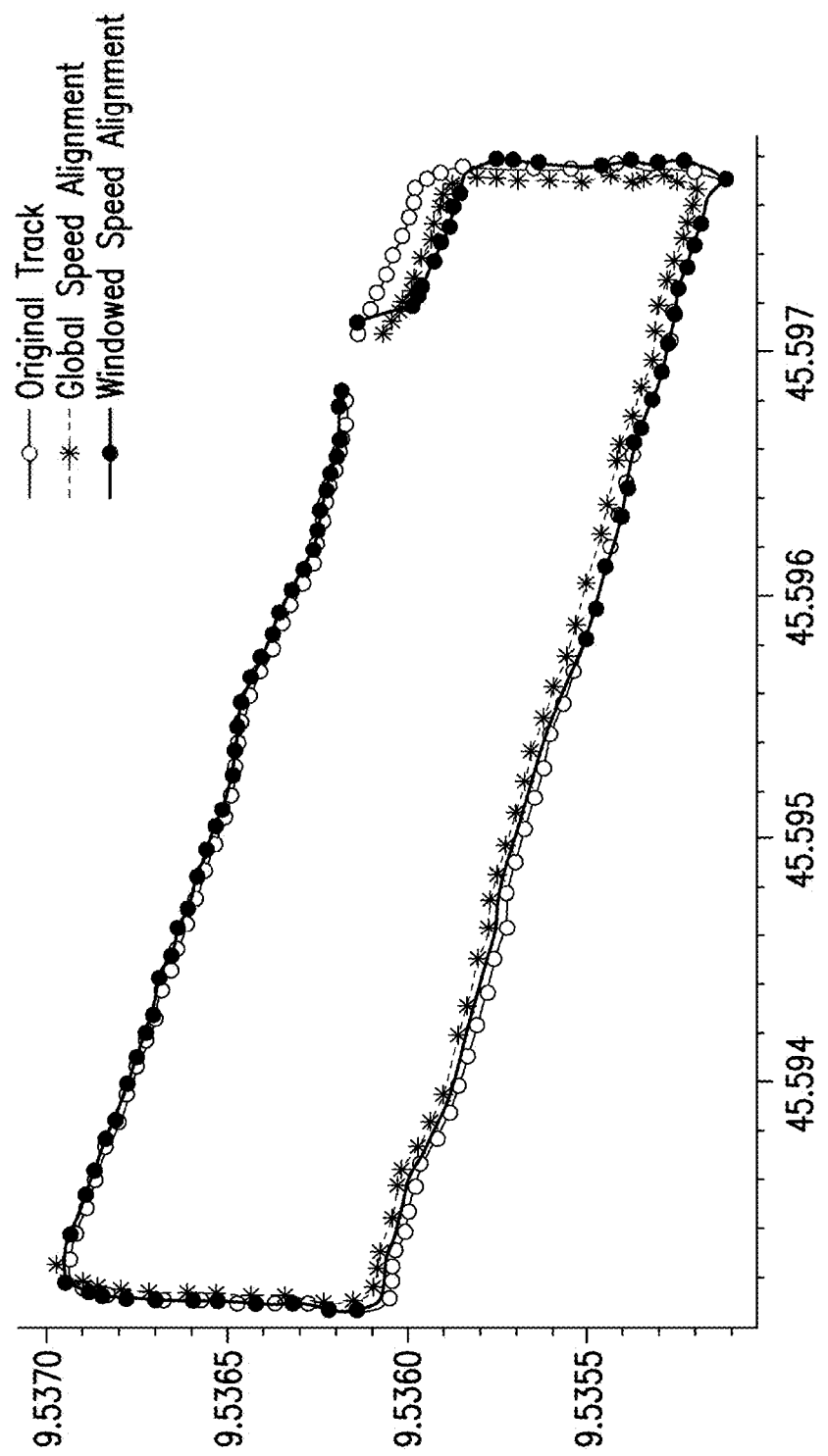
FIG. 8 shows a diagram schematically illustrating in an exemplary manner the effect of the longitudinal speed correction on a typical trajectory, where a track represents the original trajectory, while other tracks relate to the trajectories obtained by applying, respectively, the global and the windowed alignment, the latter with a window size of $w_s=40$.
Figure 9:
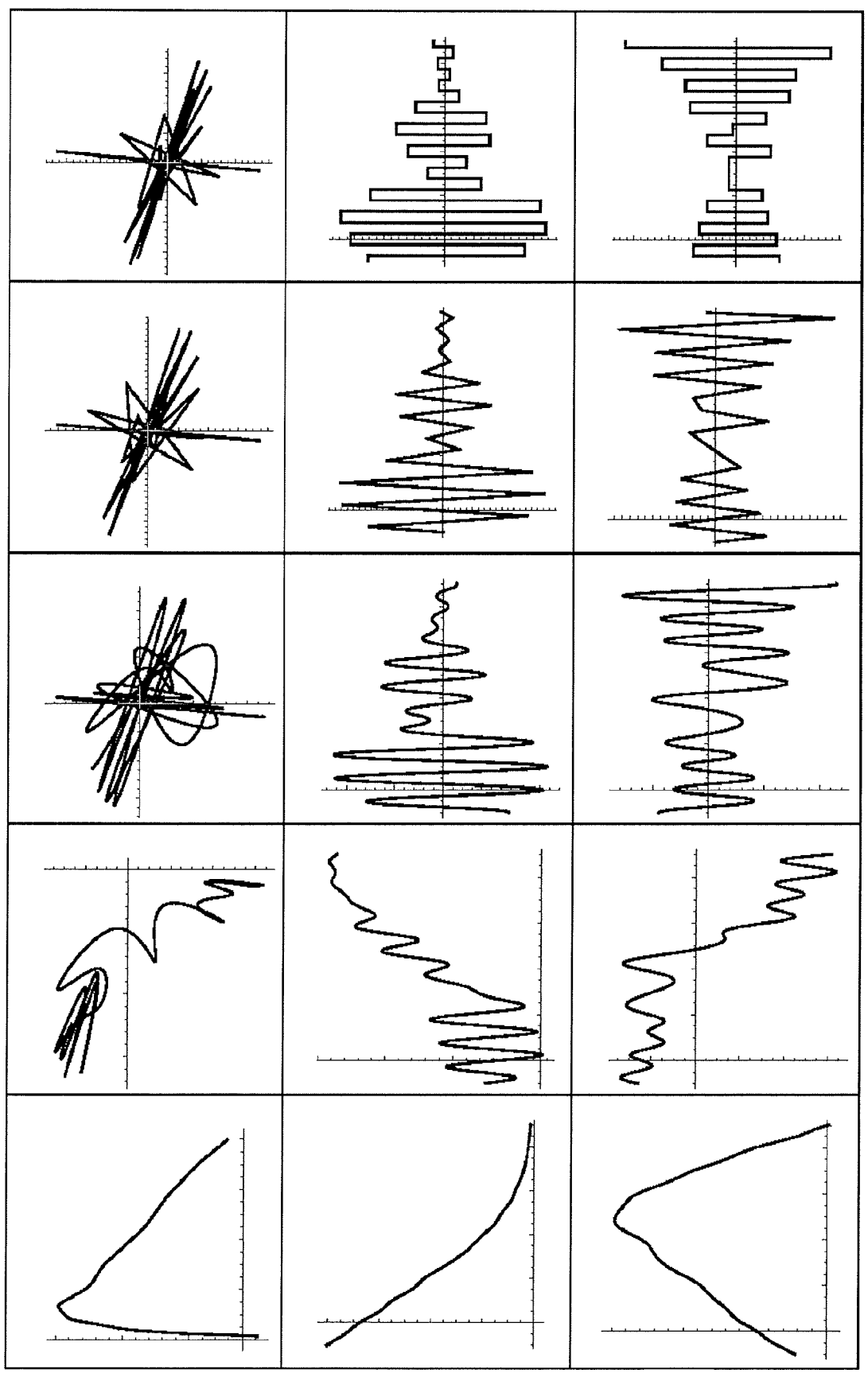

FIG. 9, referring to the top right corner of the trajectory depicted in FIG. 8, shows the course of the interpolating function together with its first four derivatives, both on the bi-dimensional plane (first row), and on its projection on the first and second coordinate vs. time (respectively in the last two rows). It is interesting to observe, having set δ=4, the differentiability up to the third order, and the continuity up to the second one, as witnessed by the factitious vertical lines introduced by the to adopted graphical routine in the last column.

At the end of the just described operating phase of the system, a series of functions is achieved by the system, interpolating the main signals collected either by GPS or by specific sensors. In turn, these sensors may be either specifically installed on the car, like inside VTTI campaign, or endowed in everyday smartphones a user carries. The main utilities of interpolating functions within the present system is already explained, i.e. automated resampling of these signals at a uniform rate (by default 10 Hz) along the entire trip, and relying on continuous and differentiable functions approximating the car trajectories. At the end of this operation the system comprises a set of equally-sized vectors reporting the queried signals that are evenly spaced along the trip (by an interval of say 0:1 secs), jointly with a timestamp vector cumulating the time instants starting from 0, and a time vector mapping these relative times to the absolute ones the interpolated signals refer to.

These signals, which directly come from the variables mentioned in table 1, specialize then in a set of informative features, which in turn belong to the following macro-families: time, GPS position, speed, acceleration, curvature, jerk, and orientation.

Figure 10:
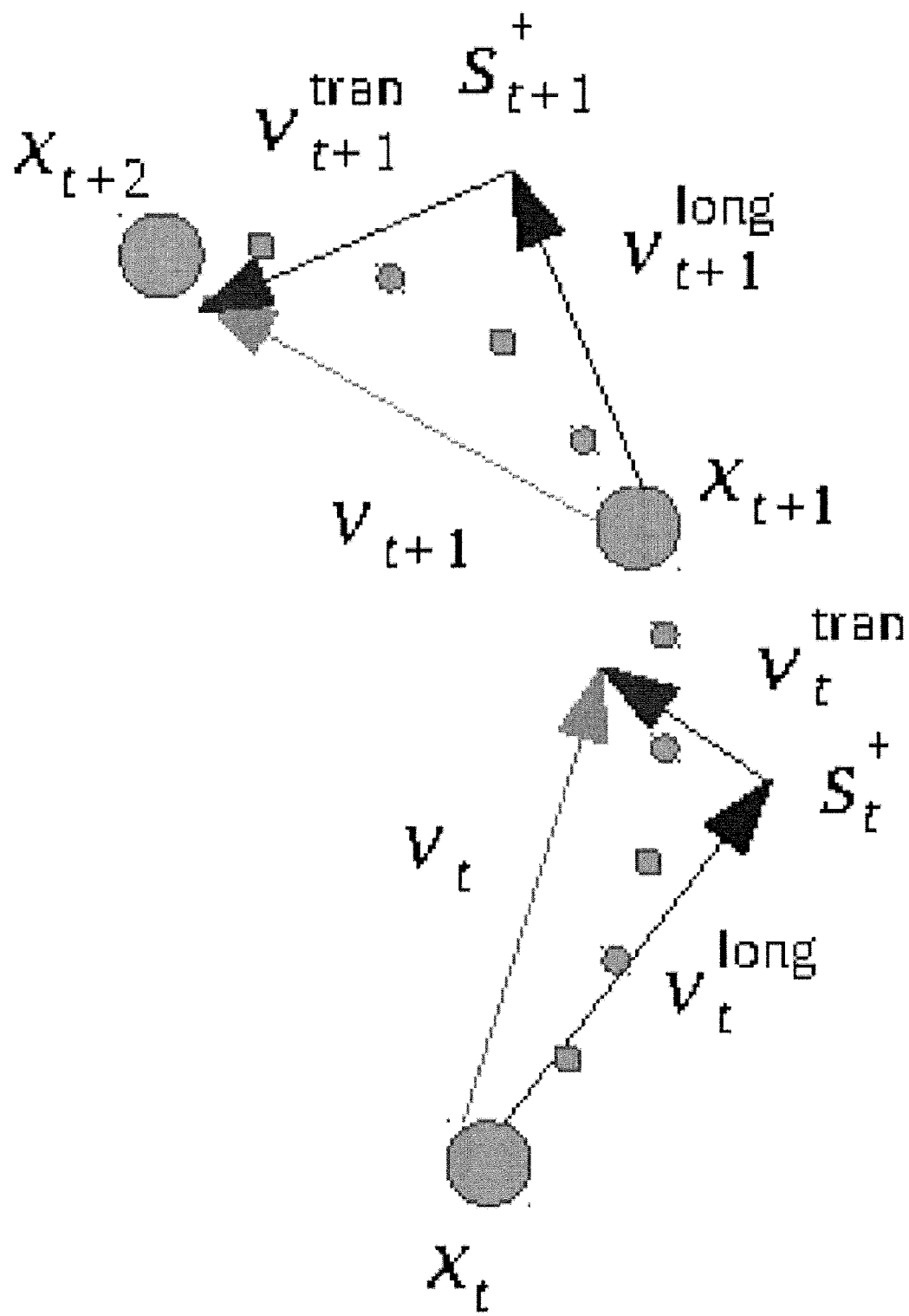
FIG. 10 shows a diagram schematically illustrating exemplary graphical representations of features v=vspeed_from_pos, $v^{long}$=vspeedlong, vtran=vspeed_tran, and s=speed tran_sign, with $s^{\pm}$ meaning, respectively, positive and negative versus. Big bullets represent GPS positions, while small bullets represent their interpolation $pos_{int}$.

In general, apart from a few exceptions, the system processes them through a sensor-fusion approach, for both completing their informative content, and smoothing their intrinsic additive noise. For instance, consider speed. It can be derived either from a discrete derivative of the GPS coordinates, or a continuous derivative of their interpolating function, or again by discrete integration of acceleration. In all cases, it suffers from both the residual noise on the GPS coordinates, survived from the clean-up described above, and the intrinsic noise of sensors such as accelerometers. Moreover, while the speed supplied directly by the GPS transducer is more precise, as mentioned before, it suffers from being a scalar value. Thus, to locate it into the trip plane, the system requires the vectors of the velocity generated from the derivative of the GPS coordinate. The third options consist in the fusion of speed with acceleration, where the fine-grained integration of the latter, sampled generally at 10 Hz, is corrected by the GPS-based speed which, in turn, is acquired at a lower sampling rate (typically 1 Hz). Finally, several additional options on both the source and the way the system computes these quantities introduce considerably more degrees of freedom. In conclusion, the system comprises a suite of variants each providing a different way of measuring the queried variables, as listed in Table 2. For the sake of both expository and conceptual clarity, FIG. 10 provides a pictorial representations of features vspeed_from_pos, vspeed_long, vspeed_tran, and speed_tran_sign. The reason for specializing each signal in a variety of features lies in their exclusive peculiarity of representing specific aspects of the same signal, which in turn will be exploited during their statistical elaboration. For instance, while the acceleration derived from the GPS coordinates is more regular than the one directly sensed by the accelerometers, the noise affecting the latter is usually much higher and irregular than that afflicting GPS devices. However, the independence of the two noises calls for a joint use of both features so as to gain more information, in spite of additional biases.

TABLE 2

Excerpt of the generated features together with a brief description of the various modalities as proposed for system, which in turn specializes in synthetic formulas in view of their clarifying role and unambiguous interpretation.

| Feature topics | Feature name | Description | Formula |
| --- | --- | --- | --- |
| time positive | timestamp | relative time marking each event, starting from 0 | t* |

TABLE 2-continued

Excerpt of the generated features together with a brief description of the various modalities as proposed for system, which in turn specializes in synthetic formulas in view of their clarifying role and unambiguous interpretation.

| Feature topics | Feature name | Description | Formula |
|---|---|---|---|
| | time | absolute time marking each event | $t$ |
| | $pos_{int}$ | GPS coordinates in output to interpolating function | $\varphi(t)$ |
| scalar speed | $speed_{int}$ | GPS speed in output to interpolating function | $v(t)$ |
| | $speed_{cur}$ | GPS mean speed between two consecutive locations | $\bar{v}(t) = \dfrac{v(t_{i+1}) + v(t_i)}{2}$ |
| | speed_from_accel | acceleration-based speed estimation with GPS speed reference | $v(t_i) + \Sigma_{j=1}^{r} \alpha_x(t_i)\Delta t_i$ |
| | speed_from_accel_PCA | acceleration$_{PCA}$-based speed estimation with GPS speed reference | $v(t_i) + \Sigma_{j=1}^{r} \alpha_x^{PCA}(t_i)\Delta t_i$ |
| | speed_tran_sign | sign of vspeed_tran | Sign(VectorAngle(vspeed_long, vspeed_from_pos)) |
| vectorial speed | vspeed_from_pos | GPS-based vectorial speed | $\bar{v}(t)\Delta\varphi(t_i)^\eta$ |
| | vspeed_from_time_pos | GPS-based vectorial speed | $\dfrac{\Delta\varphi(t_i)}{\Delta t_i}$ |
| | $pos'_{int}$ | first derivative of GPS interpolation function | $\varphi'(t)$ |
| | vspeed_long | projection of vspeed_from_pos on the direction longitudinal to the trajectory | $\bar{v}(t)(\Delta\varphi(t_i)^\eta \cdot \varphi'(t)^\eta \varphi'(t)^\eta$ |
| | vspeed_tran | projection of vspeed_from_pos on the direction transversal to the trajectory | $\varphi'(t)^\eta \varphi'(t)^\eta$ |
| | vspeed_from_accel | acceleration-based vectorial speed estimation with GPS speed reference | it uses raccel_x and raccel_y |
| | vspeed_from_accel_PCA | acceleration$_{PCA}$-based vectorial speed estimation with GPS speed reference | it uses raccel_x_PCA and raccel_y_PCA |
| scalar accel. | $accel\_x_{int}$ | sensor-based acceleration along x direction | $\alpha_x(t)$ |
| | $accel\_y_{int}$ | sensor-based acceleration along y direction | $\alpha_y(t)$ |
| | $accel\_x\_PCA_{int}$ | sensor-based acceleration$_{PCA}$ along the first component | $\alpha_x^{PCA}(t)$ |
| | $accel\_y\_PCA_{int}$ | sensor-based acceleration$_{PCA}$ along the second component | $\alpha_y^{PCA}(t)$ |

TABLE 2-continued

Excerpt of the generated features together with a brief description of the various modalities as proposed for system, which in turn specializes in synthetic formulas in view of their clarifying role and unambiguous interpretation.

| Feature topics | Feature name | Description | Formula |
| --- | --- | --- | --- |
| | accel_long_sign | sign of vaccel_long | $\text{Sign}(||\text{vaccel\_long}(t_{i+1})||-||\text{vaccel\_long}(t_i)||)$ |
| | accel_tran_sign | sign of vaccel_tran | $\text{Sign}(\text{VectorAngle}(\text{vaccel\_long}, \text{vaccel\_from\_vspeed}))$ |
| vector accel. | vaccel_from_vspeed | acceleration based on vspeed_from_pos | $\dfrac{\Delta \text{vspeed\_from\_pos}}{\Delta t_i}$ |
| | vaccel_long | projection of vaccel_from_vspeed on the direction longitudinal to the trajectory | $\text{vaccel\_from\_speed} \cdot \varphi'(t)^\eta \varphi'(t)^\eta$ |
| | vaccel_tran | projection of vaccel_from_speed on the direction transversal to the trajectory | vaccel_from_vspeed- $\text{vaccel\_from\_speed} \cdot \varphi'(t)^\eta \varphi'(t)^\eta$ |
| | raccel_x | projection of acceleration on the direction longitudinal to the trajectory | . . . |
| | raccel_y | projection of acceleration on the direction transversal to the trajectory | . . . |
| | raccel_x_PCA | projection of $\text{acceleration}_{PCA}$ on the direction longitudinal to the trajectory | . . . |
| | raccel_y_PCA | projection of $\text{acceleration}_{PCA}$ on the direction transversal to the trajectory | . . . |
| jerk | $\text{jerk}_{int}$ | derivative of acceleration w.r.t. time | $\varphi'''(t)$ |
| curvature | $\text{curv}_{int}$ | exact curvature based on interpolating functions | $\dfrac{\varphi'_x(t)\varphi''_y(t) - \varphi''_x(t)\varphi'_x(t)}{(\varphi'_x(t)^2 \varphi'_y(t)^2)^{\frac{3}{2}}}$ |
| | curv_approx | circle-based approximation of curvature | inverse of osculating circle |
| | curv_approx_median_k | median of circle-based approximations of curvature computed on k neighboring locations | |
| | curv_approx_tmean_k-m | trimmed mean at m100% of circle-based approximations of curvature computed on k neighboring locations | |
| centripetal accel. | accel_centripetal | each coupling <speed, curvature> gives rise to different forms of centripetal acceleration | $v(t)^2 \cdot \text{curvature}$ |

TABLE 2-continued

Excerpt of the generated features together with a brief description of the various modalities as proposed for system, which in turn specializes in synthetic formulas in view of their clarifying role and unambiguous interpretation.

| Feature topics | Feature name | Description | Formula |
| --- | --- | --- | --- |
| orientation | gyro_$x_{int}$ | sensor-based orientation along x direction | $\omega_x(t)$ |
| | gyro_$y_{int}$ | sensor-based orientation along y direction | $\omega_y(t)$ |
| | gyro_$z_{int}$ | sensor-based orientation along z direction | $\omega_z(t)$ |
| | gyro_x_$CCA_{int}$ | sensor-based orientation$_{CCA}$ along the first component | $\omega_x^{CCA}(t)$ |
| | gyro_y_$CCA_{int}$ | sensor-based orientation$_{CCA}$ along the second component | $\omega_y^{CCA}(t)$ |
| | gyro_z_$CCA_{int}$ | sensor-based orientation$_{CCA}$ along the third component | $\omega_z^{CCA}(t)$ |

Some expanatory notations follow:
plain/bold fonts denote respectively scalars and vectors;
r: ratio between sensor and GPS sample rate (typically r ~ 10);
$\Delta x_t = x_{t+1} - x_t$; $x^n = x/||x||$, with $||x||$ Euclidean norm of x;
subscripts PCA and CCA stand respectively for principal component analysis and canonical correlation analysis;
Sign is the signum function;
VectorAngle(a, b) = (arctan $a_2$, $a_1$) – (arctan $b_2$, $b_1$) is the routine actually used to compute the angle between two vectors a and b;
the main difference with the well-known use of arctan function is that it preserves the signed orientation of one vector w.r.t. the other one.

Finally, the system comprises post cleaning features. A first rudimentary denoising applied to the computed features is the clipping to 0 of the values under a given threshold. Actually, features such as vspeed_tran can be derived by GPS positions which in turn have been stabilized (hence cleaned by low frequency waving) through the various procedures described above. Thus, the system achieves small expected oscillations around 0 in their trend to be strictly connected to the side-effects of the numerical accuracy of the technical and computational framework adopted. Namely this clipping is operated on the variable vspeed_tran, vaccel_tran, and all those features related to curvature. As for the former, whenever vspeed_tran falls below the threshold, it is put equal to zero, in the meanwhile setting vspeed_long=vspeed_from_pos and speed_tran_sign=0. An analogous filter is followed for vaccel_tran.

Up to here, after the above described complex processing and data capturing steps of feature extraction, the system finally holds a list of base features extracted through the described complex elaboration of telemetric variables, for example, originated either from VTTI or EcoAndroid data. At this point, the system automatically moves to the next step, which is mainly devoted to automatically identifying: i) a list of interesting driver maneuvers which may provide information and insights on the to driver's style and behavior; ii) a set of templates, based on the extracted features, which proves to be highly correlated with specific driver maneuvers; and iii) machine learning procedures aimed at recognizing, with high confidence and on the basis of suitable subsets of templates, the identified driver maneuvers within the available datasets. While the task of identifying driver maneuvers, templates, and connections among them is a continuous and dynamic process conducted by means of the system, involving a controlled inspection of car trajectories and sensor data, the proper set-up of temporal pattern recognizers is a complex technical task whose in-depth analysis will be the main object of the current section. To improve the operation of the system, the inspection of car trajectories and sensor data can comprise at least a partial manual and attentive spot check adjusting and optimizing the overall operation by the manual spot check.

In the following, the above-mentioned three core steps of the inventive dynamic time warping for the driver maneuver recognition by means of the system, namely (i) driver maneuver identification, (ii) template identification, and (iii) the core part of the dynamic time warping operation of the system, will be discussed in detail:

For the driver maneuver identification operations by means of the system, maneuvers are defined as any driver operations having a clear and unambiguous semantic meaning, i.e. being definable as a clear physically measurable, parameter-composite object. In other words, semantic, as used above, means the semantic field of physically distinguishable objects. Typical maneuvers are, for example, lane changes, overtaking, deceleration, to cite a few. In turn, each maneuver can be hierarchically specialized so as to identify more specific operations. In this sense, taking, for example, overtaking a car or a cyclist to differentiate a true car passing (possibly invading the opposite lane) from a slightly pronounced overtake action (moving away from the right edge by, let's say, at most 1 meter); similarly, fast lane changes as opposed to slow lane changes, and the like. This specialization is particularly important to identify the driver characteristics, which in turn may provide us with some hints about her/his risk potential and crash attitude. For the herein defined modifier semantics, the following has to be noted: (1) Specific templates like the above fast/slow lane changes may acquire a different semantic interpretation depending on changes in the background context. In fact, that, what rules the roost, is indeed contextual information, like meteorological conditions and street typology. So, a fast overtaking action will span a different time interval if it is on a snowy rural road, rather than in case of in sunny weather on a highway; and (2) In principle, the system cannot simply rely on the canonical ordering of modifiers like (slow, medium, fast), because the same ordering strictly depends on the coupling between driver maneuver and contextual information. First of all, in view of the task at hand, the main criterion ruling the ordering of a maneuver should be safety. In turn, safety should not be confused with, let's say, caution. A slow overtaking maneuver accomplished by an over-prudent or over-cautious 70-year-old man, driving either with excessive caution or insecurity, would surely be much more dangerous than a fast overtaking action performed by a young male driver, with the former being more likely to provoke dangers in both lanes, and in any case certainly irritating the neighboring drivers. Thus, the system must be enabled to choose the right natural ordering on specialized driver maneuvers. It is to be noted that, when speaking of a driver maneuver recognition, this refers below to its semantic meaning and to the underlying features (from those extracted according to the above-discussed feature extraction of the system), which in turn enrich it with a more operative sense. A lane change will correspond to the sequential patterns each feature exhibits during the lifespan of the maneuver.

For the driver maneuver identification, sequential patterns of the captured usage-based 31 and/or user-based 32 and/or operation-based 33 telematics data 3 are matched with searchable predefined measuring parameter sets of driving maneuvers by means of the dynamic time warping-based telematics circuit 10. The dynamic time warping-based telematics circuit 10 comprises a first data store unit 102 with the searchable predefined driving maneuvers. Each driving maneuver is composed of a plurality of hierarchically structured operation measuring parameter sets, as discussed above. A specific operation or driving feature of a vehicle 41, . . . ,45 is separately identifiable and triggerable based on a corresponding operation parameter set, i.e. within the corresponding physical semantic parameter field. Each driving maneuver 108 is composed of sequential patterns of operations or driving features provided by the hierarchical structure, which are each extractable and measurable by the measuring telematics parameters 3 exhibiting during the lifespan of a driving maneuver. Finally, the sequential patterns of the captured usage-based 31 and/or user-based 32 and/or operation-based 33 telematics data 3 are matched with the searchable predefined measuring parameter sets of driving maneuvers 108 by means of the dynamic time warping-based telematics circuit 10.

For pattern template identification, the dynamic time warping-based telematics circuit 10 comprises a second data store unit with searchable predefined measuring parameter pattern templates of driving maneuvers. Each single driver maneuver 108 is composed of a plurality of prototypical parameter patterns. An individuated time interval is measured spanning the duration of a captured maneuver pattern by means of the telematics circuit 10; the measured individuated time interval is used as time index to extract the portions of features effectively corresponding to a selected maneuver. For each captured maneuver pattern and each operation or feature, a similarity measurement of the detected operation and/or feature profile(s) is performed ranging over possible trajectories used as a benchmark, and highly correlated operations or features are selected. Further, selected templates can, e.g., be filtered by providing template averaging by means of coupled filters removing artifacts and individual singularities, and thus establishing each template specific to the single captured maneuver. The mentioned coupled filters can, e.g., at a minimum, comprise a Gaussian filter and/or moving average and/or median filter, wherein each template is made specific to a single maneuver by using the coupled filters. The coupled filters can, e.g., be dynamically adapted by the system to a measured generalization threshold value, which is when all different phenotypical representations of the selected reference maneuver from the first and second data store, are captured.

Captured driver maneuvers are automatically individuated within the various car trajectories provided by the matched searchable measuring parameter sets of driving maneuvers and the measured pattern templates of driving maneuvers. For two temporal sequences within the captured usage-based 31 and/or user-based 32 and/or operation-based 33 telematics data 3, a temporal-variation independent measuring parameter is measured, each time, by the dynamic time warping-based telematics circuit 10, wherein the dynamic time warping-based telematics circuit 10 provides an optimal match between the two temporal sequences by nonlinearly warping the temporal sequences in the time dimension, and wherein one of the two temporal sequences, which comprise two time series, is locally stretched or compressed while optimizing the measured similarity between the two temporal sequences of usage-based 31 and/or user-based 32 and/or operation-based 33 telematics data 3. Captured driver maneuvers can, e.g., be automatically individuated within the various car trajectories, as provided by the matched searchable measuring parameter sets of driving maneuvers and the measured pattern templates of driving maneuvers, wherein the system comprises predefined individuating recognizers, which are automatically discriminating between the various possible maneuvers by returning that portion of vehicle trajectories most accurately matching them upon inputting a selected set of templates.

Figure 11:
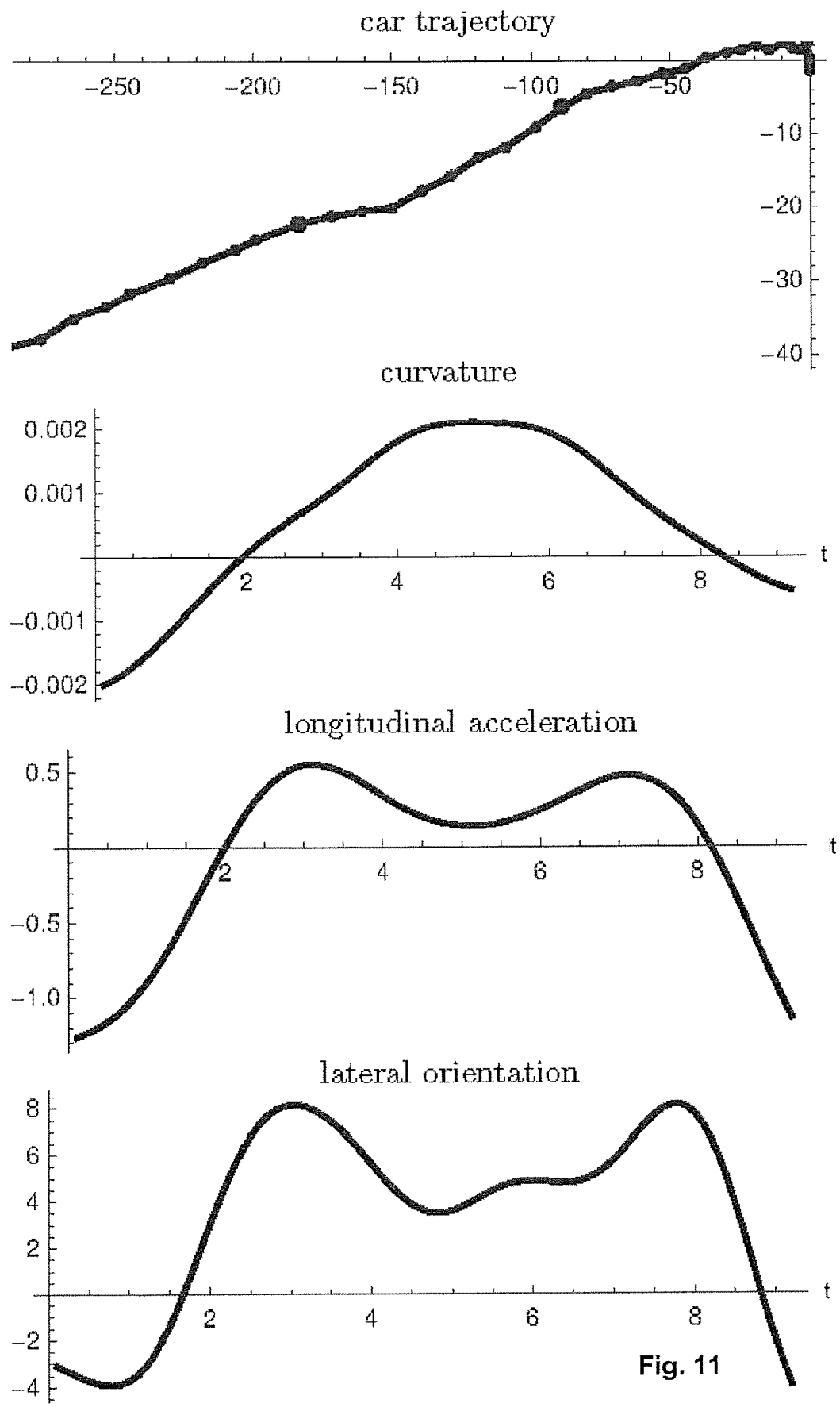
FIG. 11 shows a diagram schematically illustrating in an exemplary manner three typical templates that are related to the maneuver of overtaking a vehicle as performed in the bottom portion of the trajectory and depicted in FIG. 8, and more precisely during the time interval [22:74; 31:77] (corresponding to positions 23 to 32 highlighted by the two big bullets in the pictures). Templates have been cleaned with a Gaussian filter and averaged over similar paths.
Figure 12:
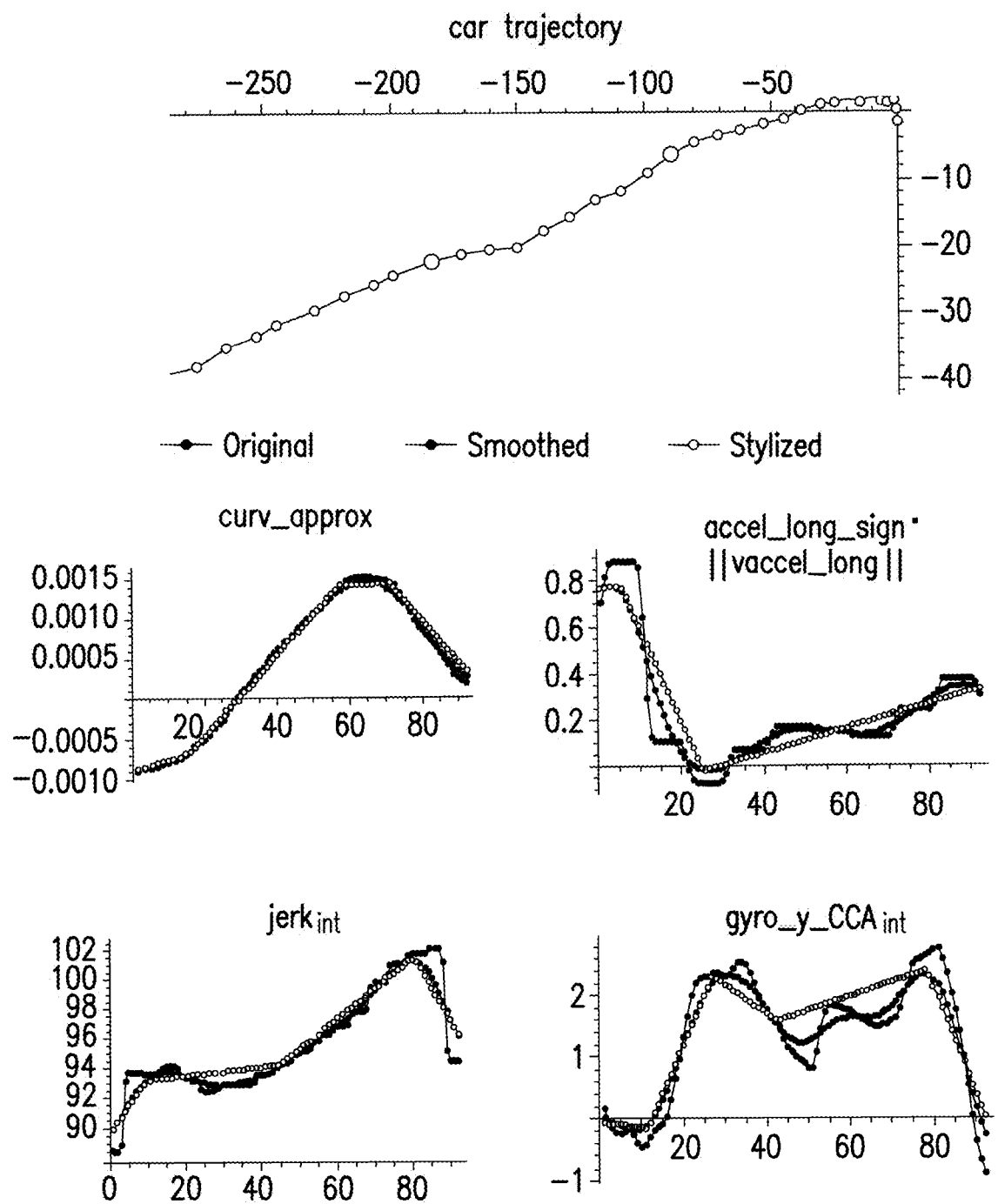
FIG. 12 shows a diagram schematically illustrating in an exemplary manner once again four typical templates related to the maneuver of overtaking a vehicle as performed in the bottom portion of the trajectory and depicted in FIG. 8, and more precisely during the time interval [22:74; 31:77] (corresponding to positions 23 to 32 highlighted by the two big bullets in the pictures). Original templates have been cleaned with a Gaussian filter, and stylized through piecewise linear fitting. For visualization convenience, templates have been joined by different patterns of lines.

In detail, for the template identification, templates are defined for the system as the prototypical pattern associated to a specific driver maneuver. For example, an overtaking action can be described in terms of three templates: its curvature, longitudinal acceleration, and lateral orientation proles, as shown in FIG. 11. More precisely, the overtaking action can be accurately described in terms of four templates: trajectory curvature, signed longitudinal acceleration, jerk, and lateral angular orientation proles, as shown in FIG. 12, which in turn rely respectively on the features curv_approx, accel_long_sign||vaccel_long||, jerkint, and gyro_y_CCA. For the choice of the most promising templates to be associated to the single maneuvers, the system passes through three respectively four phases: (1) Car trajectoy inspection: Starting from the chosen subset of VTTI or EcoAndroid data, and after having processed them accordingly, as described above, an automated inspection of the car trajectories by means of the system, possibly projected onto a high definition map (for instance, as those provided by Google Maps, OpenStreetMap, Wikimapia, or Wolfram GeoServer), is necessary to individuate both the given maneuvers and the respective time intervals. These will be used as time indexes to extract the portions of features effectively corresponding to a given maneuver. The task of identifying driver maneuvers, templates, and connections among them is a continuous and dynamic process conducted by means of the system and involves a controlled inspection of car trajectories and sensor data. To improve the operation of the system, the inspection of car trajectories and sensor data can comprise at least a partial manual and attentive spot check for adjusting and optimizing the overall operation by the manual spot check; (2) Selection of highly correlated features: For a same maneuver and for each feature, an analysis of the similarity of the feature profiles is performed, ranging over the trajectories that are used as a benchmark. These profile similarities may emerge through different approaches that are currently under investigation. Correlation or mutual information may prove to be a winning choice, provided the same are modified to handle temporal distortions (see next section to appreciate this aspect). Clustering procedures based on suitable metrics could be effective in specializing a driver maneuver in two or more subtypes, and, subsequently, to assign them the right template proles computed as barycenter of the corresponding clusters. Of course, a fully-automated procedure is to be viewed sceptically, in that it is the task of maneuver and template identification is of paramount importance for the next recognition phase, meanwhile any critical issues that may emerge must undergo scrupulous human control and supervision actions. First patterns in FIG. 12 represent a typical set of profiles; (3) Filtering of the selected templates: Once selected, templates should be filtered by removing artifacts and individual singularities. In this sense, the averaging of templates coupled with filters such as a Gaussian filter, moving average, median filter and so forth, may prove indispensable in making each template specific to a single maneuver, all the while guaranteeing a level of generalization that is adequate for capturing all the different phenotypical representations of the reference maneuver. Second patterns in FIG. 12 show a smooth version of the original templates after the application of a Gaussian filter with a width equal to 10; (4) Template stylization: To further improve on the generality aspect while maintaining the same specialized shape, a last processing called template stylization is performed, which basically finds a piecewise linear fitting of the smoothed templates (see FIG. 12).

At this point, the system arrives, under normal operating conditions, at core step three of the inventive dynamic time warping for the driver maneuver recognition, namely (iii) the core part of the dynamic time warping operation of the system, i.e. the identification of suitable recognizers which, given as input a set of templates discriminating between various maneuvers, return those portions of the trajectories that match them. In short, the main objective is to automatically identify, within the trip time series data, those driver maneuvers which, in a later stage of the process, will provide necessary information for discriminating driver behaviors and risk potentials, seen in the light of underlying crashes or near-crashes episodes. One of the first factors to be described is time flexibility that is required of the recognition task w.r.t. regarding the correspondence templates—maneuvers. Consider the following: Suppose, for example, you already identified a template of a length 35 relative to the maneuver standard lane change (i.e. lasting 3:5 secs and sampled at a frequency of 10 Hz). Of course, while it is absolutely indispensable to arrive at a differentiation of slow, standard, and fast maneuvers, as this information is strictly connected to the driving style, a standard lane change should be intended in a fuzzy acceptation, lasting typically 3:5 secs, with a tolerance of, e.g., ±1 sec. Thus, an operational structure is needed that implicitly considers a sort of time distortion when identifying correct matches, in terms of suitable temporal dilatation and shrinkage. A Dynamic Time Warping (DTW)-based operational structure suits the necessary boundary conditions. The effective technique of DTW is based on a method for measuring the similarity between two temporal sequences which may vary in speed. In other words, it generates and measures an optimal match between two given sequences by nonlinearly warping them in the time dimension, thus allowing for a measure of their similarity which is independent from temporal variations.

Figure 13:
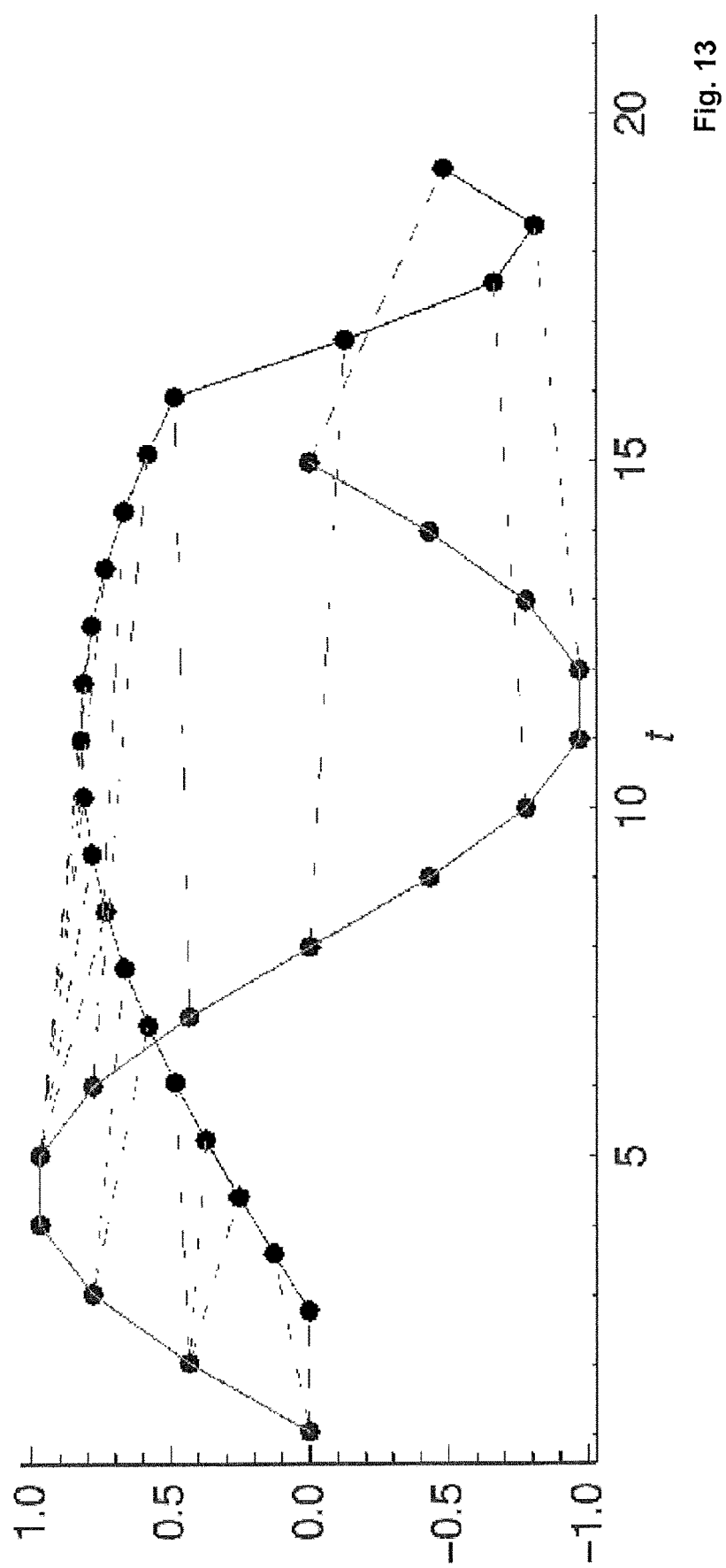
FIG. 13 shows a diagram schematically illustrating in an exemplary manner a typical example of dynamic time warping (DTW) applied to two sinusoidal-shaped time series. Sequence lasting 15 secs sampled at regular time intervals; sequence lasting 21 secs having tripled and half sampling rate w.r.t. the sequence lasting 15 secs respectively in its initial and final trait; dashed lines: optimal temporal correspondence between the two sequences.

Namely, this is a sequence alignment method which, given two-time series, either stretches or compresses them locally in order to make one resemble the other as much as possible. Considering, for instance, the two sinusoidal sequences shown in FIG. 13: the series lasting 15 secs, has been sampled at regular time intervals, while the series lasting 21 secs, with a higher and lower sampling rate, respectively, in its first and last sections. In order to align the two sequences, some points of the series lasting 15 secs are associated with at most three different points of the series lasting 12 secs in the initial trait; vice versa, at most one point of the series lasting 15 secs is skipped, i.e. is associated with no points of the series lasting 12 secs in the final trait. The various constraints effectively rule the optimality of an assignment, whereby some of them are freely customizable to meet user needs.

In order to describe some choices, adopted herein, in the context of the special task of the inventive system, some formalism is required. Let $R=\{r_1, \ldots, r_m\}$ be the reference time series (the template in the used acceptation), and $Q=\{q_1, \ldots, q_n\}$ the query or test time series (usually a portion of the selected feature along the driver trajectory, as explained below). Given a local distance $d(q_i, r_j)$ between any pairs of elements $q_i$ and $r_j$, the DTW structure is called up to identify the optimal warping curve $\phi(\tau)=(\phi_q(\tau), \phi_r(\tau))$, where $\phi_q(\tau) \in \{1, \ldots, n\}$ and $\phi_r(\tau) \in \{1, \ldots, m\}$ remap the time indices of Q and R, respectively, so as to minimize the average accumulated distance between the warped time series Q and R, i.e. so as to compute the deformation of the time axes of Q and R, which moves the two time series as close as possible to each other. In performing this task, as already hinted at when introducing FIG. 13, DTW must satisfy the proper constraints, some of which are variously customizable, leading to different "warping intensities." In particular: (1) Local constraints and step-patterns, and (2) global constraints and windowing, and (3) Unconstrained end points.

(1) Local constraints and step-patterns: To achieve an optimal alignment, some temporal indices in either time series can be skipped or duplicated. For instance, returning to the above example, by matching multiple consecutive elements of the selected feature Q with the same sample element of the template R, the template is permitted to match slower maneuvers Q, i.e. having a longer duration; this is exactly what happens in correspondence with the left-most traits in FIG. 13. Vice versa, skipping elements of R enables the alignment with faster maneuvers Q, which end in a shorter time period (see rightmost traits in FIG. 13). Local constraints, in terms of step-patterns, allow for more control on: (a) the payable cost when selecting a given coupling $(q_i, r_j)$ in place of different candidates, which is usually composed of three terms, namely: i) the plain distance $d(q_i, r_j)$, still playing a primary role; ii) an additional cost factor, called weight, ranging over the positive real numbers; iii) a possible normalization term which proves useful both when comparing alignments between time series of different lengths, and when performing partial matches (see Unconstrained end points below); (b) the number of consecutive elements which may be skipped; and (c) which of the two sequences (or possibly both) can enjoy this facility.

Targeting this goal, two families of step-patterns are defined for the system, named asymmetricT$\ell$ and asymmetricTW$\ell$ with $\ell \in \mathbb{N}_+$, whose main behaviors are the following. Starting from asymmetricT$\ell$ (i) query Q is forced to scan only sequentially (i.e. neither skips nor repetitions are allowed); and (ii) template T can skip at most $\ell-1$ elements, possibly staying indefinitely in the same position; the weights ruling the preference for performing $0, 1, \ldots, \ell-1$ skips are constantly set to 1; finally, the only admissible choice for a normalization coefficient is the length m of template R. The only differences of family asymmetricTW$\ell$ are circumscribed relative to the weight vector. Namely, two parameters $w_0$ and w rule the respectively payable cost when staying in the same position for one move and when performing one more skip (i.e. s skips translates to a weight equal to 1+ws. The main motivations supporting these choices will be explained below, when describing in greater detail the adopted strategy.

(2) Global constraints and windowing: While step pattern control which local matches can be considered as possible candidates, the window concept imposes a limitation on the overall temporal distortion between the two-time series. Formally, windows delimit the warping curves domain by identifying an admissible portion of (i, j) plane. While several types of windows have been developed so far, we will cite and use the simplest one, called Sakoe-Chiba band, which trivially introduces the constraint $|\phi_q(\tau)-\phi_r(\tau)| \leq T_0$, where $T_0$ is the maximum allowable absolute time deviation between two matched elements. Intuitively, the constraint creates an admissible band of a fixed width around the main diagonal of the alignment plane. This explicit constraint on the maximum deviation between the two sequences translates in an implicit control over the maximum number of allowed repetitions $t_0$ for each template element. It must be said that $t_0$ suffers from a sort of indeterminacy, in the sense that the only claim that can be expressed is that $t_0 \in \{0, \ldots, T_0\}$; however, at each time, step $t_0$ cannot be explicitly identified unless we already know the actual temporal offset between the two sequences.

(3) Unconstrained end points: By default, when aligning two sequences, it is imposed on the system that their heads and tails match each other. In other words, the following end point constraints are imposed: $\phi_q(1)=\phi_r(1)$ and $\phi_q(T)=n$, $\phi_r(T)=m$, with T temporal length of the alignment. In the applications of the present system, partial matches are useful, so that one or both of the above constraints are relaxed. In particular, for reasons discussed below, the tail end point constraint is removed, in such a way that the method will return the longest prefix of the query Q which best matches the template R.

In the following, the proposed integration of DTW with the present system will be discussed together with the overall method used to identify, within the car trajectories under analysis, driver maneuvers matching one or more templates.

In the effort offinding the matching template driver maneuvers, the main components will be discussed below for exploitationt as a suitable implementation scheme of this part of the inventive system. (1) The following inputs to the system are provided: (i) set of templates R where each template provides the prototypical trait of one of the features selected as more informative in the discrimination of the single driver maneuver; (ii) families of query sets Q, where each family $Q_i$, corresponding to a given dataset within the VTTI and GPSLogger benchmarks, is further composed of a set of time series (called queries) each defining the course of those features appearing in the template set as they unfold over the dataset; (iii) maxDilationFactor: each query $Q_{ij}$ is partitioned into overlapping windows, which in turn will be aligned to the corresponding template through DTW. This parameter sets the length of each window in terms of a factor multiplying the template length. The higher its value, the greater will be the temporal exibility given to each match. Generic templates whose lifespan is of secondary importance are ideal candidates for a high maxDilationFactor; (iv) window( )set: starting offset of each window. The smaller its value, the more accurate will be the search for similar templates within the query, at the expense of a higher computational time; (iv) filterGranularity: once computed, matchings are sorted w.r.t. for their accuracy; due to overlappings between consecutive windows, a filter procedure is introduced with the aim of removing all those windows having a non-null overlap with the currently selected window. In particular, this removes all windows intersecting the selected one in the range $\pm|T_i|/$filterGranularity centered in the latter; (v) accuracyThreshold: remaining matches span all ranges of accuracy: hence, a threshold on the matching distances is needed to keep only query portions similar to the template, i.e. effectively representing the subtending driver maneuver. (2) The following output to the system is provided: The algorithm outputs for each template $R_j$ and query $Q_{ij}$ the set of non-overlapping windows more accurately matching the former, together with their accuracy in terms of matching distances. (3) Further, a windowed query $W_{ij}$ is given as follows: Each template has a limited temporal duration identifying a single driver maneuver, while queries contain the transcription, in terms of a certain feature, of the overall car trajectory as contained in a given dataset. In order to identify driver maneuvers within the whole trajectory, small query portions have to be scanned trying to match each of them with the template. The windowed queries (or shortly windows $W_{ij}$) the partition of query $Q_{ij}$ referred to the feature described in template $R_j$. (4) To generate matches, each $\tau$-th window $W_{ij}$ is then matched with template $R_j$, obtaining as output the alignment and the matching accuracy in terms of distance $d_{j\tau}^{DTW}$. (5) Distance aggregation is performed. As more than one feature is associated with a single driver maneuver, in order to recognize it inside a query, an aggregation of the matching distances over the various features is mandatory. Several forms of aggregation are possible, each having its own advantages and drawbacks. (6) Windows filtering and best matchings retrieval. Each $\tau$-th template-aligned windowed query is sorted according to the aggregate distance $d_{j\tau}^{Aggr}$. However, due to strong overlapping between consecutive windows, it may happen that query portions differing from each other only by a couple of elements may share adjacent ranking positions, thus identifying effectively the same match-up. In order to clean-up these dominated (i.e. having highest matching distance) overlapping windows, starting with the best match-up, all subsequent windows having non-null overlapping with the former are removed. Namely, once a suitable notion of a window's central element has been defined, either in terms of barycenter or maximum peak, any other window is considered as overlapping with the former if the same has a non-null intersection within the range of $\mu \pm |R_j|=$filterGranularity. The procedure is iterated until all windows have been processed. Finally, even if, in principle, all the surviving windows may be returned as output of the algorithm, a per-maneuver threshold accuracy Threshold may be selected in order to retain only the most significant ones.

Resuming our comments on the developed method and system, the operation of the system can be easily tuned by applying various available analytical tools to achieve the following technical goals: (1) normalizing the input signals as being for both units of measure and sampling rate, independently of the platform where they have been collected; (2) cleaning of the GPS-based data by removing the main artifacts generated by the receiver; (3) generating a set of features, in part as variously denoised variants of the four basic physical signals: position, speed, acceleration and orientation of the target car; in part as extra features computed starting from the original, possibly interpolated, variables: curvature, jerk, centripetal acceleration; (4) recognition of multidimensional templates along the trip, as candidate representatives of specific driver maneuvers. With the known prior art systems, this is not possible in a way that has the advantages of the present invention.

Figure 14:
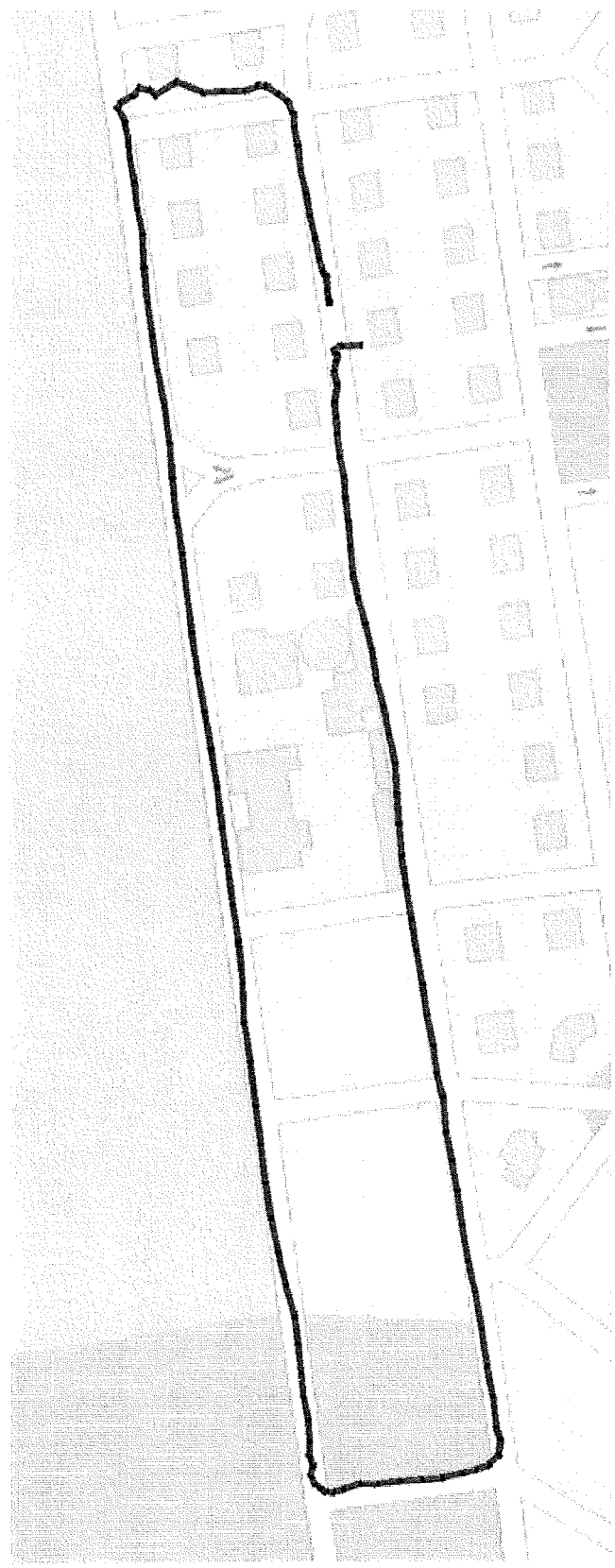
FIG. 14 shows a diagram schematically illustrating an exemplary projection of the cleaned coordinates of an EcoAndroid dynamically recorded t onto Google Maps.
Figure 15A:
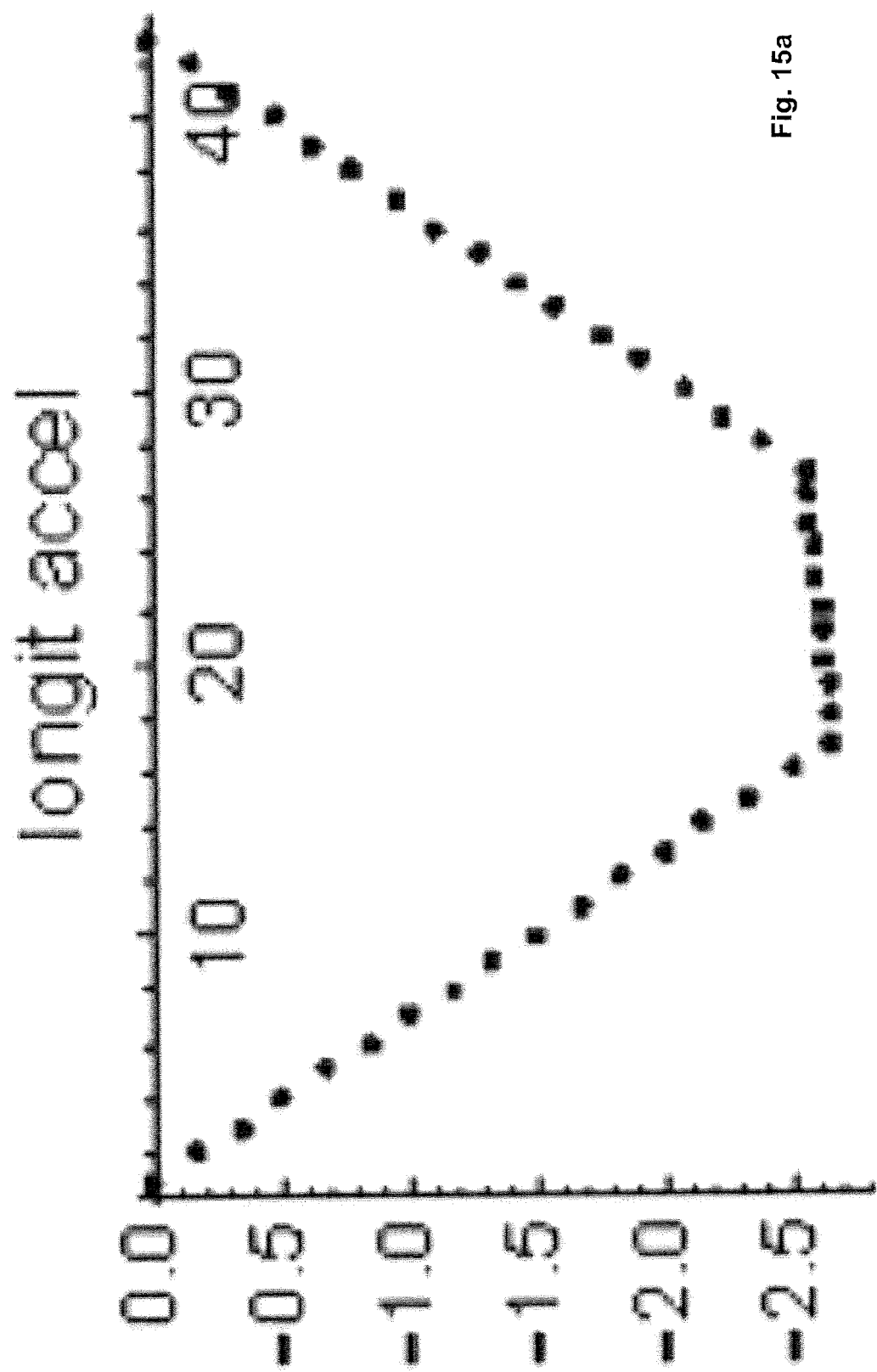
FIGS. 15a, 15b, 15c, 15d and 15e show diagrams schematically illustrating in an exemplary manner a set of basic maneuver profiles to be commonly employed to classify trip windows.
Figure 15B:
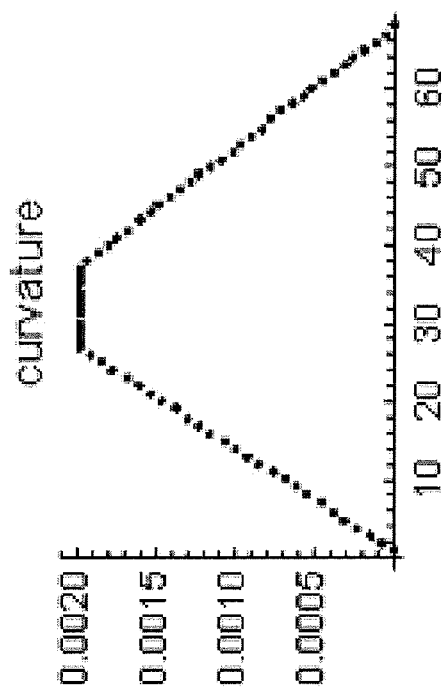
Figure 15B:
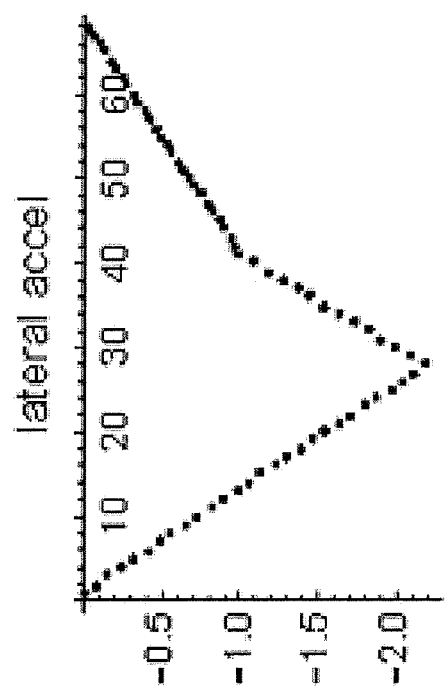
Figure 15C:
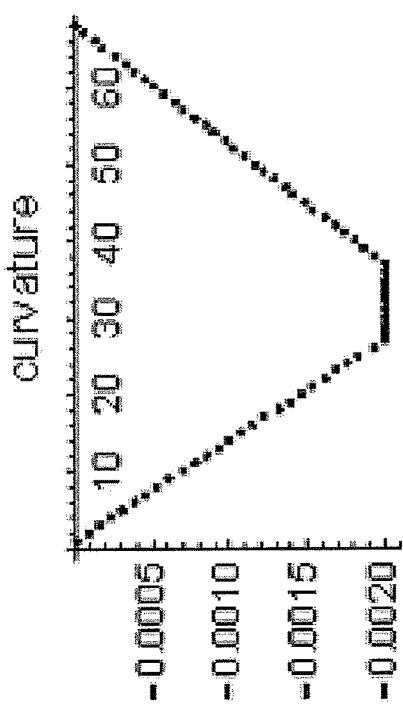
Figure 15C:
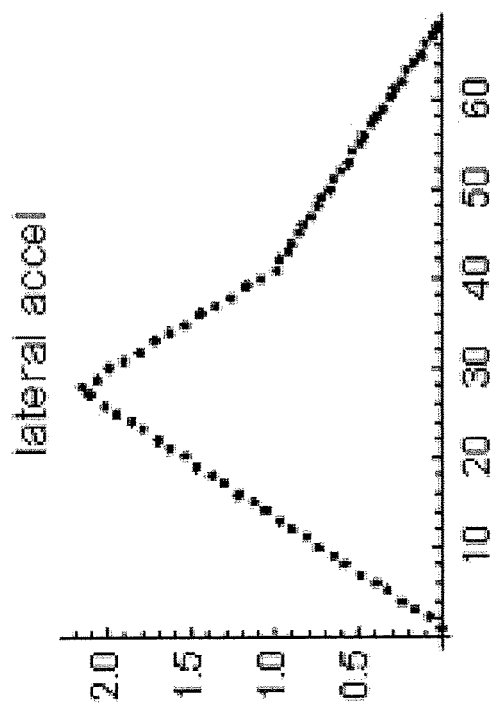
Figure 15D:
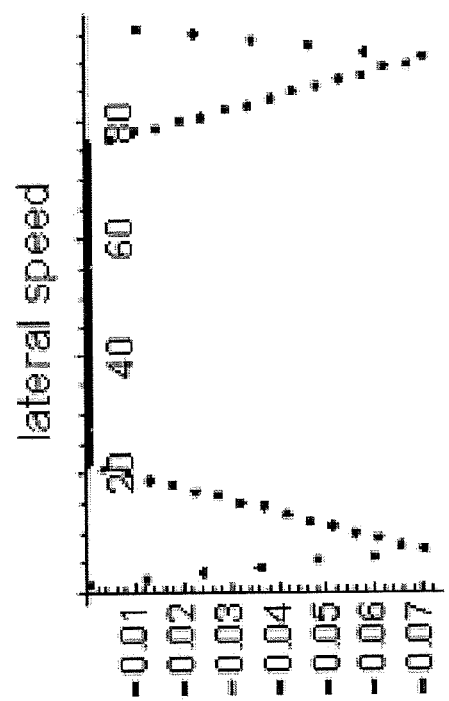
Figure 15D:
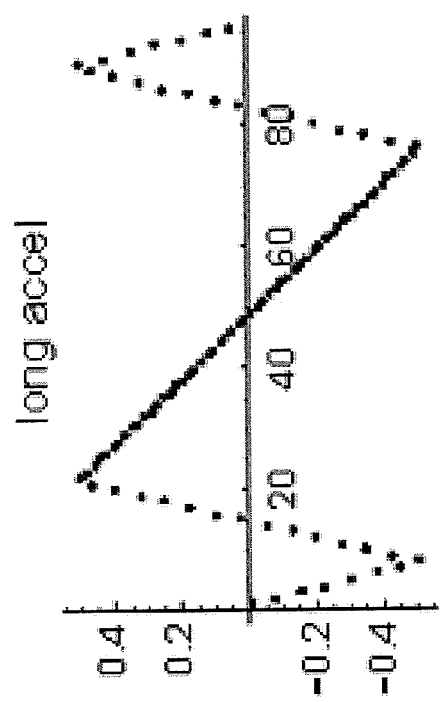
Figure 15E:
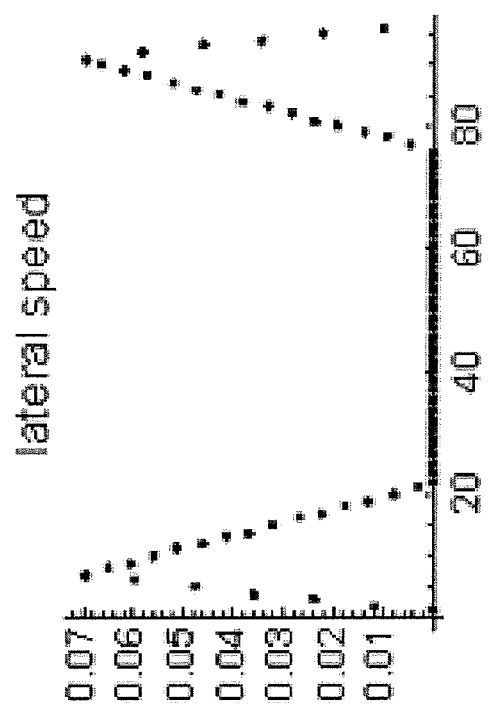
Figure 15E:
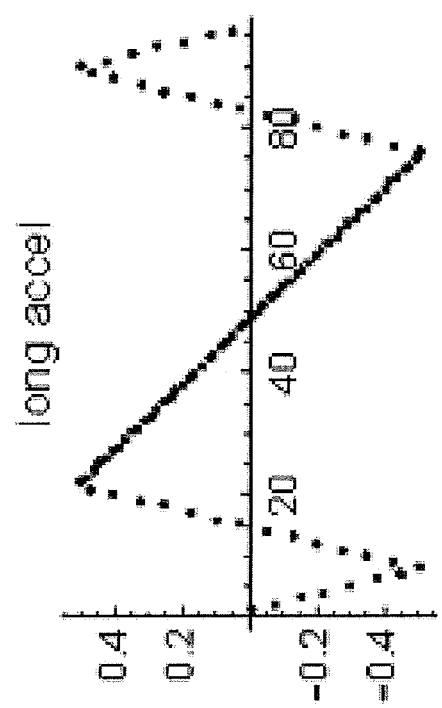

A typical exemplary output signal of the first two steps, when applied to data dynamically recorded by an EcoAndroid app, is represented in FIG. 14. As to the quality, the accurate fit of the reconstructed trajectory can be appreciated, e.g., using road maps produced by Google. Note that the ring runs clockwise, with some deviations from the right lane for overtaking other cars. The deviation from the top edge of the ring was actually done by the driver to enter a compound. To analyze this trip from a syntactic perspective, the curves of the generated features must be contrasted on their trajectory with various templates denoting meaningful driver maneuvers, and relying of the flexibility and robustness of the proposed DTW variant. Namely, at the moment, a small set of templates is preliminarily deduced from a shrunken subset of signals from the analysis of a set of manually tagged VTTI trips (see FIG. 15). The empty rows in the figure denote maneuvers that will be prototyped later on. Actually, the structure of the inventive system allows us to focus on very basic maneuvers, which can be specialized self-adaptably by the system or by a manual operation optimization. However, the present system may quickly deal with other paths that may be requested by the analytic tools or by the same.

Figure 16A:
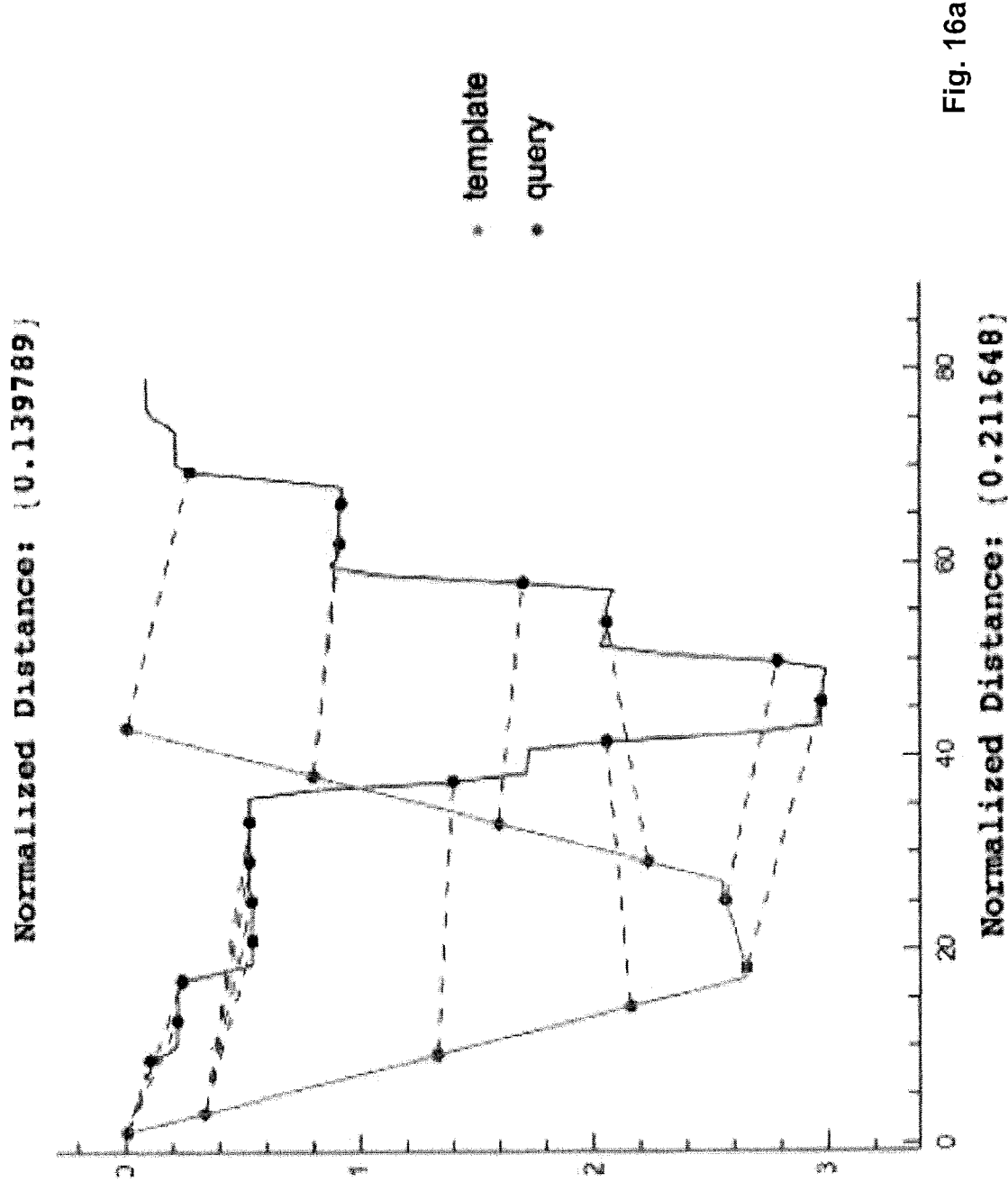
FIGS. 16a and 16b shows a diagram schematically illustrating an exemplary time warping of the hard-breaking template shown in FIG. 15 on windows partitioning the course of features ||vaccel_long||×accel_long_sign.
Figure 16B:
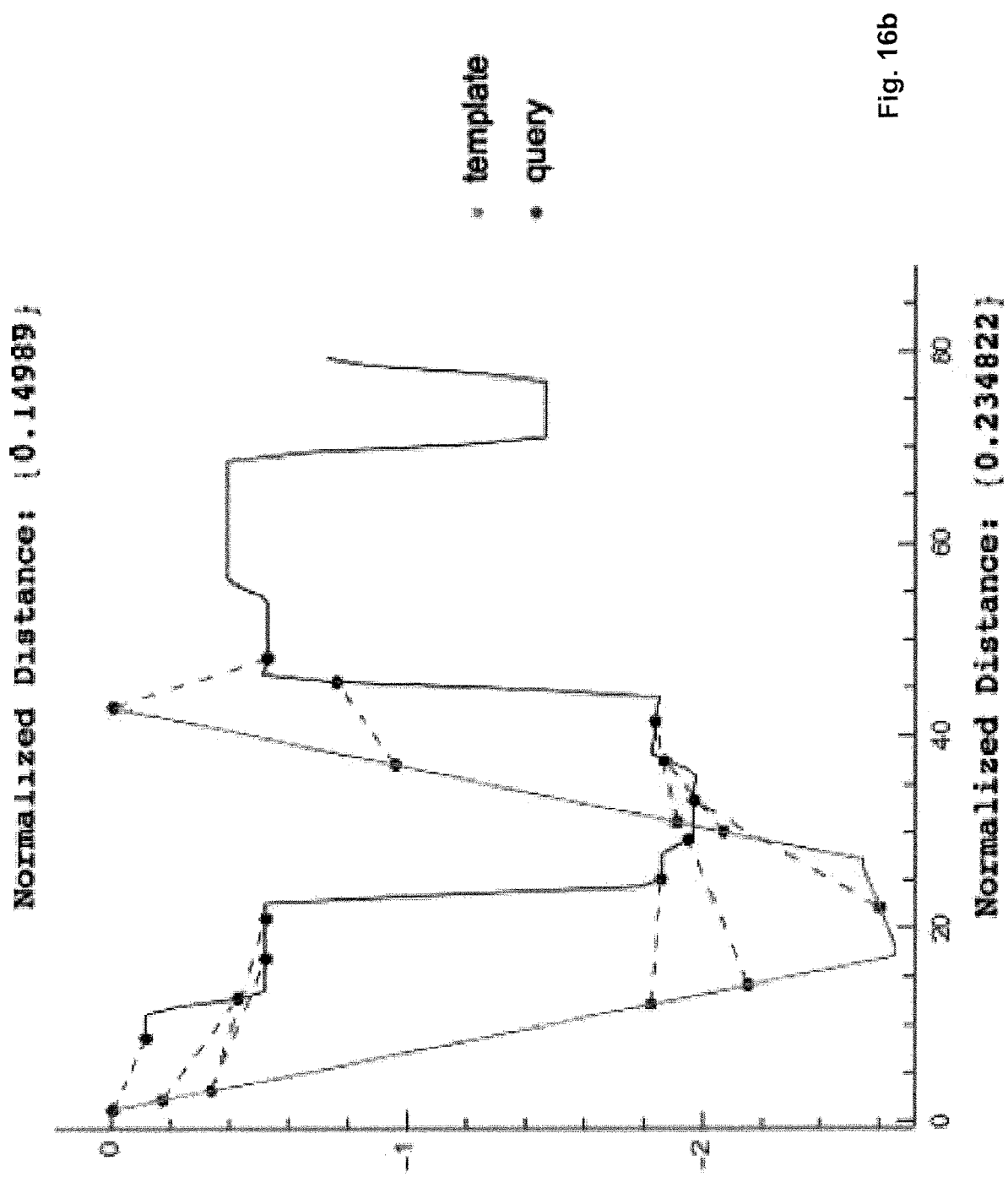

As evident from the picture, the present system allows for extremely simple template profiles through piecewise linear segments, after having averaged maneuver templates once aligned around a characteristic point (i.e. a peak). Also, this is technically not possible with the prior art system in the way of the present invention. Indeed, providing any greater detail could prove useless (or, even worse, detrimental for the generalization capability), given both the stretching of the profile performed by DTW and the "coarse granularity" of its comparison with the query windows (see FIG. 16 for a typical matching referred to hard breaking maneuver).

As for the example discussed above: (1) While the profiles in FIG. 12 are isolated in the trip in FIG. 14, the queried templates have been identified from VTTI trips, hence with different roadway width and general traffic conditions entailing different maneuvering styles, as it emerges from the comparison of the trends of the longitudinal acceleration. Hence a first specialization issue of these templates emerges as a function of environmental conditions such as those mentioned concerning the state of the road, but also those concerning weather and luminosity, etc.; (2) moreover, contrasting the speed and acceleration templates also deserves further consideration; (3) joint profiles are only loosely compatible from a physical perspective. Nevertheless, they derive from statistical observations and must fit queries that are affected by possibly non-linear and non-independent noises. Thus, there is a trade-off between physical consistency and statistical efficiency in a more mature release of the templates.

To illustrate the expected results, the task is described concerning the recognition of the left curves for the trip in FIG. 14. Identifying a curve, seen as an action in and of itself, does not involve any great complexity relative to the task of discovering of the driver's behavior, mainly, it is nothing more but a task required due to the road layout, as it occurs in some parts of our benchmark. This is more complex if a mean (or peak) value of the speed or the accelerations associated with which the curve is carried out in conjunction with the statistics on the road supplied by these parameters. In addition, curves may be the building blocks of more complex maneuvers, such as lane changes and undertaking actions; these are maneuvers chosen by the driver that are not imposed by the road conditions. However, it may be preferable to address the templates of the latter directly, assuming that as the greater the complexity of the phenomenon, the more likely it is to unequivocally distinguish the same during the trip from building blocks that may play a role in providing information redundancies.

Figure 17:
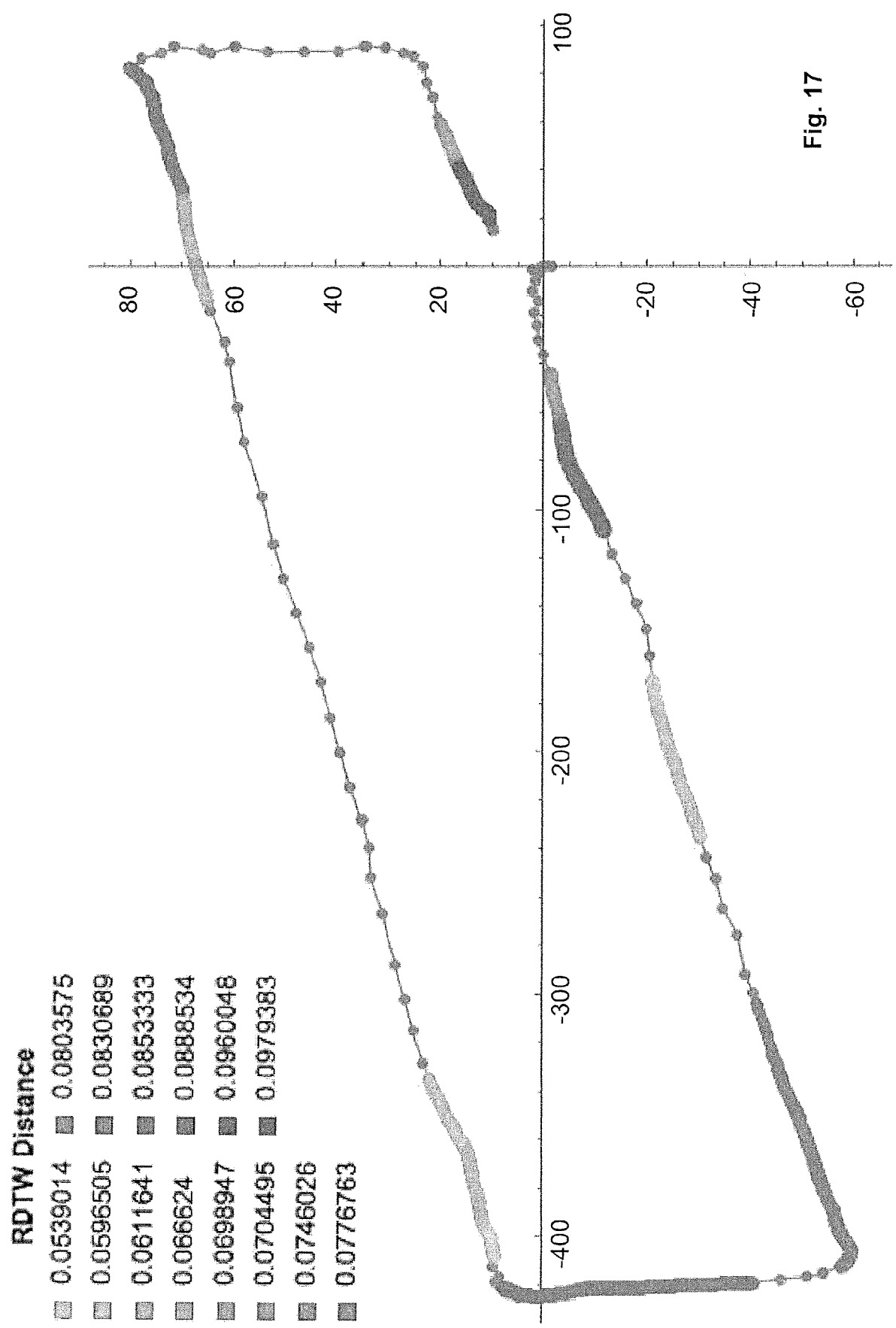
FIG. 17 shows schematically in an exemplary manner left curves recognized by the pair of templates in FIG. 15, after properly thresholding the distances between query and templates.
Figure 18:
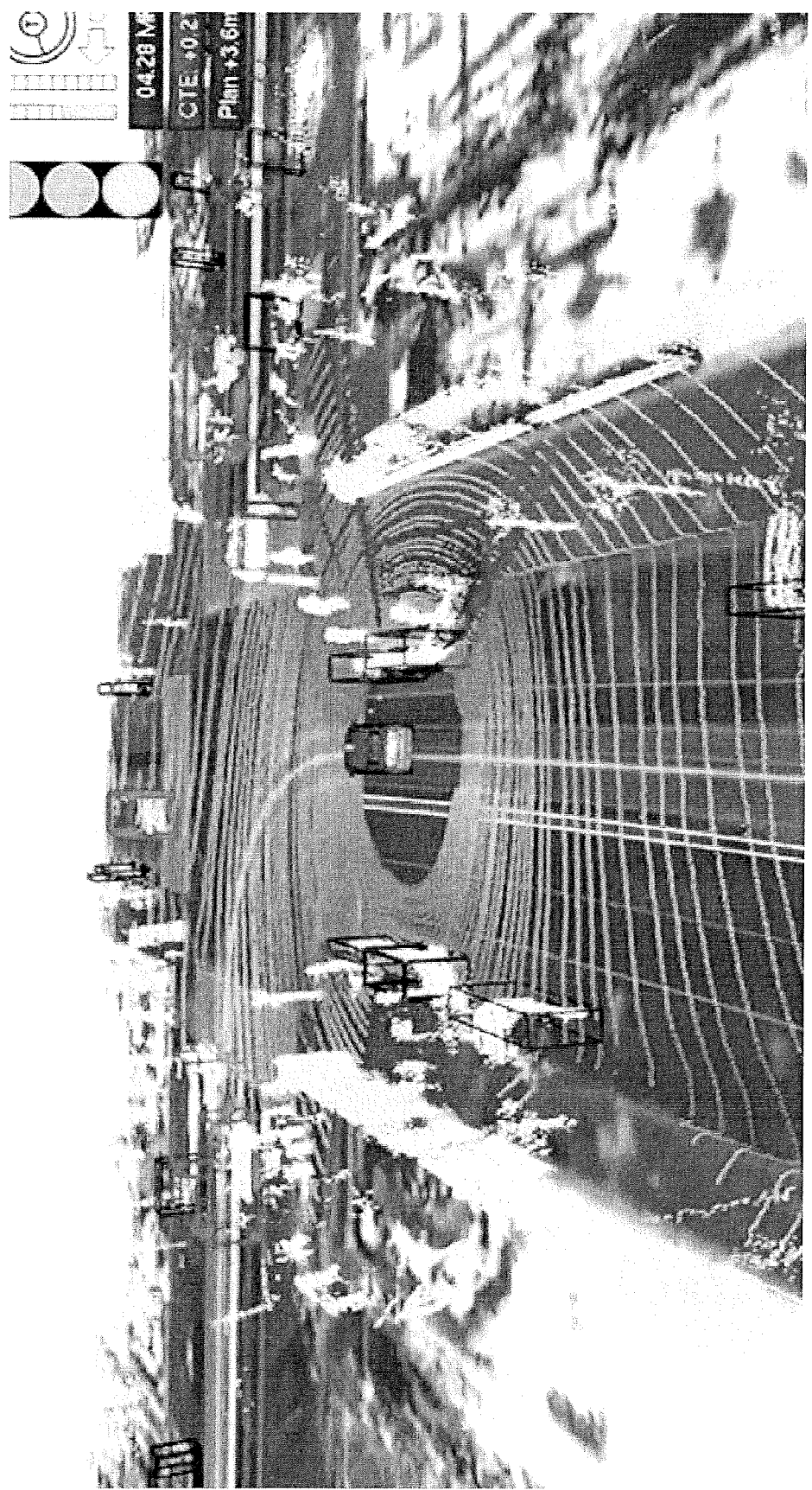
FIG. 18 shows schematically in an exemplary manner a sensing of environmental parameters (not shown), at a minimum, comprising distances to objects and/or intensity of the ambient light and/or sound amplitude by means of the exteroceptive sensors or measuring devices 4011 of the motor vehicles 41, . . . ,45 (shown in FIG. 1), i.e. how the onboard automotive control system for autonomous or partially autonomous driving of the motor vehicles 41, . . . ,45 interpreting the sensory data (not shown) of the exteroceptive sensors or measuring devices 4011 and the proprioceptive sensors or measuring devices 4012 (shown in FIG. 1), using one example from Google's fleet of robotic Toyota Priuses (spectrum.ieee.org). Such cars are capable of complete autonomous car driving or at least driving in city traffic, on busy highways and mountainous roads with only occasional human intervention.

The picture in FIG. 17 is a further demonstration of the discussed matter: (1) The paths are illustrated as a function of the normalized distance of the query window forming the bi-dimensional template, where only the windows that are in closer proximity to the template are marked. However, the rendering strategy must be optimized to avoid overlapping of windows and for clearly identifying the central area of the match-up; (2) As for the efficiency of the pattern recognition, some left curves are missing. Possibly they are the of minor significance. In any case, false positive and false negative values are intrinsic to the adopted methodology. Actually, it is possible to discover meaningful traits in a noticeably noisy context.

Concerning the acceptance of meaningful acceptation traits, this process can, for example, go in two directions for the present inventive system: (1) From a quantitative perspective it may relate meaning to the resemblance between template and queried trip window; (2) From a logical perspective, templates may be issued while having in mind special maneuvers corresponding to the same. However, since the system may not be directed for use by the police authorities; it may be preferable, on the one hand, to accept moderate percentages of false positives and false negatives in the template recognition, which, on the other hand, it may be a hindrance relative to focusing too heavily on the fact that the template resembling the window in the trip may actually correspond to the expected maneuvers, or not. It may simply be assumed that the template is a possibly interesting pattern of the involved signals, after which point check the assumption is checked statistically by appreciating its relationship with the riskiness of a driver. Hence, the system does not involve any ethic classification of the driver and his maneuvers (experienced, aggressive, and so on). A simple check is conducted to see if and how the recognized presence of some of these patterns implies an increase or decrease of the propensity of the driver for causing accidents associated with consequent economic damage to the risk-transferring, risk-ceding or insuring company.

In summary, the system is able to provide, measure and detect a series of features of the driver's trip that may be either synthesized via point statistics, such as mean, variance, Fourier coefficients, and so on, or exploited in view of their structure, thus as a series of sequential paths with specific properties as they may emerge from the comparison with a set of templates. In this way, the similarities with the templates constitute a new set of online meta-features to be properly synthesized through suitable statistics. The system provides a reliable basis for a correct joint use of features and meta-feature statistics in conjunction with environment conditions and operational parameters, possibly with the use of data mining tools, such as decision trees. In particular, the system may be used as a basis for the automated assessment of scoring models based on driver telematics, for example, associated with automated systems for dynamic, real-time risk transfer and scoring. Working as an intermediate device for automated dynamic risk measurements, the drivers' risk potential and crash attitude can, e.g., be measured based on the automatically individuated driver maneuvers within various measured car trajectories. For this, risk measurements and/or crash attitude measurements can, e.g., at least be based on driver characteristics' parameters extracted from the driver maneuver identification of the sequential patterns of the captured telematics data 3. In particular, in this context, it may be preferable that the driver maneuver identification is further triggered by the captured contextual measuring parameters. The captured contextual measuring parameters can, e.g., at a minimum, comprise road type measuring parameters and/or weather measuring parameters and/or daytime measuring parameters. For the decision, the risk measure parameters and/or crash attitude measure parameters can, e.g., comprise a contextual measuring parameter optimum point varying from the captured contextual measuring parameters, while increasing both sides. Finally, the system can, e.g., be enabled to provide measuring parameters for discriminating driver behaviors and risks measuring by relating the underlying crash or near-crash trajectories based on the individuated car trajectories.

For the risk measurement and risk scoring measurement, the dynamic time warping-based telematics circuit 10 can, e.g., comprise a core aggregator driven by vehicle-telematics with telematics data-based triggers triggering, capturing, and monitoring the data flow pathway of the sensors 401, . . . , 405 and/or the onboard diagnostic system and/or the in-car interactive device of the motor vehicle 41, . . . ,45 said operating parameters and/or environmental parameters during the operation of the motor vehicle 41, . . . ,45. The mobile telematics devices can, e.g., comprise, at a minimum, a GPS module (global positioning system) and/or geological compass module based on a 3-axis teslameter and a 3-axis accelerometer and/or gyrosensor or gyrometer and/or a MEMS accelerometer sensor comprising a cantilever beam with the seismic mass as a proof mass measuring the proper or g-force acceleration, and/or a MEMS magnetometer or a magnetoresistive permalloy sensor or other three-axis magnetometers.

The dynamic time warping-based telematics circuit 10 can, e.g., further comprise a driving score module 101 measuring and/or generating a single or a compounded set of variable scoring parameters profiling the use and/or style and/or environmental condition of driving during operation of the motor vehicle 41, . . . ,45 based upon the triggered, captured and monitored operating parameters or environmental parameters. Thus, system scores individual drivers based on the measured and identified driver maneuvers, respectively, on the monitored operating parameters or environmental parameters. Based on the score and/or other relevant telematics data visible to consumers and the risk transfer provider (insurers) (if consumer agrees), the first risk transfer systems 11 are capable of quoting. The single or compounded set of variable scoring parameters are profiling the use and/or style and/or environmental condition of driving during the operation of the motor vehicle 41, . . . ,45 and can be, e.g., generated by means of the driving score module 101 comprising, at a minimum, scoring parameters measuring a driving score and/or a contextual score and/or a vehicle safety score. For the driving score, the contextual score and the vehicle safety score, (i) the variable driving score parameter is, at a minimum, based upon a measure of driver behavior parameters comprising the identified maneuver and/or speed and/or acceleration and/or braking and/or cornering and/or jerking and/or a measure of distraction parameters comprising mobile phone usage while driving and/or a measure of fatigue and/or drug use parameters, (ii) the variable contextual scoring parameter is, at a minimum, based upon measured trip score parameters based on road type and/or the number of intersections and/or tunnels and/or elevations and/or measured time of travel parameters and/or the measured weather parameters and/or measured location parameters and/or measured distance driven parameters, and (iii) the variable vehicle safety scoring parameter is at least based upon measured ADAS feature activation parameters and/or measured vehicle crash test rating parameters and/or on a measured level of automation parameters of the motor vehicle 41, . . . ,45 and/or measured software risk score parameters. This automated scoring feature makes it possible to link all main contributors of accidents to risk relevant data points and risk drivers for scoring and the risk management/assessment of technical objects. By means of the CAN-BUS or TCU (telematics control unit) data of the vehicle, the scoring and risk measurement/assessment can be achieved more accurately and more precisely for end consumers leading to an improved and optimized client-centric experience and risk selection. Measuring the driver maneuvers, the score measurement can be improved by further contributors, which, e.g., can comprise contributors as follows: (1) Distracted driving, (2) speeding, (3) drunk driving, (4) reckless driving, (5) rain, (6) running red lights, (7) running stop signs, (8) teenage drivers, (9) night driving, (10) car design effects, etc. A data link 21 is set up by means of the wireless connection of the mobile telematics devices using a mobile telecommunications network 2 between the mobile telematics devices as client and the central, expert system-based circuit 10. The mobile telematics devices act as a wireless node 221, . . . , 225 within said mobile telecommunications network 2. The dynamic time warping-based telematics circuit 10 automatically generates said single or set compounded of variable scoring parameters. Exemplary score measuring parameters could be as follows: e.g., a driving score, such as driving maneuvers and/or speed, acceleration, jerking, distraction, fatigue, traffic lights, tailgating (following too closely), etc. and a contextual score such as weather, road types, road signs, etc. and a vehicle safety score, such as activated/usage of automated features, etc.

A shadow request is transmitted to a plurality of automated first risk transfer systems 11, connected in a decentralized manner to the dynamic time warping-based telematics circuit 10 using a data transmission network. The shadow request comprises, at a minimum, risk-relevant parameters based upon the measured and/or generated single or compounded set of variable scoring parameters. The dynamic time warping-based telematics circuit 10 receives, in response to the emitted shadow request, a plurality of individualized risk transfer profiles based upon the dynamically collected single or compounded set of variable scoring parameters. The risk-relevant parameters of the shadow request comprise, at a minimum, usage-based 31 and/or user-based 32 and/or operating 33 telematics data 3 measured and/or generated by the mobile telematics devices based upon the triggered, captured, and monitored operating parameters or environmental parameters, and the generated single or compounded set of variable scoring parameters. The shadow requests can, e.g., be periodically transmitted to the plurality of automated first risk transfer systems 11 based on the dynamically generated single or compounded set of variable scoring parameters and/or the triggered, captured, and monitored operating parameters or environmental parameters. A result list can be dynamically adapted in real time and displayed to the user for selection via the dashboard 461, . . . , 465 or another interactive device of the motor vehicles 41, . . . 45. However, the shadow requests can also be generated and transmitted to the plurality of automated first risk transfer systems 11 based on the dynamically generated single or compounded set of variable scoring parameters and/or the triggered, captured, and monitored operating parameters or environmental parameters, if the central, expert system-based circuit 10 triggers an alternation of the dynamically generated single or compounded set of variable scoring parameters and/or the triggered, captured and monitored operating parameters or environmental parameters. The result list can be dynamically adapted in real time and displayed to the user for selection. As embodied variant, a combination of the two afore-mentioned shadow request generations may also be applied.

The dynamic time warping-based telematics circuit 10 dynamically captured and categorized the received plurality of individualized risk transfer profiles of the automated first risk transfer systems 11. The result list can be dynamically updated and provided for display and selection to the user of the motor vehicle 41, . . . ,45 by means of the motor vehicle dashboards 461, . . . , 465 based upon the triggered, captured, and monitored operating parameters or environmental parameters during operation of the motor vehicle 41, . . . ,45. Therefore, the plurality of individualized risk transfer profiles, as provided by the automated first risk transfer system 11, vary as a function of time based on the generated single or compounded set of variable scoring parameters measuring the time-dependent use and/or style and/or environmental condition of driving during operation of the motor vehicle 41, . . . ,45. The dynamic accident causation and accident risk measuring system can, e.g., automatically alert the user, if a more preferable risk transfer profile is triggered in relation to an earlier selected risk transfer profile. Further, the telematics-based system can also automatically adapt a risk transfer associated with a user or motor vehicle 41, . . . ,45, if a more preferable risk transfer profile is triggered in relation to a selected risk transfer profile. The result list can be adapted dynamically in real time and displayed to the user for selection based upon definable categorization criteria, such as for example, first payment parameters and/or duration and/or risk transfer structure.

LIST OF REFERENCE SIGNS

Dynamic accident causation and accident risk measuring system
   10 Dynamic aggregation-based telematics circuit/functional
    data aggregation circuit
    100 Telematics data-based trigger
    101 Scores driving module
     Scores driving parameters
     1021, . . . ,1023 Defined scores driving behavior patterns
    102 Additional trigger triggering accident notification
    103 Additional trigger triggering added services
   Vehicle telematics-driven aggregator
    1041 Predefined time period
   105 Database with historical data
   106 Automated database with location-depent data
   107 Switching device
   Driver maneuvers
    10801 Dynamic time warping-based telematics circuit
    Driver maneuver identification
     Sequential patterns
     Searchable measuring parameter sets of driving maneuvers
     First data store unit
     Operation measuring parameter sets
     Hierarchical structure of the vehicle operations or driving features
    Pattern template identification
     Prototypical parameter patterns
     Searchable predefined measuring parameter pattern templates
     Second data store unit
     Individuated time intervals
     Duration of captured maneuver patterns
     Captured maneuver patterns
    Operations or features of a driver maneuver
    Trajectory of a driving maneuver
    Temporal variation-independent measuring parameter
    Temporal sequence
   Shadow requests
 11 First risk transfer system
   111 Automated resource pooling system
   112 First data store
    First payment parameters
   113 First payment transfer modules
   Individualized risk-transfer profiles
 12 Second risk transfer system
   121 Automated resource pooling system
   122 Second data store
    1221, . . . ,1225 Second payment parameters
   123 Second payment transfer modules
    1231 Control device
    1232 Activation control parameter
   124 Activation threshold parameters
   125 Predefined loss covering portion
2 Data transmission networks
 20 Cellular network grids
   201, . . . , 203 Network cell/basic service area
   211, . . . , 213 Base (transceiver) station
    2111, . . . ,2131 Cell global identity (CGI)
   221, . . . , 225 Mobile network nodes
 21 Uni- or bi-directional data link
3 Telematics data
 31 Usage-based telematics data
   311, . . . ,313 Usage-based automotive data of the vehicles 41, . . . ,45
 32 User-based telematics data
   321, . . . ,323 User-based automotive data of the vehicles 41, . . . ,45
 33 Operational telematics data
   331, . . . ,333 Operational data of the control system
   461, . . . , 465 41, . . . ,45 Motor vehicles Mobile telematics devices
401, ..., 405 Onboard or on-device sensors and measuring devices
　4011 Exteroceptive sensors or measuring devices
　　Sensory data of the exteroceptive sensors 40112
　　Global positioning system (GPS)
　　40113 Ultrasonic sensors
　　40114 Odometry sensors
　　40115 LIDAR (light detection and ranging)
　　40116 Video cameras
　　40117 Radar sensors
　4012 Proprioceptive sensors or measuring devices
　　Sensory data of the proprioceptive sensors
　　411, ..., 415 Wireless or wired connections
421, ..., 425 Data transmission bus interfaces
Onboard diagnostic system In-car interactive device
　Data flow pathways of the mobile telematics device
　461, ..., 465 Control circuit for autonomous motor vehicle driving
　　4611 Operating parameters of the automotive control circuit
Mobile phone device/Mobile smart phone device 5
　Aggregated risk exposures
　51, ..., 55 Transferred risk exposures of the motor vehicles
　　501, ..., 505 First risk transfer parameters
　　511, ..., 515 Second risk transfer parameters
6 Predefined risk events
　61 Predefined risk events related to liability coverage for damages
　　611, ...,613 Parameters measuring the occurrence of events 61
　62 Predefined risk events related to liability coverage for losses
　　621, ...,623 Parameters measuring the occurrence of events 62
　63 Predefined risk events related to liability coverage for delay in delivery
　　631, ...,633 Parameters measuring the occurrence of events 63 71, ..., 75 Occurred loss associated with the motor vehicles 41, ...,45
　　711, ...,715 Captured loss parameters of measured predefined event 1
　　721, ...,725 Captured loss parameters of measured predefined event 2
　　731, ...,735 Captured loss parameters of measured predefined event 3
80 Aggregated loss parameters
81 Aggregated payment parameters
82 Variable loss ratio parameters
　821 Loss ratio threshold value
Vehicle trajectories
Driver maneuvers

The invention claimed is:

1. An electronic maneuver detection system in real time based on dynamically measured telematics data, wherein driver behaviors and operational parameters are measured and discriminated based on automatically individuated driver maneuvers within various measured vehicle trajectories, and wherein measured sensory data are real-time filtered, and start and endpoints of driving events are isolated and identified in real-time, the electronic maneuver detection system comprising:

a plurality of sensors included in each of mobile telematics devices, the plurality of sensors including at least an accelerometer sensor, a global positioning system (GPS) sensor, and a gyroscope sensor, the plurality of sensors configured to capture the telematics data associated with a motor vehicle and users; and circuitry configured to:

capture telematics data, by the plurality of sensors of each of the mobile telematics devices associated with a plurality of motor vehicles, the mobile telematics devices comprising one or more wireless connections, wherein, for providing the wireless connection, each of the mobile telematics devices acts as a wireless node within a corresponding data transmission network by antenna connections of the mobile telematics device, wherein each of the mobile telematics devices is an integral part of a mobile phone device and connected to a monitoring cellular mobile node application of the mobile phone device;

implement a dynamic, functional aggregation-based telematics circuit to which the mobile telematics devices are connected, wherein a data link is set between the dynamic, functional aggregation-based telematics circuit transmitting at least the captured telematics data from the mobile telematics devices to the dynamic, functional aggregation-based telematics circuit;

for driver maneuver identification, match sequential patterns of the captured telematics data with searchable predefined measuring parameter sets of driving maneuvers by the dynamic, functional aggregation-based telematics circuit, wherein the dynamic, functional aggregation-based telematics circuit stores the searchable predefined measuring parameter sets of driving maneuvers, wherein each driving maneuver is composed of a plurality of hierarchically structured operation-measuring parameter sets providing a hierarchical structure of vehicle operations or driving features, and wherein a specific operation or driving feature of a motor vehicle is separately triggerable based on a corresponding operation parameter set, wherein each driving maneuver is composed of sequential patterns of operations or driving features by the hierarchically structured operation-measuring parameter sets which are each extractable and measurable by measuring telematics parameters exhibiting during a lifespan of a driving maneuver;

for pattern template identification, store searchable predefined measuring parameter pattern templates of driving maneuvers, wherein each single driving maneuver is composed of a plurality of prototypical parameter patterns, wherein an individuated time interval is measured spanning a duration of a captured maneuver pattern by the dynamic, functional aggregation-based telematics circuit, wherein the measured individuated time interval is used as a time index for extracting portions of features effectively corresponding to a selected maneuver, wherein, for each captured maneuver pattern and each operation or feature, a similarity measurement of detected operation or feature profiles is performed ranging over possible trajectories used as a benchmark and highly correlated operations or features are selected;

automatically individuate captured driver maneuvers within various car trajectories provided by the matched searchable predefined measuring parameter sets of driving maneuvers and the searchable predefined measuring parameter pattern templates of driving maneuvers, wherein, for two temporal sequences, within the telematics data, a temporal-variation independent measuring parameter is measured, each time, by the dynamic, functional aggregation-based telematics circuit, wherein the dynamic, functional aggregation-based telematics circuit provides an optimal match between the two temporal sequences by non-linearly warping the temporal sequences in a time dimension, and wherein one of the two temporal sequences, which comprise two time series, is locally stretched or compressed while optimizing measured similarity between the two temporal sequences of the telematics data; and perform machine learning based on a neural network, wherein the machine learning includes status observation and learning, wherein the status observation observes status variables of the sequential patterns of the captured telematics data, and wherein the learning performs a learning operation by linking at least one of the observed status variables of the sequential patterns to at least one of the searchable predefined measuring parameter sets of the driving maneuvers.

2. The electronic maneuver detection system in real time according to claim 1, wherein the dynamic, functional aggregation-based telematics circuit is implemented as a dynamic, time warping-based telematics circuit, wherein, for driver maneuver identification, a matching of the sequential patterns is implemented based on dynamic time warping over the searchable predefined measuring parameter sets of driving maneuvers.

3. The electronic maneuver detection system in real time according to claim 1, wherein the dynamic, functional aggregation-based telematics circuit is implemented as a dynamic, symbolic-aggregate-approximation-based telematics circuit or a dynamic, piecewise-aggregate-approximation-based telematics circuit, wherein, for driver maneuver identification, a matching of the sequential patterns is implemented based on dynamic, symbolic-aggregate-approximation or dynamic, piecewise-aggregate-approximation over the searchable predefined measuring parameter sets of the driving maneuvers.

4. The electronic maneuver detection system in real time according to claim 1, wherein the machine learning includes reward computing and function updating, wherein the reward computing generates a reward based on at least one of the temporal sequences, wherein, for a temporal sequence within the captured telematics data, as observed by the status observation, a temporal variation-independent reward parameter is measured, each time, by the dynamic, functional aggregation-based telematics circuit, and wherein the function updating updates a function for deciding, from the observed status variables of the sequential patterns at present, based on the reward generated by the reward computing, at least one of the searchable predefined measuring parameter sets of driving maneuvers, and wherein the searchable predefined measuring parameter pattern templates of driving maneuvers provide an optimal match between the two temporal sequences.

5. The electronic maneuver detection system in real time according to claim 1, wherein the machine learning is based on a convolutional neural network or a recurrent neural network or a standard backpropagation neural network.

6. The electronic maneuver detection system in real time according to claim 1, wherein the mobile telematics devices comprise one or more wireless or wired connections and a plurality of interfaces for connecting with at least one of a motor vehicle's data transmission busses and/or a plurality of interfaces for connecting with sensors and/or measuring devices, wherein the mobile telematics devices are connected to onboard diagnostics systems and/or in-car interactive devices and/or a monitoring cellular mobile node application.

7. The electronic maneuver detection system in real time according to claim 1, wherein the captured telematics data are based solely on measuring data from the accelerometer sensor and the GPS sensor and the gyroscope sensor.

8. The electronic maneuver detection system in real time according to claim 1, wherein the automatically individuated driver maneuvers, at a minimum, comprise maneuvers of harsh acceleration and/or harsh braking and/or fast lateral road entries and/or left and right overtaking actions.

9. The electronic maneuver detection system in real time according to claim 1, wherein the telematics data are mainly captured by the mobile telematics devices implemented as an integral part of a mobile cellular phone or Original Equipment Manufacturer (OEM) line-fitted telematics device (TCU) of a connected car and transmitted to a dynamic time warping-based telematics circuit.

10. The electronic maneuver detection system in real time according to claim 1, wherein an accident risk of a measured driver's behavior, based on identified driving maneuvers, is measured, wherein historic risk causation data are captured building an accident statistics basis for measuring and/or weighting the linking of the identified driving maneuvers to a risk measure or score.

11. The electronic maneuver detection system in real time according to claim 1, wherein a driver's risk potential and crash attitude are measured, based on the automatically individuated driver maneuvers within measured car trajectories.

12. The electronic maneuver detection system in real time according to claim 1, wherein derived risk measure parameters and/or crash attitude measure parameters are based at least on driver characteristics parameters extracted from a driver maneuvers identification of the sequential patterns of the captured telematics data.

13. The electronic maneuver detection system in real time according to claim 1, wherein the driver maneuver identification is further triggered by captured contextual measuring parameters.

14. The electronic maneuver detection system in real time according to claim 13, wherein the captured contextual measuring parameters comprise road condition measuring parameters and/or weather measuring parameters and/or daytime measuring parameters.

15. The electronic maneuver detection system in real time according to claim 13, wherein derived risk measure parameters and/or crash attitude measure parameters comprise an optimum point within a contextual measuring parameter that varies among the captured contextual measuring parameters, while increasing on both sides of the optimum point.

16. The electronic maneuver detection system in real time according to claim 1, wherein selected templates are filtered by providing template averaging by coupled filters, removing artifacts and individual singularities and establishing templates that are each specific to a single captured maneuver.

17. The electronic maneuver detection system in real time according to claim 16, wherein said coupled filters, at a minimum, comprise a Gaussian filter and/or moving average and/or median filter, wherein each template is made specific for a single maneuver by using the coupled filters.

18. The electronic maneuver detection system in real time according to claim 16, wherein the coupled filters are dynamically adapted by the electronic maneuver detection system to a measured generalization threshold value, where different phenotypical representations of a selected reference maneuver from the stored searchable predefined measuring parameter sets of driving maneuvers are captured.

19. The electronic maneuver detection system in real time according to claim 1, wherein captured driver maneuvers are automatically individuated within the various car trajectories provided by the matched searchable predefined measuring parameter sets of the driving maneuvers and the searchable predefined measuring parameter pattern templates of driving maneuvers, wherein the electronic maneuver detection system automatically discriminates between various possible maneuvers by returning that portion of vehicle trajectory most accurately matching the same upon inputting a selected set of templates.

20. The electronic maneuver detection system in real time according to claim 1, wherein the circuitry is configured to provide measuring parameters for discriminating driver behaviors and risks measures by relating underlying crash or near-crash trajectories based on the individuated driver maneuvers within the various car trajectories.

21. An electronic accident causation and accident risk measuring system in real time based on dynamically measured telematics data, wherein driver behaviors and operational parameters are measured and discriminated by the electronic accident causation and accident risk measuring system based on automatically individuated driver maneuvers within various measured vehicle trajectories, and wherein measured sensory data are real-time filtered, and start and endpoints of driving events are isolated and identified in real-time, the electronic accident causation and accident risk measuring system comprising:
  a plurality of sensors included in each of mobile telematics devices, the plurality of sensors including at least an accelerometer sensor, a global positioning system (GPS) sensor, and a gyroscope sensor, the plurality of sensors configured to capture the telematics data associated with a motor vehicle and users; and
  circuitry configured to:
  capture data from mobile telematics devices associated with a plurality of motor vehicles, the mobile telematics devices comprising one or more wireless or wired connections and a plurality of interfaces for connecting with at least one of a motor vehicle's data transmission busses and/or sensors and/or measuring devices, wherein, for providing the wireless connection, the mobile telematics devices act as wireless nodes within a corresponding data transmission network by antenna connections of the mobile telematics devices, and wherein each of the mobile telematics devices is connected to an onboard diagnostics system and/or an in-car interactive device and/or a monitoring cellular mobile node applications;
  implement a dynamic time warping-based telematics circuit to which the mobile telematics devices are connected, wherein a data link is set by the wireless connection between the dynamic time warping-based telematics circuit transmitting at least the captured telematics data from the mobile telematics devices to the dynamic time warping-based telematics circuit;
  for driver maneuver identification, match sequential patterns of the captured telematics data with searchable predefined measuring parameter sets of driving maneuvers by the dynamic time warping-based telematics circuit, wherein the dynamic time warping-based telematics circuit stores the searchable predefined measuring parameter sets of driving maneuvers, wherein each driving maneuver is composed of a plurality of hierarchically structured operation measuring parameter sets providing a hierarchical structure of vehicle operations or driving features, and wherein a specific operation or driving feature of a motor vehicle is separately triggerable based on a corresponding operation parameter set, wherein each driving maneuver is composed of sequential patterns of operations or driving features by the hierarchically structured operation-measuring parameter sets, which are each extractable and measurable by measuring telematics parameters exhibiting during a lifespan of a driving maneuver;
  for pattern template identification, store searchable predefined measuring parameter pattern templates of driving maneuvers, wherein each single driver maneuver is composed of a plurality of prototypical parameter patterns, wherein an individuated time interval is measured spanning a duration of a captured maneuver pattern by the dynamic time warping-based telematics circuit, the measured individuated time interval is used as a time index to extract portions of features effectively corresponding to a selected maneuver, wherein, for each captured maneuver pattern and each operation or feature, a similarity measurement of detected operation or feature profiles is performed ranging over possible trajectories used as a benchmark and highly correlated operations or features are selected;
  automatically individuate captured driver maneuvers within various car trajectories provided by the matched searchable predefined measuring parameter sets of driving maneuvers and the searchable predefined measuring parameter pattern templates of driving maneuvers, wherein, for two temporal sequences within the captured telematics data, a temporal variation-independent measuring parameter is measured, each time, by the dynamic time warping-based telematics circuit, wherein the dynamic time warping-based telematics circuit provides an optimal match for the two temporal sequences by non-linearly warping the temporal sequences in a time dimension, and wherein one of the two temporal sequences, which comprise two time series, is locally stretched or compressed while optimizing measured similarity between the two temporal sequences of telematics data; and
  perform machine learning based on a neural network, wherein the machine learning includes status observation and learning, wherein the status observation observes status variables of the sequential patterns of the captured telematics data, and wherein the learning performs a learning operation by linking at least one of the observed status variables of the sequential patterns to at least one of the searchable predefined measuring parameter sets of the driving maneuvers.

22. The accident causation and risk measuring system according to claim 21, wherein the automatically individuated driver maneuvers comprise a maneuver for harsh acceleration and/or harsh braking and/or fast lateral road entries and/or left and right overtaking action.

23. The accident causation and risk measuring system according to claim 21, wherein the telematics data are mainly captured by the mobile telematics devices implemented as an integral part of a mobile cellular phone or Original Equipment Manufacturer (OEM) line fitted telematics device (TCU) of a connected car and transmitted to the dynamic time warping-based telematics circuit.

24. The accident causation and risk measuring system according to claim 21, wherein an accident risk of a measured driver behavior based on identified driving maneuvers is measured, wherein historic risk causation data are captured thereby building an accident statistics base for measuring and/or weighting the linking of the identified driving maneuvers to a risk measure or score.

25. The accident causation and risk measuring system according to claim 21, wherein driver risk potential and crash attitude are measured based on the automatically individuated driver maneuvers within various measured car trajectories.

26. The accident causation and risk measuring system according to claim 21, wherein risk measurements and/or crash attitude measurements are based at least on driver characteristics parameters extracted from the driver maneuver identification of the sequential patterns of the captured telematics data.

27. The accident causation and risk measuring system according to claim 21, wherein driver maneuver identification is further triggered by captured contextual measuring parameters.

28. The accident causation and risk measuring system according to claim 27, wherein the captured contextual measuring parameters comprise road condition measuring parameters and/or weather measuring parameters and/or daytime measuring parameters.

29. The accident causation and risk measuring system according to claim 27, wherein derived risk measure parameters and/or crash attitude measure parameters comprise a contextual optimum point of the measuring parameter that varies among the captured contextual measuring parameters, while increasing on both sides of the contextual optimum point.

30. The accident causation and risk measuring system according to claim 27, wherein the captured contextual measuring parameters are, at a minimum, based upon measured trip score parameters, reliant on road condition and/or number of intersections and/or tunnels and/or elevations, and/or measured time of travel parameters, and/or measured weather parameters and/or measured location parameters, and/or measured distance driven parameters.

31. The accident causation and risk measuring system according to claim 21, wherein selected templates are filtered by providing template averaging by coupled filters thus removing artifacts and individual singularities and establishing each template specific to a single captured maneuver.

32. The accident causation and risk measuring system according to claim 31, wherein said coupled filters comprise a Gaussian filter and/or moving average and/or median filter, wherein each template is made specific to a single maneuver by using the coupled filters.

33. The accident causation and risk measuring system according to claim 31, wherein the coupled filters are dynamically adapted by the accident causation and risk measuring system to a measured generalization threshold value, where different phenotypical representations of a selected reference maneuver from the stored searchable predefined measuring parameter pattern templates of driving maneuvers are captured.

34. The accident causation and risk measuring system according to claim 21, wherein captured driver maneuvers are automatically individuated within the various car trajectories provided by the matched searchable predefined measuring parameter sets of driving maneuvers and the searchable predefined measuring parameter pattern templates of driving maneuvers, wherein the accident causation and risk measuring system automatically discriminates between various possible maneuvers by returning those portions of vehicle trajectories that are most accurately matching the same upon inputting a selected set of templates.

35. The accident causation and risk measuring system according to claim 34, wherein the circuitry is configured to provide measuring parameters for discriminating driver behaviors and risks that are measured by relating underlying crash or near-crash trajectories based on the individuated driver maneuvers within the various car trajectories.

36. The accident causation and risk measuring system according to claim 21, wherein the accident causation and risk measuring system provides a first risk-transfer based on first risk transfer parameters from at least some of the motor vehicles, wherein the first risk transfer parameters are at least partially generated based upon the output signal generation, steered and/or adapted by derived risk measure parameters and/or crash attitude measure parameters, further comprising first risk transfer systems, the first risk transfer systems comprising a plurality of payment transfer modules configured to receive and store first payment parameters associated with risk transfer of risk exposures of said motor vehicles for pooling their risks, and in that an automated telematics-based system provides a second risk transfer based on second risk transfer parameters from a first risk transfer to a second risk-transfer, wherein the accident causation and risk measuring system receives and stores second payment parameters for pooling risks of the first risk transfer associated with risk exposures transferred in the first risk transfer, wherein, by vehicle telematics-driven aggregation of the dynamic time warping-based telematics circuit associated with a second risk transfer system, risk-related usage-based and/or user-based telematics data are captured by the mobile telematics devices and triggered and monitored by telematics data-based triggers in data flow pathway of the mobile telematics devices, wherein the dynamic time warping-based telematics circuit associated with the second risk transfer system further measures and/or generates a single or a compounded set of variable scoring parameters profiling use and/or style and/or environmental conditions of a driving action during the operation of the motor vehicle, based upon the captured, triggered and monitored risk-related usage-based and/or user-based and/or operational telematics data, wherein, by the dynamic time warping-based telematics circuit associated with the second risk transfer system, a shadow request is transmitted to at least one of the first risk transfer systems, connected in a decentralized manner to the dynamic time warping-based telematics circuit, over a data transmission network, wherein the shadow request comprises at least said single or a compounded set of variable scoring parameters and/or risk-relevant parameters based upon the captured, triggered and monitored risk-related usage-based and/or user-based and/or operational telematics data, and wherein, in response to the transmitted shadow request, individualized risk-transfer profiles based upon the dynamically collected single or compounded set of variable scoring parameters are transmitted from, at a minimum, one first risk transfer system to a corresponding motor vehicle and issued by a dashboard of the motor vehicle for selection by the driver of the motor vehicle, and wherein, in return for issuing an individualized risk transfer profile over said dashboard, payment-transfer parameters are transmitted from the first risk transfer system to the Original Equipment Manufacturer (OEM) of the OEM-linked, telematics-based system and platform.

37. The accident causation and risk measuring system according to claim 36, wherein a scores driver module of the dynamic time warping-based telematics circuit comprises a trigger for triggering and automatically selecting scores driver parameters based on a defined scores driver behavior pattern by comparing captured telematics data with the defined scores driver behavior pattern.

38. The accident causation and risk measuring system according to claim 36, wherein a scores driver module automatically captures scores risks according to a measured location or trip of the motor vehicles based on the captured telematics data of the mobile telematics devices associated with the motor vehicles.

39. The accident causation and risk measuring system according to claim 36, wherein, by the dynamic time warping-based telematics circuit, the shadow request is transmitted to a corresponding first risk transfer system, if transmission of the shadow request is permitted by an access control unit implemented in the circuitry of the mobile telematics device, wherein the single or a compounded set of variable scoring parameters are generated by the second risk transfer system.

40. The accident causation and risk measuring system according to claim 39, wherein the access control unit of the mobile telematics device comprises a definable distribution table comprising a variables list with at least one first risk transfer system, wherein the transmission of the shadow request to a specific first risk transfer system depends on the definable distribution table of the access control unit of the mobile telematics device.

41. The accident causation and risk measuring system according to claim 36, wherein the first risk transfer is dynamically or partially dynamically provided based on the first risk transfer parameters from the motor vehicles by dynamic usage-based risk-measuring and risk-transfer, wherein relevant driver maneuvers comprise measuring, at a minimum, trajectories for harsh acceleration and/or harsh braking and/or fast lateral road entries and/or left and right overtaking action and/or tailgating and/or speeding/reckless driving and/or running red lights and/or unsafe lane changes and/or wrong-way driving and/or distraction with or without connected car data and/or driving while drowsy.

42. The accident causation and risk measuring system according to claim 21, wherein the mobile telematics devices are provided by a cellular mobile device.

43. The accident causation and risk measuring system according to claim 21, wherein the mobile telematics devices are provided by an Original Equipment Manufacturer (OEM) line fitted telematics device (TCU) of a connected car.

44. The accident causation and risk measuring system according to claim 21, wherein the mobile telematics devices are provided by a cellular mobile device and Original Equipment Manufacturer (OEM) line fitted telematics device (TCU) of a connected car, wherein the OEM line fitted telematics device (TCU) of the connected car communicates directly with the dynamic time warping-based telematics circuit or via a connection with the cellular mobile device.

45. The accident causation and risk measuring system according to claim 44, wherein the telematics data of the motor vehicle and/or user are captured by the monitoring cellular mobile node application by mobile telematics devices of the cellular mobile device and/or the OEM line fitted telematics device (TCU) of a connected car.

46. The accident causation and risk measuring system according to claim 45, wherein an individualized risk transfer profile of a first risk transfer system is only issued by a display of the cellular mobile device of the motor vehicle for selection by a driver of the motor vehicle, if such issuance is permitted by an access control unit implemented in the circuitry of the accident causation and risk measuring system.

47. The accident causation and risk measuring system according to claim 21, wherein the single or compounded set of variable scoring parameters profiles use and/or style and/or environmental condition of driving action during operation of the motor vehicle and at least comprise scoring parameters measuring a driving score and/or a contextual score and/or a vehicle safety score.

48. The accident causation and risk measuring system according to claim 21, wherein the variable driving scoring parameter is, at a minimum, based upon a measure of driver behavior parameters comprising the automatically individuated and identified driver maneuvers.

49. An accident causation and accident risk measuring method in real time based on dynamically measured telematics data, wherein driver behaviors and operational parameters are measured and discriminated by an accident causation and risk measuring system based on automatically individuated driver maneuvers within various measured vehicle trajectories, and wherein measured sensory data are real-time filtered, and start and endpoints of driving events are isolated and identified in real-time, the method comprising:

associating, using circuitry, mobile telematics devices with a plurality of motor vehicles, with the mobile telematics devices comprising one or more wireless or wired connections and a plurality of interfaces for connection with at least one of a motor vehicle's data transmission busses and/or sensors and/or measuring devices, wherein, for providing the wireless connection, the mobile telematics devices act as wireless nodes within a corresponding data transmission network by antenna connections of the mobile telematics device, and wherein each of the mobile telematics devices is connected to an onboard diagnostic system and/or an in-car interactive device and/or a monitoring cellular mobile node application;

capturing telematics data associated with a motor vehicle and users by a plurality of sensors of each of the mobile telematics devices, the plurality of sensors including at least an accelerometer sensor, a global positioning system (GPS) sensor, and a gyroscope sensor;

connecting, using the circuitry, the mobile telematics devices associated with the motor vehicles to a dynamic time warping-based telematics circuit implemented in the circuitry, wherein a data link is created by the wireless connection between the dynamic time warping-based telematics circuit transmitting at least the captured telematics data from the mobile telematics devices to the dynamic time warping-based telematics circuit;

matching, using the circuitry, for driver maneuvers identification, sequential patterns of the captured telematics data with searchable predefined measuring parameter sets of driving maneuvers by the dynamic time warping-based telematics circuit, wherein the dynamic time warping-based telematics circuit stores the searchable predefined measuring parameter sets of driving maneuvers, wherein each driving maneuver is composed of a plurality of hierarchically structured operation measuring parameter sets providing a hierarchical structure of vehicle operations or driving features, and wherein a specific operation or driving feature of a motor vehicle is separately identifiable and triggerable based on a corresponding operation parameter set, wherein each driving maneuver is composed of sequential patterns of operations or driving features by the hierarchically structured operation-measuring parameter sets, which are each extractable and measurable by measuring telematics parameters exhibiting during a lifespan of a driving maneuver;

storing, for pattern template identification, in the dynamic time warping-based telematics circuit, searchable predefined measuring parameter pattern templates of driving maneuvers, wherein each single driver maneuver is composed of a plurality of prototypical parameter patterns, wherein an individuated time interval is measured spanning a duration of a captured maneuver pattern by the dynamic time warping-based telematics circuit, the measured individuated time interval is used as a time index to extract portions of features effectively corresponding to a selected maneuver, wherein for each captured maneuver pattern and each operation or feature, a similarity measurement of detected operation or feature profiles is performed ranging over possible trajectories and used as a benchmark and highly correlated operations or features are selected;

automatically individuating, using the circuitry, captured driver maneuvers within various car trajectories provided by the matched searchable predefined measuring parameter sets of driving maneuvers and the searchable predefined measuring parameter pattern templates of driving maneuvers, wherein, for two temporal sequences within the captured telematics data, a temporal-variation independent measuring parameter is measured, each time, by the dynamic time warping-based telematics circuit, wherein the dynamic time warping-based telematics circuit provides an optimal match between the two temporal sequences by non-linearly warping the temporal sequences in a time dimension, and wherein one of the two temporal sequences, which comprise two time series, is locally stretched or compressed while optimizing measured similarity between the two temporal sequences within the captured telematics data; and performing machine learning based on a neural network, wherein the machine learning includes status observation and learning, wherein the status observation observes status variables of the sequential patterns of the captured telematics data, and wherein the learning performs a learning operation by linking at least one of the observed status variables of the sequential patterns to at least one of the searchable predefined measuring parameter sets of the driving maneuvers.

* * * * *